July 22, 1952 W. T. LIVERMORE 2,604,197
AUTOMATIC FLUID PRESSURE TRANSMISSION
Filed Aug. 30, 1946 5 Sheets-Sheet 1
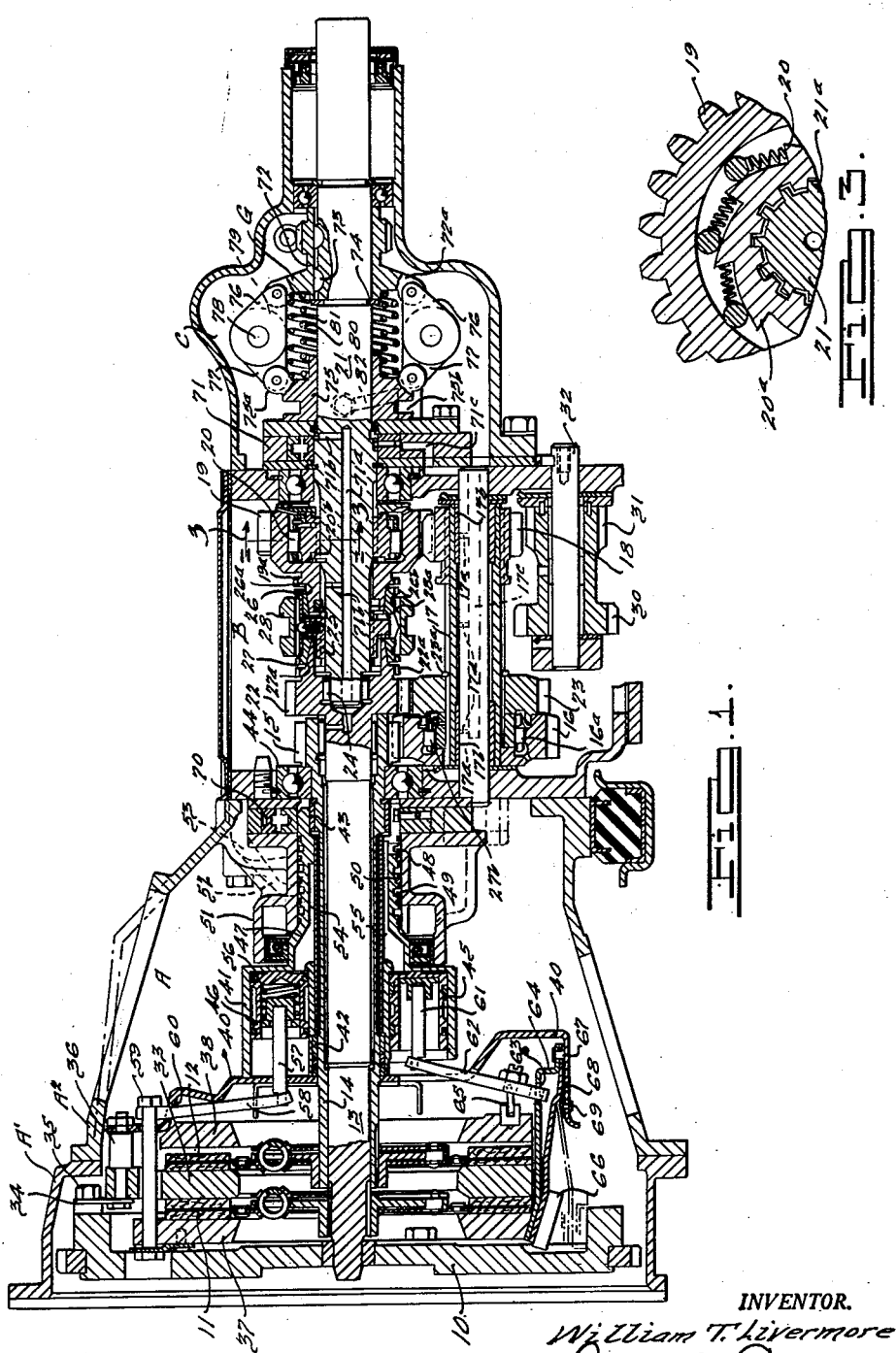
INVENTOR.
William T. Livermore.
BY Joseph Darley
ATTORNEY.

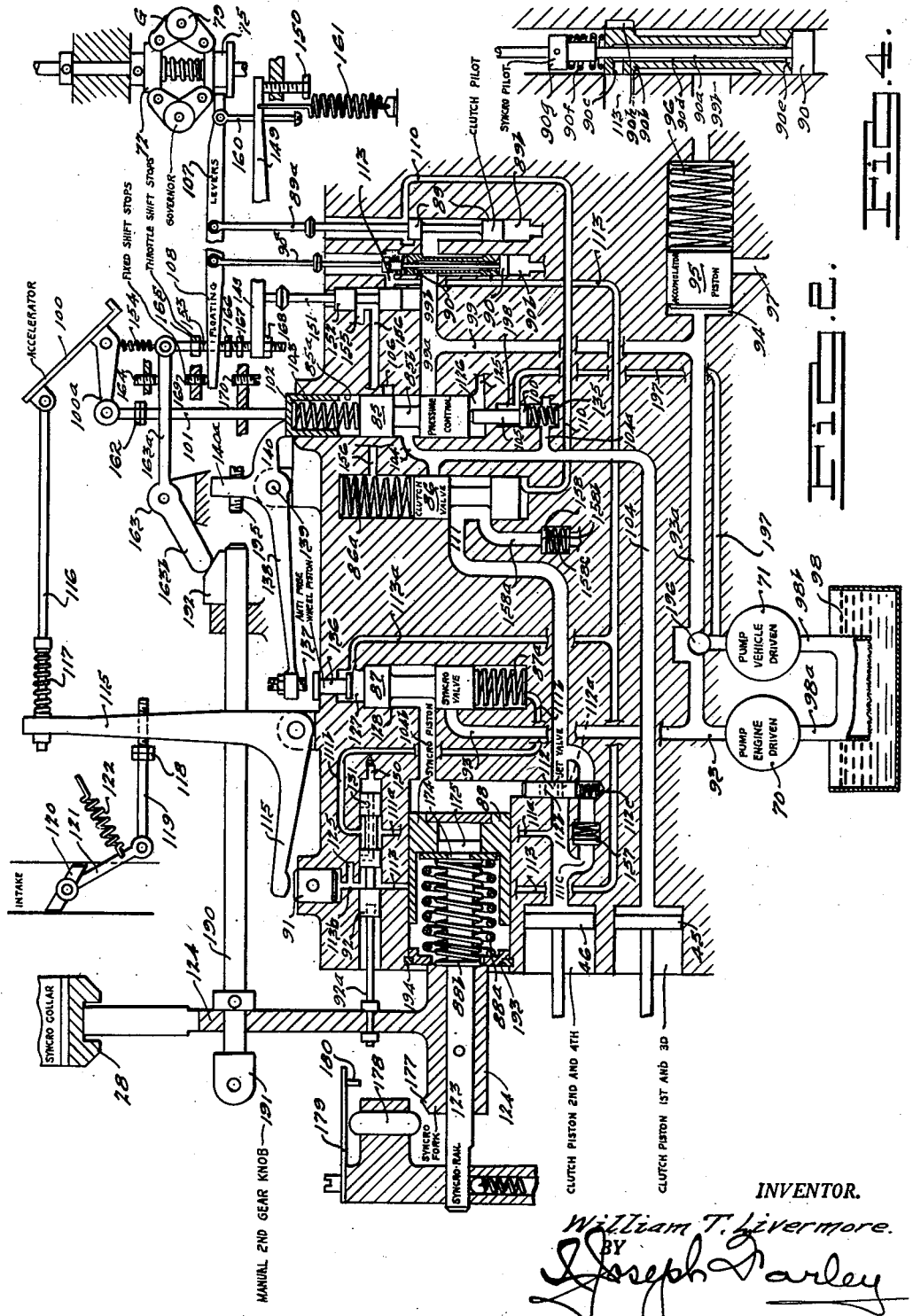

July 22, 1952 W. T. LIVERMORE 2,604,197
AUTOMATIC FLUID PRESSURE TRANSMISSION
Filed Aug. 30, 1946 5 Sheets-Sheet 3
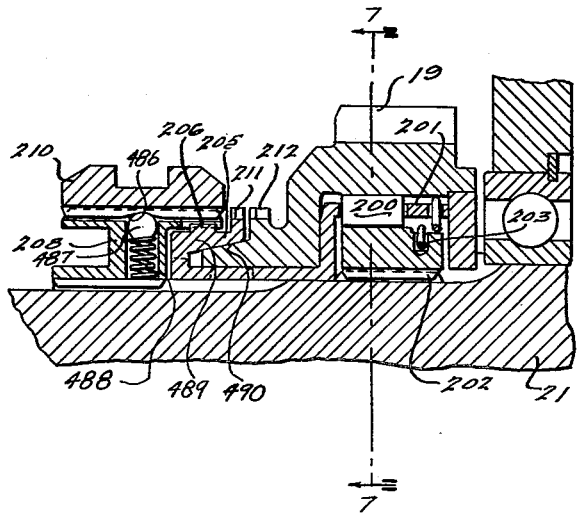
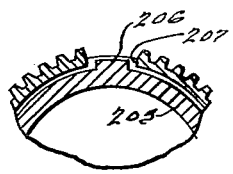
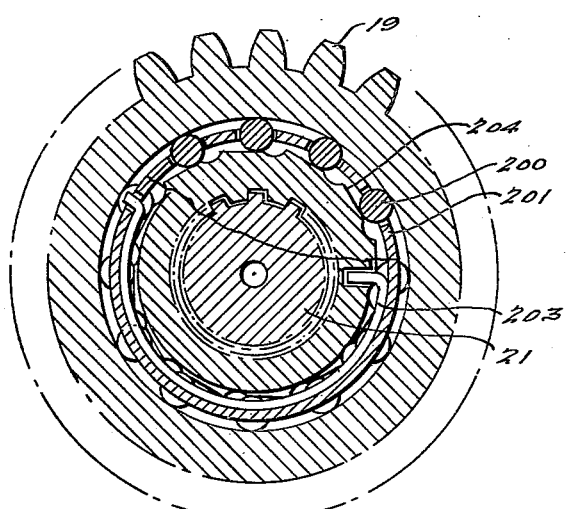
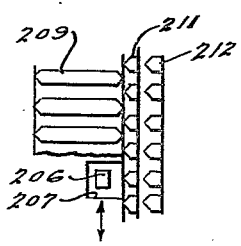
INVENTOR.
William T. Livermore.
BY Joseph Farley
ATTORNEY.

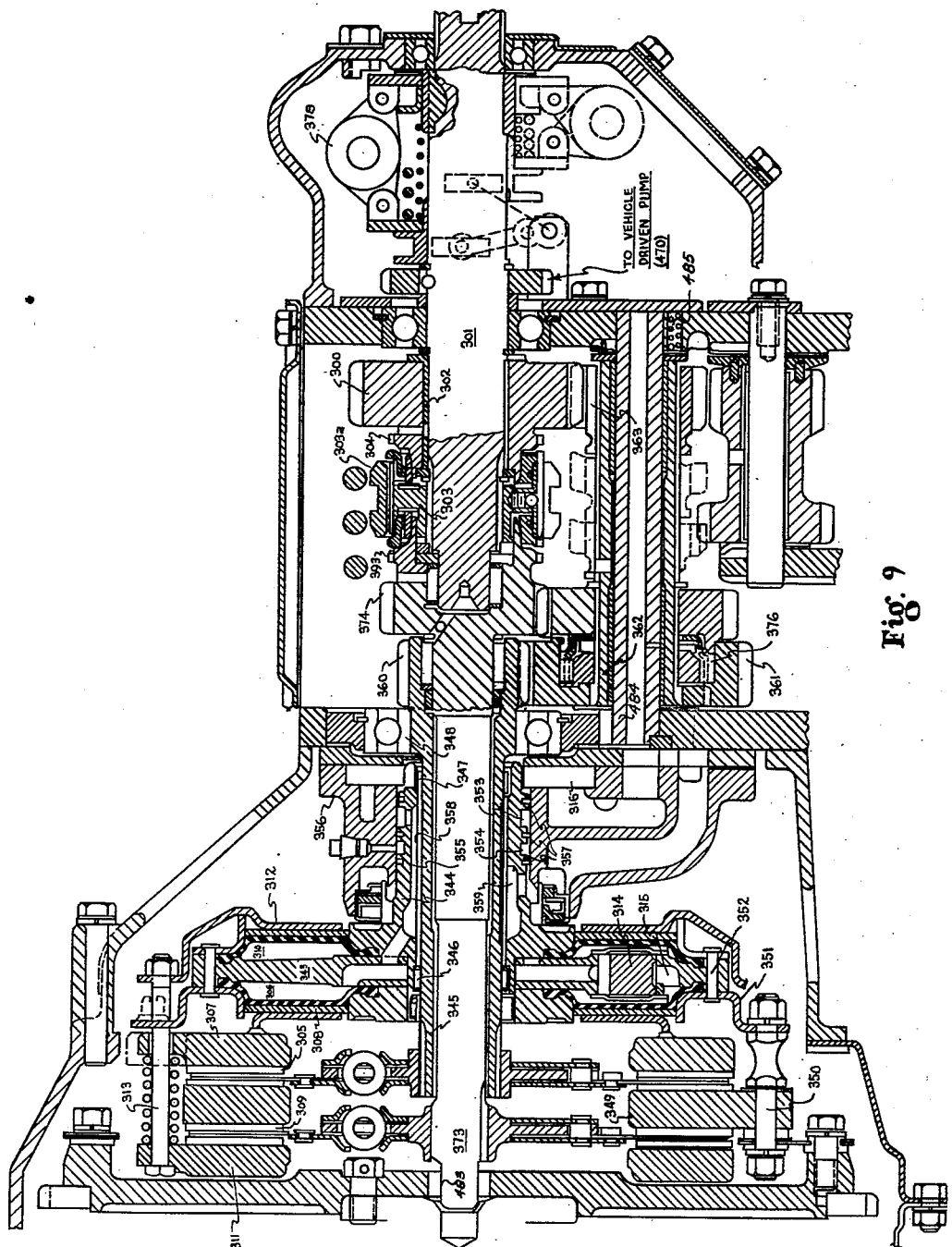

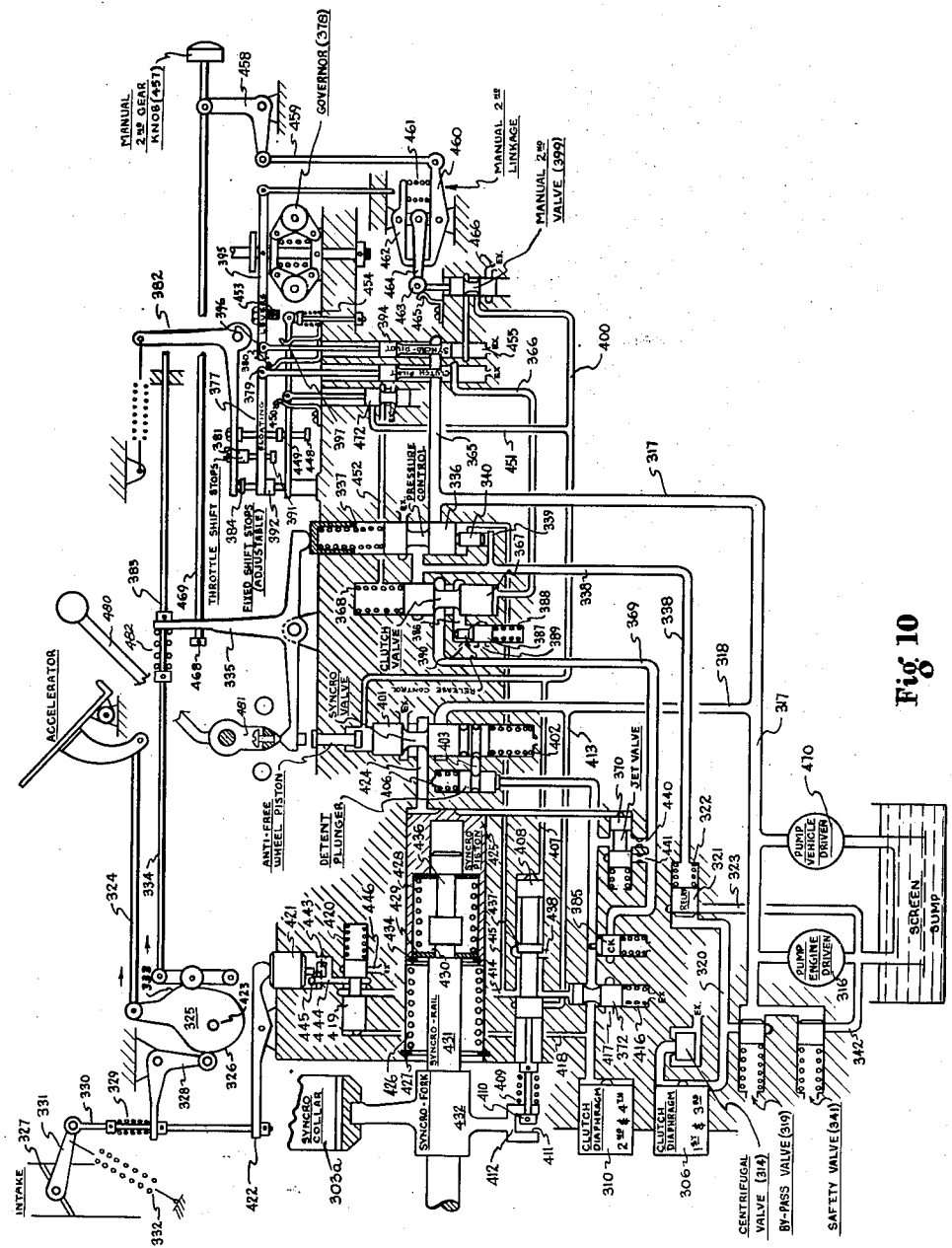

Patented July 22, 1952

2,604,197

UNITED STATES PATENT OFFICE

2,604,197

AUTOMATIC FLUID PRESSURE TRANSMISSION

William T. Livermore, Grosse Pointe, Mich.

Application August 30, 1946, Serial No. 693,874

116 Claims. (Cl. 192—.073)

This invention relates to automatic fluid pressure transmissions of the same general type as disclosed in my prior United States Letters Patent No. 2,120,104 granted June 7, 1938, and No. 2,376,545 granted May 22, 1945, and has for its principal object to incorporate in such a transmission several important improvements whereby the flexibility and adaptability of such a transmission to many different conditions is materially enhanced; whereby marked improvements in smoothness of operation are obtained; whereby changes from one gear ratio to a different gear ratio are effected without objectionable jerking effects and whereby the various control valves that form component parts of the fluid pressure control system are caused to be operated with smoothness and precision without requiring undue effort or power to be applied to cause a proper functioning of such valves.

In addition to the above broader aspects of the present invention, it has among other objects the following:

One object of the invention is to provide an improved automatic transmission with four forward gear ratios which may be progressively engaged by the progressive application of two friction clutches and the shifting of a synchronizer unit from one position to another.

Another object is to provide improved fluid pressure means for actuating the clutches and for shifting the synchronizer unit.

A further object is to provide an improved fluid pressure control system responsive to engine speed, throttle position and vehicle speed for controlling such actuating fluid pressure means.

Another object is to provide improved expanding diaphragm means for causing engagement of the friction clutches which will effect a clutch engagement pressure proportional to the fluid pressure within such diaphragms.

A further object is to provide for the engagement of the first gear clutch with the pressure of engagement being responsive to the combined influence of engine speed and throttle position.

Another object is to provide automatic means for engaging second, third and fourth gear drives responsive to vehicle speed and throttle position.

A further object is to provide automatic means for shifting directly from second to fourth gear during normal acceleration of the vehicle but with means controlled by the accelerator for causing shifts progressively through first, second, third and fourth gear drives where more rapid acceleration is desired.

Another object is to provide automatic means controlled by the accelerator for causing down shifts from fourth to third gear drive where rapid acceleration is desired when the vehicle is in fourth gear drive.

A further object is to provide automatic means for causing progressive down shifts from fourth to third to second and to first gear where required as in ascending a steep hill upon which the vehicle continuously slows down.

Another object is to provide means for free wheeling upon releasing the accelerator while the vehicle is in first or second gear drive but providing means for the engine to act as a brake when the accelerator is released while the vehicle is traveling in third or fourth gear drive.

A further object is to provide means manually operable by the driver for shifting from fourth to second gear drive under conditions where extreme acceleration is desired.

Another object is to provide means manually operable by the driver for holding the vehicle in second gear drive and preventing operation of the automatic shift to third and fourth gear drives.

A further object is to provide means manually operable by the driver to permit the vehicle to drive the engine or to permit the engine to act as a brake with the vehicle in second gear drive where such is desired as for starting the car by towing or pushing or as in descending a steep hill.

Another object is to provide automatic means for complete release of driving engagement when the vehicle is brought to a stop as at a stop light by merely releasing the accelerator and for re-engaging the driving means when it is desired to again start the vehicle by the mere depression of the accelerator thus avoiding any undesirable creeping engagement when the vehicle is brought to a stop as well as any necessity for manual clutch release or gear shift.

A further object is to provide a fluid pressure means and a fluid pressure control system for meeting each of the above automatic requirements.

Another object is to provide engine driven means for normally maintaining a supply of fluid under pressure as well as an auxiliary means for supplying such fluid pressure in the event it may be necessary to start the engine through towing or pushing.

A further object is to provide automatic means for causing up shifts in response to increased vehicle speed and to provide means controlled by the accelerator for causing such up shifts to occur at higher vehicle speeds in response to increased depression of accelerator and opening of throttle.

Another object is to provide fixed limit means for causing up shifts at predetermined maximum throttle openings regardless of throttle openings above such predetermined maximum points.

A further object is to provide automatic means for causing down shifts in response to decreased vehicle speed and to provide means controlled by the accelerator for causing such down shifts to occur at higher vehicle speeds in response to increased depression of accelerator and opening of throttle.

Another object is to provide fixed limit means for causing down shifts at predetermined minimum throttle openings regardless of throttle openings below such minimum points.

A further object is to provide automatic means for causing down shifts to occur at relatively slower vehicle speeds than corresponding up shifts.

Another object is to provide means responsive to a predetermined maximum vehicle speed for preventing down shifts from fourth to third gear drive.

A further object is to provide means responsive to a predetermined maximum vehicle speed for preventing manually actuated down shifts from fourth or third to second gear drive at vehicle speeds above such maximum.

Another object is to provide a main pressure control valve for regulating the pressure available to actuate both of the clutches, such valve being responsive to accelerator or throttle position, and for causing such pressure to be proportional to the extent of accelerator depression.

A further object is to provide centrifugal means responsive to engine speed and associated with the first gear clutch fluid pressure means for causing such pressure to be proportional to engine speed.

Another object is to provide cam means actuated by the accelerator for in turn actuating the throttle, the main pressure control valve and the differential means mentioned above for influencing the vehicle speed at which up shifts and down shifts will occur.

A further object is to provide a clutch valve for regulating the flow of fluid from the main pressure control valve to the fluid pressure means for actuating the second gear clutch.

Another object is to provide throttling means for causing such fluid to gradually and smoothly actuate such second gear clutch.

A further object is to provide a clutch pilot piston for controlling the movement of such clutch valve to open and closed positions and means responsive to vehicle speed and accelerator position for actuating such clutch pilot valve.

Another object is to provide spring means for urging the synchronizer unit into a position for effecting first and second gears and fluid pressure means for moving the synchronizer unit into a position for effecting third and fourth gears.

A further object is to provide a synchro valve for controlling the admission and release of fluid pressure for causing the synchronizer unit to move to and from third and fourth gear position.

Another object is to provide a synchronizer pilot valve for controlling the admission and release of fluid pressure for actuating the synchronizer valve and means responsive to vehicle speed and accelerator position for actuating such synchronizer pilot valve.

A further object is to provide means for preventing movement of the synchronizer valve to a position for admitting or exhausting fluid pressure to shift the synchronizer unit while the first and second gear clutches are engaged.

Another object is to provide automatic means responsive to movement of the synchronizer pilot piston for releasing first and second gear clutches and closing the throttle prior to shifting of the synchronizer unit from one position to another.

A further object is to provide means for rapidly exhausting fluid pressure from each clutch actuating means prior to such shift of the synchronizer unit.

Another object is to provide an interlock valve for controlling the actuation of such clutch release and throttle closing means.

A further object is to provide for flow of fluid through such interlock valve to move the pressure control valve to exhaust position for releasing pressure from the clutch actuating means and for flow of fluid to the throttle closing means when the synchronizer pilot valve is moved to a position for causing the synchronizer unit to shift.

Another object is to provide means for permitting the synchro valve to move from one position to another when the fluid pressure for actuating the clutches has been released.

A further object is to provide a means for by-passing the throttling means effective to produce gradual application of the second gear clutch, to permit rapid discharge of fluid from the second gear clutch actuating means for the release of such clutch.

Another object is to provide release control means for effecting rapid initial release and gradual final release of fluid pressure for actuating the second gear clutch when the first gear clutch remains engaged and the drive is to be transferred from the second gear clutch to the first gear clutch as in effecting down shifts from fourth gear drive to third gear drive or from second gear drive to first gear drive.

A further object is to provide a timing valve for assuring the proper timed relationship between the release of the clutches and the closing of the throttle prior to shifting of the synchronizer unit.

Another object is to provide means responsive to movement of the synchronizer unit for shifting the position of the interlock valve and fluid pressure means controlled by the interlock valve in such shifted position for causing re-engagement of the clutches and for releasing the throttle closing means.

A further object is to provide automatic means for causing a relatively fast closing of the throttle and a relatively slow re-opening of the throttle before and after shifting of the synchronizer unit.

Another object is to provides means for preventing the automatic closing of the throttle to register an impulse back to the accelerator.

The above and other objects of the present invention will appear more fully from the following more detailed description and by reference to the accompanying drawings forming a part hereof and wherein:

Fig. 1 is a longitudinal vertical section through a transmission gear casing or housing, the various gear clutches and other associated parts being shown in cross section therein;

Fig. 2 is a diagrammatic view of the various valves and fluid pressure mechanism, showing the connecting conduits between such valves and the various levers and connecting links which are associated with such valves to complete the fully automatic transmission control;

Fig. 3 is a cross sectional detail taken on line 3—3 of Fig. 1;

Fig. 4 is an enlarged view through the governor operated pilot valve for the second and fourth gearshift;

Fig. 5 is an enlarged longitudinal cross section through the synchronizer collar and one of the associated gears, showing the details of a form of free wheel unlocking device for facilitating disengagement of the gear teeth of the synchronizer unit from the jaw clutch teeth of the associated gear;

Fig. 6 is a sectional detail of the cone 205, lug 206, slot 207 and hub 208 taken in a plane perpendicular to that of Fig. 5.

Fig. 7 is a sectional detail on the line 7—7 of Fig. 5;

Fig. 8 is a somewhat diagrammatic plan view of the teeth of the synchronizer collar, the blocking gear teeth on the synchronizer cone and the jaw clutch teeth on the driven gear with which the internal gear teeth of the synchronizer collar are adapted to be engaged;

Fig. 9 is a longitudinal vertical section through a modified transmission gear casing or housing, the various gear clutches and other associated parts being shown in cross section therein; and Fig. 10 is a diagrammatic view of the various valves and fluid pressure mechanisms, showing the connecting conduits between such valves and the various levers and connecting links which are associated with such valves to complete the fully automatic modified transmission control for the transmission proper shown in Fig. 9.

In Fig. 1 of the accompanying drawings, the transmission proper consisting of a plurality of clutches, fluid pressure clutch operating devices, transmission gears and control governor are mounted in a composite gear casing or housing. This housing consists of a number of separate parts suitably bolted together to form a single integral unitary structure divided into three main compartments, indicated by the reference characters A, B and C. Compartment A which consists of two separate castings A' and A² bolted together encloses a plurality of fluid pressure actuated clutches together with the fluid pressure devices for actuating said clutches. Compartment B contains all of the transmission gears, while compartment C houses a speed governor.

As shown in Fig. 1 of the drawings, and as will be more fully hereinafter described, the present automatic transmission consists essentially of a four-speed gear set which includes a shiftable or sliding transmission gear synchronizer having the usual characteristics of such a device together with spring means normally urging such synchronizer into an inoperative neutral position and fluid pressure operating means to shift such synchronizer from a neutral position to an operative gear connecting position, two main clutches together with means for causing automatic engagement of one of said clutches by hydraulic means and the other under a combination of hydraulic and centrifugal control means; a centrifugal governor connected with the driven or output shaft of the transmission gear set to be responsive to variations in vehicle speed; a pair of pumps for supplying fluid under pressure to operate the fluid pressure means for the clutches and the synchronizer; and suitable valving by means of which the clutches and synchronizer are automatically operated in proper timed relationship, so that the transmission will always transmit the engine power through the proper gear ratio to suit the driving conditions.

Referring to Fig. 1 of the drawings, the numeral 10 indicates a flywheel or other member driven from the engine of an automotive vehicle. Driven selectively from such flywheel, by means more fully to be described, are a pair of clutches 11 and 12, driven elements of which are keyed, respectively, to the shaft 13 and a sleeve 14.

Low speed or first gear drive is effected by engagement of clutch 12 through the sleeve 14 and a pinion gear 15, preferably formed integral with the sleeve 14, and which pinion 15 meshes with a gear 16 mounted at one end of a countershaft sleeve 17 by means of a free wheeling unit or overrunning clutch 16-a. Suitably splined or otherwise secured on the other end of the countershaft sleeve 17 is a sliding gear pinion 18 adapted to mesh with a gear 19 which is connected by means of an overrunning clutch 20 to the driven or output shaft 21 of the transmission proper.

Second gear is obtained by engagement of the clutch 11, transmitting drive through the shaft 13 which has preferably formed integrally therewith a driving pinion 22. Drive pinion 22 meshes with a second gear 23 keyed upon the countershaft sleeve 17 and held against longitudinal movement thereon by a snap ring 23-a; the drive then being transmitted through countershaft sleeve 17 and gears 18 and 19 to the driven or output shaft 21. At this point, it may be noted that after low gear has been established through engagement of the clutch 12, second gear may be effected through engagement of the clutch 11 without necessitating the disengagement of clutch 12, because when second gear is effected through the gears 22, 23, the rotation of the countershaft sleeve at the higher speed ratio obtained through gears 22 and 23 will merely cause the free wheeling unit 16-a to become automatically disengaged, thus permitting the countershaft sleeve 17 to turn faster than the gear 16.

The countershaft sleeve 17 is rotatably mounted upon a stationary shaft 17-a which is non-rotatably secured in the end wall portions of the gear casing compartment B, suitable bearings 17-b being interposed between the sleeve 17 and shaft 17-a and the shaft being provided with a longitudinally extending central bore 17-c which serves as an oil conduit having radial branches 17-d through which oil is admitted for lubricating the said bearings.

As will be seen from Fig. 1, the output or driven shaft 21 of the transmission is piloted within a counterbore formed in the enlarged gear end of the input shaft 13, an anti-friction roller bearing 24 being provided between the reduced end of the output shaft and the counterbore of the input shaft. Suitably splined upon output shaft 21 is the inner collar or hub 25 of a synchronizer unit which includes the usual cone-shaped friction clutch members 26, 27, the inner faces of which engage cone-shaped extensions 26-a and 27-a on the gears 19 and 22, respectively; the friction cone collars 26 and 27 being interposed between the said extensions and the sliding collar 28 of the synchronizer unit. Each of the cone collars 26, 27 are provided with the usual blocking gear teeth 26-b and 27-b, commonly employed in the modern type of synchronizing gear units. Collar 28 is provided with internal gear teeth 28-a adapted to be engaged with the gear teeth 19-a and 22-a formed integral with the gears 19 and 22, respectively.

As will be obvious from the foregoing description, when the collar 28 is slid to the right in Fig. 1 to engage with the gear teeth 19-a, the gear 19 will be locked in driving engagement with the output shaft 21, while, when the synchronizer collar 28 is slid to the left to engage the internal gear teeth 28-a thereof with the gear teeth 22-a of gear 22 on the end of driving shaft 13, the shaft 13 will be locked in direct drive relationship with the output shaft 21.

The foregoing gear arrangement is adapted to shift directly from second gear to the direct gear driving relationship just described, which, in the present constructional example, is a fourth gear drive. The direct shift from second to fourth gear drive requires that the driving shaft 13, which during second gear drive rotates at a faster speed than the output shaft 21, be slowed down to a synchronous speed before the synchronizer collar 28 can be shifted to the left. Such slowing down in turn requires that the engine be slowed down or that clutch 11 be momentarily released, or that both such conditions be effected. With the control system hereinafter described, both clutches are released and the throttle is closed reducing the engine speed prior to shifting of the synchronizer collar 28, after which both clutches are re-engaged and the throttle opening restored to effect the direct drive relationship between the driving shaft 13 and the output shaft 21. When this driving connection is thus effected, it is to be noted that shaft 21 will be turning faster than gear 19 which is still being driven through gears 22, 23 and 18 through shaft 13 and clutch 11 and that, therefore, roller clutch 20 will be in overrunning condition. The same is likewise true with respect to roller clutch 16-a, as the countershaft sleeve 17 will also be driven faster through gears 22 and 23 than gear 16 is driven by pinion gear 15.

A third gear ratio suitable for acceleration at high speed, such as desired for passing another car, or ascending a steep grade, is also provided intermediate between second gear drive and direct drive. This gear ratio is obtained by releasing clutch member 11 when the vehicle is in direct drive through the actuation of the automatic control means, later to be described, and the drive is then automatically transferred to clutch member 12 which is always in engagement whenever driving in either direct drive or third gear, and is transmitted through sleeve 14, gears 15, 16, roller clutch 16-a and gears 23, 22, jaw gear teeth 22-a of the latter to the synchronizer collar 28 and thence to the output shaft 21. This is usually accomplished by the driver depressing the accelerator pedal beyond the pre-determined position, as will be later more fully described, while driving the car in fourth or direct drive gear.

There are times when it is necessary or desirable to use the engine as a brake in second gear when descending a very long steep grade. The second gear described above is not suitable for this purpose, as the drive passes through the free wheeling unit or overrunning clutch 20 provided between the gear 19 and the output shaft 21, which overrunning clutch, while adapted to transmit a drive from gear 19 to output shaft 21, is not adapted to transmit the drive in the reverse order, that is from the output shaft back through gear 19 to the engine. As it is necessary, when using the engine as a brake for the drive to be transmitted from the output shaft back through the transmission gearing to the engine, the use of the engine as a brake in the present construction is effected by moving the synchronizer collar 28 to the right to cause the internal gear teeth 28-a thereof to engage with the jaw teeth 19-a of gear 19. When this connection is effected, rotation of the output shaft is communicated through the synchronizer unit directly to the gear 19 and thence to gear 18, countershaft sleeve 17, gears 23, 22 and driving shaft 13 to clutch 11 and thence to the engine. If the car is being driven in direct drive, the synchronizer collar 28 will be turning at the same speed as the engine, whereas, the gear 19 and its jaw teeth 19-a will be driven at a slower speed through the gears 22, 23 and 18. Therefore, in order to engage the synchronizer collar 28 with the jaw teeth 19-a, it is necessary to momentarily disengage the clutch 11 so that the friction cone 26 associated with the gear 19 will be able to speed up the latter until the jaw teeth 19-a thereof are rotating at the same speed as the collar 28; the internal gear teeth 28-a of the collar 28 can then be readily slid into mesh with the jaw teeth 19-a of the gear 19.

When an overrunning clutch, such as the clutch 20, is employed, there will be a tendency for the clutch to jam and lock the rollers in engagement if drive is transmitted backwardly to the engine from shaft 21 by the motion of the vehicle. This is due to a slight twisting or winding up of the shaft, thereby causing the rollers of the overrunning clutch 20 to be held in locked engagement by the torque pressure between the internal gear teeth 28-a of the synchronizer collar 28 and the jaw teeth 19-a. When the drive is released, the locking effect between the overrunning rollers and the torque pressure of the gear teeth 28-a and 19-a frequently is so great that it becomes impossible to disengage the synchronizer collar 28 from the jaw teeth 19-a by means of the manual shift lever provided for this purpose. To prevent this from happening, the splines 21-a (Fig. 3) by means of which the cam member 20-a of the roller clutch 20 is keyed to the output shaft 21 are made with a loose fit or back-lash clearance in the spline keyways of the cam member 20-a, and a torsional spring 20-b (Fig. 1) is interposed between the shaft 21 and the cam member 20-a which, when the load is removed, will permit a slight amount of relative rotational movement between the said shaft and the cam member sufficient to release the jamming or locking engagement of the rollers.

As shown in Fig. 5, the rollers 200 of the free wheeling roller clutch are rotatably mounted in a roller cage 201 between which, and the hub or collar 202 of the roller clutch which is splined to shaft 21, is interposed a torsional spring 203 arranged to normally urge the cage 201 in a counterclockwise direction (Fig. 7) to cause the rollers to travel up the cam surfaces 204 towards locking position. As shown in Figs. 5 and 6, the friction cone 205 is made integral with or attached to the roller cage 201 and is provided with a small projecting rectangular lug 206, also shown in Figs. 6 and 8, which extends into a slot 207 provided in the hub member 208 of the synchronizer unit, there being a clearance between the lug 206 and the slot 207 slightly less than the spacing of the internal gear teeth 209 of the synchronizer collar 210. The engagement of the lug 206 with the slot 207 serves to limit the amount of angular swing of the cone 205 and cage 201. The arrangement is such that the torsional spring 203 normally urges the lug 206 toward engagement with the lower side of the slot 207, as seen in Fig. 8 of the drawings, in which position the rollers are moved towards locking position to effect drive through the overrunning roller clutch by the rotation of gear 19. When the cage 201 is in such a position relative to the cam surfaces 204 as to effect drive in this manner, the position of the blocking teeth 211 of the cone 205 relative to the internal gear teeth 209 of the synchronizer collar is a blocking position, and before the synchronizer collar 210 may be shifted to the right to engage the jaw teeth 212, it is necessary that the cone 205 and cage 201 be rotated in a clockwise direction, as shown in Fig. 7, a distance relative to the hub member 208 and collar 210 sufficient to move the blocking teeth into engaging alignment with the gear teeth 209 as shown in Fig. 8. Such rotation will also effect a clockwise rotation of the cage 201 relative to the cam surfaces 204 against the action of the torsional spring 203 sufficient to disengage the rollers 200 from their drive transmitting position. Such rotation of the cone 205 and cage 201 against the torsional spring 203 may be produced manually by urging the synchronizer collar 210 to the right since the side edges of teeth 209 and 211 are chamfered so that endwise movement of the collar will cause such rotation. If the manual shift of the synchronizer collar 210 to the right is initiated while the output shaft is rotating at a faster angular velocity than gear 19, as when such shift is made from fourth or third gear drive, such relative rotation of the blocking teeth 211 to a non-blocking position and of the cage 201 to a disengaging position will be assisted by the overrunning clutch action described above.

As will be seen from the foregoing description, the arrangement shown in Figs. 5 to 8 inclusive, where the rollers of the overrunning clutch are mounted in a cage made to rotate as a unit with the friction cone members of the synchronizer in a manner whereby the engagement of the synchronizer collar with the blocking teeth of the friction cone is accompanied by disengagement or unlocking of the rollers, and with the provision of the torsional spring to normally urge the rollers into engaging or locking position, accomplishes the two-fold purpose of normally holding the rollers in a position where forward drive may be transmitted through them and of moving such rollers to an inoperative position when the output shaft is geared through the synchronizer unit to the engine for positive reversible second gear drive.

Reverse gear drive is obtained by sliding the gear 18 to the left upon the splines of the countershaft sleeve 17 until its teeth are brought into meshing engagement with the teeth of gear 30, gear 30 being made as a cluster gear integral with gear 31 rotatably mounted upon the fixed shaft 32. For simplicity of illustration, the gears 30, 31 are shown with their axis of rotation in the plane of the paper, whereas, in the actual construction, the axis of rotation of these two gears is such that gear 31 meshes with gear 19. In order to establish reverse drive, clutch 12 is engaged which transmits the drive through sleeve 14, gears 15 and 16 to the countershaft sleeve 17 and thence through gears 18, 30 and 31 to gear 19, and thence from jaw teeth 19-a to the synchronizer collar 28 to the output shaft 21. It is to be noted that it is necessary for the synchronizer collar 28 to be engaged with teeth 19-a of gear 19 as reverse drive could not be transmitted through the overrunning clutch 20. It will also be noted that, if gear 18 is slid to the left from the position shown in Fig. 1 to become disengaged from gear 19 without engaging gear 30, a neutral condition is obtained.

From the foregoing, it will be seen that with the transmission of the present invention, manual shifting means are required for forward drive, neutral and reverse drive and also for a locked up or positive second gear drive through which the engine can be used as a brake.

In normal operation the car is started automatically by the centrifugal engagement of clutch 12, as the engine is speeded up, while the shift from first to second is accomplished automatically by hydraulic engagement of clutch 11, as will presently be more fully described. The shift from second to fourth may be semi-automatic, this being accomplished by releasing the accelerator pedal until the engine slows down sufficiently for the synchronizer collar 28 to be engaged automatically with the jaw teeth 22-a of gear 22. This shift may, however, be made entirely automatic by providing mechanism for closing the throttle automatically when the proper car speed has been reached and reopening the throttle after the shift is completed. A quicker shift can be made if the clutches are released during the shift. The shift can then be completed as soon as the action of the synchronizer brings jaw teeth 22-a to the same speed as collar 28 without waiting for the engine to slow down. The "downshift" from fourth to third is semi-automatic and occurs when the accelerator pedal is depressed to a certain point, if the car is traveling at an appropriate speed. The downshift into second gear is also made automatically by disengaging the synchronizer collar 28 from the jaw teeth 22-a and the shift from second to first is made automatically by release of the clutch 11. All of the automatic control means for accomplishing the above functions will be hereinafter more fully described.

*Centrifugal clutch*

The means for effecting the automatic engagement of the clutch 12 by centrifugal means as the car is speeded up in starting comprises the following:

In addition to the clutches proper 11 and 12, the clutch assembly also includes a central driving plate 33 which is supported from and driven by the flywheel 10 through a plurality of steel straps 34, the outer ends of which are bolted to the flywheel by bolts 35 and the inner ends of which are bolted to the driving plate 33 by means of bolts 36. Movable pressure plates 37, 38 are mounted, respectively, adjacent to the clutches 11 and 12 and are supported from the central driving plate 33, each by three steel straps similar to the straps 34 and bolts 35, but which are not shown in the drawing because they are spaced at different points about the periphery of the central driving plate, the support of the plates 37 and 38 being such that, although the plates 37, 38 are held concentric with the axis of rotation of the flywheel, they are free to be moved longitudinally to apply pressure to the driven clutch members 11 and 12 by the clutch actuating means now to be described.

The clutch cover 40 is supported as a unit with the central driving plate 33 by means of the bolts 36 and said clutch cover, therefore, rotates at all times with the central driving plate 33 whenever the engine is running. Said clutch cover in turn carries with it a cylinder housing 41 which is piloted upon the driving sleeve 14 by means of bushings 42, 43; sleeve 14 being in turn supported near its right hand end by a ball bearing 44. It will be seen from the above described construction that the central driving plate 33, the clutch cover 40, the cylinder housing 41 and driving sleeve 14 thus form a single unitary assembly which is connected at one end to the flywheel 10 through the steel straps 34 and is supported near its other end by the ball bearing 44.

Mounted in suitable cylinders formed in the cylinder housing 41 are three slidable pistons 45 for actuating the clutch 12 and three similar pistons 46 for actuating clutch 11. As clearly shown in Fig. 1, the cylinder housing 41 has a reduced hub extension 47 and is provided with annular grooves 48, 49, which serve as collector grooves for fluid under pressure to be delivered to the pistons 45, 46, the grooves 48, 49 being separated by piston rings 50. The reduced hub 47 of the cylinder housing is rotatably mounted within a stationary housing 51 formed integral with casting A² and which is provided with conduits or ducts 52, 53 which communicate, respectively, with the annular grooves 48, 49. Groove 49 communicates through a longitudinally extending groove 54 with the pistons 46, while groove 48 communicates through longitudinal groove 55 with the pistons 45.

If clutch 11 is to be engaged, oil is transmitted through duct 52 to groove 49 and thence through longitudinal passage 54 to pistons 46. The oil pressure building up on the right hand end of pistons 46 is transmitted through cushion springs 56 to piston rods 57 to the inner ends of levers 58 to the bolts 59 which serve as tension members, the levers 58 pivoting in suitable apertures 60 provided in the clutch cover 40, and causing the clutch pressure plate 37 to be pulled to the right by the bolts 59 to clamp the members of clutch 11 between the central driving plate 33 and the clutch pressure plate 37.

If clutch 12 is to be engaged, oil is transmitted through the duct 53, groove 48, longitudinal passage 55 to the pistons 45, and, as the oil pressure builds up behind pistons 45, the pistons are moved to the left and the piston rods 61 exert pressure upon the inner ends of the levers 62, causing said levers to be moved upon their fulcrumed pivotal engagement, like the levers 58, in suitable openings 63 provided in a lever 64 and through which openings the outer ends of the levers 62 project. As the piston rods 61, and levers 62 are moved towards the left, as above described, this movement is communicated to the pressure plate 33 through the pivotally mounted strut or push rods 65. The parts are so constructed that the stroke imparted to pistons 45 by the oil pressure is limited and does not impart to the right hand pressure plate 38 a sufficient amount of motion to cause said plate to produce driving engagement of the clutch member.

Initial engagement of the clutch member 12 in cooperation with the movement of the levers 62 by the pistons 45 is produced by means of centrifugal weights 66 which are mounted upon the left hand ends of levers 64. Secured to the right hand end of levers 64 by means of rivets 67 is one end of a flexible steel strip 68, the other end of which is secured by a row of rivets 69 to a flat portion of the clutch cover 40. The side of lever 64 adjacent to the steel strip 68 is arcuate in form so that, as the weights 66 move outwardly under the influence of centrifugal force, the arcuate surface of the lever rolls upon the flexible strip 68 and causes said strip to be rolled up on the arcuate surface of the lever 64 after the fashion of a belt upon a pulley or a window shade upon a curtain rod. This movement obviously will cause the outer end of lever 62 to be moved toward the left and this motion together with that imparted to said lever by the hydraulic pistons 45 is sufficient to move the clutch pressure plate 38 an amount sufficient to produce driving engagement of the clutch 12. The parts are so dimensioned and adjusted that without the cooperation of the hydraulic pistons 45, the motion or action of the centrifugal means is not sufficient to produce engagement of clutch 12, and likewise the motion of the pistons 45, as hereinbefore described, is insufficient to produce engagement of said clutch without the action of the centrifugal means.

When the engine is stationary, release springs (not shown) of any common or usual construction provided between the central clutch plate 33 and the clutch pressure plate 38 hold the centrifugal weights and levers 66 and 64 in their inward position and against the periphery of the clutch pressure plate 37, which serves as a stop to limit the inward movement of the weights 66 to the position in which they are shown in Fig. 1 of the drawing, and with the clutch 12 disengaged. These springs are of such strength that they permit the weights 66 to move outwardly under the influence of centrifugal force until they contact against the inside of the rim of the flywheel 10 in the dotted line position, shown in Fig. 1 of the drawings, at the idling speed of the engine. The vehicle is started by admitting fluid under pressure to the pistons 45 and the engine is simultaneously speeded up by opening the throttle. As the centrifugal weights are already held in the outer dotted line position by the centrifugal force, the clutch 12 will be applied at a rate depending upon the rate at which the oil flows to pistons 45. The pressure on the clutch, however, will be limited by the amount of centrifugal force exerted by the weights 66. If the engine is running slowly and the centrifugal force on the weight is therefore light when the pistons 45 are caused to be moved to the end of their stroke by the oil pressure, the weights 66 will be moved inwardly part way toward their innermost position. If it is assumed that the throttle is now open a certain amount, the speed of the engine will consequently increase, the centrifugal force exerted on weights 66 will be correspondingly increased, and clutch 12 will be applied with a corresponding pressure. As the engine speed and this pressure increase together, the point will be reached where the pressure will be sufficient to prevent further increase in engine speed. If the throttle is held in this position, the clutch will continue to slip at a constant engine speed until the vehicle is moving fast enough so that the driven member clutch 12 will finally be turning the same speed as the engine and the clutch slippage will then cease. The speed of the engine then further increases and the force exerted by the weights 66 eventually becomes great enough so that the pistons 45 are forced to the right by the action of the levers 62, and the weights 66 assume their outermost position against the rim of the flywheel as a stop. It will thus be seen that the oil pressure against the pistons 45 acts as a yieldable cushion member not only to prevent excessive forces being exerted at high engine speeds by the centrifugal force upon the weights 66 and thereby damaging the mechanism, but the oil pressure on the pistons 45 serves to place an upper limit upon the pressure which can at any time be applied to clutch 12.

It is to be noted that throughout the range of engine speeds at which slipping occurs, the clutch pressure is controlled by the centrifugal weights 66, while the rate at which the pressure builds up to this amount is, however, controlled hydraulically by the action of the pistons 45. Experience with centrifugal clutch actuating means has proven them to be a very satisfactory means for regulating clutch pressure, except for the instance of initial clutch engagement which is often very sudden and causes an objectionable backlash noise or a bumping jerk in the driving parts between the clutch and the wheels of the vehicle. Hydraulic means on the other hand provides a very smooth method of obtaining initial engagement. Therefore, the arrangement above described provides the combined advantages of both hydraulic and centrifugal controls.

A sudden initial engagement of centrifugal clutch, as above referred to, is caused by the fact that as the centrifugal weights move outwardly, the centrifugal force increases due to the increase in the radial distance to which the weights are moved from the axis of rotation. Therefore, as soon as the weights begin to move outwardly, even though their speed of rotation may not change, the weights are caused to move suddenly from their inner to their outermost position. The method of mounting the centrifugal levers 64, as herein described and shown, completely eliminates this tendency towards sudden action of the weights because as the weights 66 swing outwardly and the arcuate portions of the levers 63 move or roll upon their points of support upon the flexible strip 68, the effective lever or moment arm of each of the levers 64 is automatically reduced by an amount sufficient to compensate for the above described increase in the centrifugal force due to the increase in the radial distance of the weights from the axis of rotation.

*Fluid pressure pumps*

The transmission of the present invention is provided with two fluid pressure pumps, one connected in positive driving relationship to the engine and the other connected to be driven by the output shaft. The engine driven pump 70 is connected to and driven by the extended hub 47 (see Fig. 1) of the clutch cover 40, and is therefore driven at all times through the central driven clutch plate 33 at engine speed. The pump 70 is the main pump primarily employed for supplying oil under pressure to actuate the synchronizer and the clutches 11 and 12. Due to the fact that this pump is engine driven, it will not be operative to supply fluid under pressure if for any reason the engine cannot be started, therefore, it would not function to supply oil under pressure to the fluid pressure actuated devices by pushing or towing the vehicle. In order to provide for such a contingency, the rear pump 71 is provided, which is driven directly by the output shaft 21. The pump 71 also furnishes a source of oil for lubricating the various bearings on the output shaft 21 through the conduit 71-a and branch conduits 71-b and countershaft sleeve 17 and countershaft 17-a through the conduit 71-c.

*Speed governor*

Mounted upon the output shaft 21 within the housing C is a centrifugal governor, indicated generally by the reference character G. This governor comprises a fixed spider 72 keyed as by the key 73 to the output shaft 21 and held against longitudinal movement relative to said shaft by means of a snap ring 74. A second spider 75 is also mounted upon output shaft 21 for slidable longitudinal movement thereon. Pivotally connected to suitable projecting bosses 72-a and 75-a of the spiders 72 and 75, respectively, are the ends of links 76, 77, which are pivotally connected at their other ends by pins 78 upon which are also carried the governor weights 79. The spiders 72, 75 are normally urged away from each other by means of the springs 80, 81 in their extended position, as shown in Fig. 1 of the drawings.

As shaft 21 is rotated, the centrifugal force urges the weights 79 outwardly, thus causing the links 76, 77 to pull the slidable spider 75 towards the fixed spider 72; the slidable spider being provided with an annular groove 75-b in which a lever 82 is slidably mounted for transmitting the motion of the governor to the valve mechanism presently to be described.

*Automatic control system*

In accordance with the the present invention, the various speed gear ratios, which are made effective at any instant in accordance with operating conditions, are primarily under the control of the automatic control system, consisting of a plurality of valves and levers. This system, illustrated in the diagrammatic view of Fig. 2 of the drawings, includes a pressure control valve 85 for regulating the oil pressure delivered to the clutch operating pistons 45, 46; a clutch valve 86 for governing the flow of fluid to apply and release the pistons 46 for the clutch 11; a synchronizer valve 87 for controlling the flow of fluid under pressure to a synchronizer piston 88; pilot valves 89 and 90, which are adapted to be operated under the combined influence of throttle opening as governed by the amount of depression or the position of the accelerator pedal 100 and the position of the speed governor to cause the clutch valve 86 and the synchronizer valve 87 to operate at the proper time. The system further includes a fluid pressure operated plunger 91 for momentarily closing the throttle whenever an "upshift" is made by means of the synchronizer piston 88 and an interlock valve 92, which permits the throttle to reopen after the upshift is completed.

*Accumulator*

All of the valve members which comprise the automatic control system are shown in Fig. 2 of the drawings in a position which they occupy when the engine is at rest. As soon as the engine is started, oil under pressure is delivered by the engine driven pump to the conduit 93 and branch conduit 93-a, conduit 93 leading directly to the synchronizer valve 87 and branch conduit 93-a to an accumulator cylinder 94, having a piston 95 slidably mounted therein. The piston 95 is normally held by a spring 96 towards the left hand position shown in the drawings. A conduit 97 connects the cylinder 94 with the sump 98 in which a supply of oil is maintained for delivery to the pumps 70, 71 through the suction conduits 98-a, 98-b. The spring 96 is calibrated at a strength such as to insure proper operating pressure in the hydraulic system. When the engine driven pump 70 is rotated upon starting of the engine, the oil passing through conduit 93 will be blocked at the upper end of the said conduit by the synchronizer valve, which at this instant is in closed position. Oil flowing through branch conduit 93-a, however, will move piston 95 to the right compressing spring 96 until the pressure rises to the desired predetermined point at which time the accumulator piston 95 will have been moved to the right a sufficient amount to uncover conduit 97 and thereby permit a portion of the oil to flow, or be by-passed, back to the sump 98. While this is occurring, branch passage 99 and lateral branches 99-a and 99-b thereof will be filled with oil under the accumulator pressure.

*Pressure control valve*

If now the accelerator pedal 100 is depressed, its movement will be communicated through the lever arm 100-a formed integral therewith to the push rod 101, the lower end of which bears against a cup-shaped piston 102 mounted in the cylinder 85-a in which the pressure control valve 85 is slidably mounted. Downward motion of the piston 102 is communicated by a spring 103 to the pressure control valve 85 causing it to move downwardly until the necked portion 85-b thereof opens the branch conduit 99-a, thereby permitting oil to flow around the necked portion 85-b of the pressure control valve to the conduit 104 and thence to the clutch pistons 45 for actuating clutch 12 for first and third gear drive. The fluid which passes around the necked portion 85-b of the pressure control valve to conduit 104 also branches to the conduit 104-a to the lower end of a small plunger 105 mounted below the pressure control valve 85. The pressure of the fluid upon the plunger 105 tends to raise the pressure control valve 85 and when the pressure in conduit 104, 104-a becomes sufficient to overcome the pressure of spring 103, the pressure control valve 85 will be raised until conduit 99-a is closed and drain 106 leading to the sump is opened, thereby causing the oil to be drained off until the oil pressure drops sufficiently to permit valve 85 to again close the drain 106. However, whenever the oil pressure on the small plunger 105 is less than the pressure on spring 103, valve 85 will move downwardly thereby admitting more oil. A balance will therefore be established between the force exerted through the spring 103 and the oil pressure in conduit 104 and consequently upon the clutch operating piston 45. The clutch operating piston 45 is thus applied with a pressure which is controlled by the position of the accelerator pedal.

The pressure required to be exerted upon the accelerator pedal 100 to operate the pressure control valve 85 for regulating the clutch pressure depends upon the size of the small plunger 105 rather than the size of the pressure control valve 85. As a result of this construction, it is possible to make the pressure control valve 85 large enough to provide adequate oil passages and at the same time to operate it with a very light pressure on the accelerator pedal.

If it is to be assumed that the oil pressure has now moved the clutch pistons 45 to the end of their travel and that the accelerator pedal 100 is further depressed so that the engine speed increases, the centrifugal clutch means hereinbefore described will cause the clutch 12 to be engaged and the vehicle to start. As the vehicle starts, the governor G will be rotated by the output shaft 21, thus causing the weights 79 thereof to be moved outwardly and the slidable spider 75 thereof to be moved towards the fixed spider 72. This movement of the governor is communicated to a pair of differential levers 107, 108 having suitable connections (not shown) to the lever 82 that is slidably connected in the groove 75-b of the governor. As shown in Fig. 2, the movement of the governor spider 75, as the speed of the engine increases, causes the right hand ends of the two differential levers 107, 108 to be raised. Differential lever 107 is connected by the valve rod 89-a to pilot valve 89, while differential lever 108 is connected by the valve rod 90-a with the pilot valve 90. As the speed of the vehicle increases and valve 89 is raised by the action of the governor, oil under pressure will flow around the necked portion of valve 89 from conduit 99-b to conduit 110 from which it will be delivered to the space below clutch valve 86, thus raising the clutch valve and placing conduit 104 in communication with conduit 111; the oil under pressure flowing from the accumulator through conduit 99 and branch passage 99-a thereof through the pressure control valve to conduit 104 and thence to conduit 111 around the necked portion of the clutch valve 86 to permit the fluid to pass to the clutch pistons 46. Clutch pistons 46 will then be moved by the oil pressure towards the left in Fig. 1 of the drawings to cause clutch 11 to be engaged; the degree of pressure applied to clutch 11 depending upon the position of the accelerator pedal 100. By proper adjustment of the relationship between the pressure of spring 103 of the pressure control valve and the degree of throttle opening as determined by the position of the accelerator pedal, the proper degree of clutch pressure for smooth engagement of clutch 11 can be obtained at all throttle openings. The quality of such a clutch engagement may be further improved by regulating the rate at which the oil flows to pistons 46 through the jet plunger 112 interposed in conduit 111 between clutch valve 86 and pistons 46.

Clutch 11 now having been engaged, the vehicle will be driven in second gear by the rotation of shaft 13, gears 22 and 23, countershaft sleeve 17 and gears 18 and 19. Due to the provision of the overrunning roller clutch 16-a in gear 16 by driving the countershaft sleeve 17 at higher speed through gears 22 and 23, the roller clutch 16-a will be released and even though clutch 12 remains engaged, the driving of gears 15 and 16 will be ineffective to exert any driving force upon the output shaft 21. As the speed of the vehicle increases still further, the pilot valve 90 will be raised by the action of the governor on differential lever 108 to establish communication between conduit 99-b and conduit 113, oil flowing through conduit 113 to the interlock valve 92, and piston plunger 91, which is adapted when it is raised by the oil pressure flowing through conduit 113 to engage the end of a bellcrank lever 115. Lever 115 is connected by rod 116 with the accelerator pedal 100, there being a lost motion spring connection 117 between rod 116 and the lever 115. When the accelerator pedal is depressed, force will be applied through spring 117 to cause lever 115 to be moved in a counter-clockwise direction in Fig. 1 until lever 115 engages the adjustable stop nuts 118 on rod 119 which is connected with the throttle valve 120 through the connecting link 121, a spring 122 being connected to link 121 to normally urge the throttle valve 120 towards closed position. As will be seen from the foregoing, whenever the piston plunger 91 is raised by the oil pressure as above described, the bellcrank 115 will be moved in a clockwise direction against the action of spring 117, thus moving the upper arm of lever 115 away from the stop nuts 118 and permitting the throttle valve 120 to be closed by spring 122.

The oil transmitted through conduit 113, as will be hereinafter more fully described, also flows through branch 113-a to the synchronizer valve 87 and tends to cause the latter to be moved downwardly against the pressure of spring 87-a to permit oil in conduit 93 to flow through branch 104-b to move synchronizer piston 88 against springs 88-a and 88-b to actuate the piston rod 123 to which is secured the fork 124 that engages with the synchronizer collar 28.

The synchronizer fork 124 is connected by means of a valve rod 92-a to the interlock valve 92. Oil which passes through the interlock valve 92 from conduit 113 also flows through the branch conduit 125 to the space 126 below the pressure control valve 85 to cause the latter to be raised, thereby to establish communication between conduit 104 and the drain conduit 106 around the necked portion 85-b of the pressure control valve to conduit 106 leading to the sump. This permits oil to escape through the drain conduit 106 from both sets of clutch pistons 45, 46. Up to this point the oil pressure behind piston 46 is also transmitted through branch conduit 111-a to the interlock valve 92 and through conduit 111-b to the space below the synchronizer valve 87, thus preventing the synchronizer valve from being moved downward in spite of the oil pressure transmitted from conduit 113-a to the space 127 above it. As the clutch pressure diminishes, the oil pressure in the space below the synchronizer valve is released and the synchronizer valve is then pushed downward by the oil pressure in branch conduit 113-a against the pressure of spring 87-a until it cuts off the communication between passage 104-b and the drain 128 and establishes communication between passage 104-b and conduit 93 leading to the engine driven pump. Oil pressure from the pump 70 flowing through conduit 93 to conduit 104-b thus moves piston 88 to the left, compressing the heavy synchronizer spring 88-a and causing the lighter synchronizer spring 88-b to urge the synchronizer collar 28 to the left through the action of the fork 124. As soon as synchronization is completed and the internal gear teeth of the synchronizer collar 28 engage the teeth 22-a of gear 22, direct drive is thereby effected. As the fork 124 moves to the left, as above described, it carries with it the interlock valve 92, thus cutting off communication between conduits 113 and 113-a and opening conduits 111-a and 113-a to drain conduit 130 through a central conduit 131 provided in the interlock valve. The oil pressure is thus released from plunger piston 91, thus permitting the throttle to reopen. The oil pressure is also released from the space 126 below the pressure control valve 85 thus permitting the latter to move downwardly and re-establish communication of the oil supply to the clutch pistons 45 and 46. As the space below the synchronizer valve is now in communication through branch conduit 111-b to the drain conduit 130, the synchronizer valve 87 remains in its downward position after the application of clutch pistons 46, as the interlock valve 92 prevents oil from passing through conduit 111-a to conduit 111-b. As both clutches are now engaged and the synchronizer collar 28 is in engagement with the jaw teeth 22-a of gear 22, the transmission is in direct drive.

As I have found a tendency on the part of the piston plunger 91 to hunt, the following construction of the pilot valve 90 has been employed to correct this tendency. Slidably mounted upon valve rod 90-a is a spool-shaped sleeve 90-b. A lateral opening or secondary port 90-c in said spool communicates with a clearance space 90-d provided between the longitudinal central bore of the spool 90-b and the valve rod 90-a. This bore communicates at its lower end with a conical recess 90-e forming an annular space between the bottom of the spool and the plunger head 90 of the valve. The spool 90-b is normally held by a compression spring 90-f against the enlarged plunger head 90 of the valve, the lower end of the spring resting upon the upper face of the spool and the upper end of the spring abutting against a collar 90-g pinned to the valve stem 90-a. As valve 90 is moved upwardly by the action of the differential lever 108, as the speed of the car increases and conduit 113 is opened, the oil under pressure in conduit 113 flows into the clearance space 90-d through the secondary port 90-c to the annular space 90-e, thus causing the valve spool 90-b to be moved upwardly a distance equal to the clearance spaces provided between collar 90-g and spool 90-b, thus establishing communication between branch conduit 99-b and conduit 113 through the annular port 90-h to the conduit 113 which leads to the clutch operating pistons. This action of valve 90 occurs with a flip or snap and takes place without any additional motion of the speed governor, and thereby insures a supply of fluid to the throttle operating plunger piston 90 that prevents the tendency of such piston to hunt. It will be noted that when the valve 90 moves downwardly to close communication to conduit 113, the reverse action will take place, the spring 90-f causing the valve spool 90-b to flip downwardly to its lowermost position.

When the car is stationary and the accelerator pedal is released, it is essential that there be no pressure on either of the clutches 11 or 12. Therefore, when the accelerator pedal 109 is in its released position, the pressure control valve 85 is urged upwardly by release spring 135 to open drain 106. It has been found undesirable to permit this to occur in direct drive, for as the engine would slow down, the car would coast in a condition similar to free wheeling whenever the accelerator pedal was completely released. Better control of the vehicle is obtained by maintaining a light clutch pressure with released throttle in direct drive. This is accomplished by the oil pressure transmitted, as above explained, to the space 127 above the synchronizer valve 87 which pressure, in addition to operating the synchronizer valve, also operates the small plunger 136 and causes the same to be urged outwardly until the plunger engages the adjustable screw 137 carried by the one end of the bellcrank or rocker lever 138, pivoted at 139 and the arm 140 of which lever contacts with the upper end of the cup-shaped piston 102 and thereby serves to maintain a light pressure upon the spring 103 of the pressure control valve even though the accelerator pedal may be fully released.

It is frequently desirable to provide for quicker acceleration, for example, when passing another vehicle or to obtain a lower gear ratio automatically when the vehicle is ascending a steep grade. This is accomplished with the present invention by the provision of a differential speed lever 149, the right hand end of which is normally held against an adjustable stop screw 150 by spring 161. The left hand end of differential lever 149 is connected by means of valve rod 151 to a pilot valve 152 and also is connected by means of a rod 153 to accelerator pedal 100. If the right hand end of lever 149 is held against stop 150, as shown, and the accelerator pedal is depressed, pilot valve 152 will be moved downward cutting off the drain 155 and permitting oil pressure from conduit 113 to enter conduit 156 through which it passes to the space above the clutch valve 86. Oil pressure thus builds up upon the upper end of valve 86 equal to that already transmitted through pilot valve 89 and passage 110 to the lower end of clutch valve 86. Since the oil pressure therefore is equal upon both ends of valve 86, the spring pressure of spring 86-a on the top of clutch valve 86 will force the valve downwardly to the position shown in Fig. 1 of the drawings. The oil pressure flowing to clutch pistons 46 will then be released through branch conduit 111-c, check valve 157 and release valve 158. Since the above action results in releasing the pressure upon clutch pistons 46 and clutch 11, the drive must now be through clutch 12 and third gear will be obtained through shaft 13, gears 15, 16 and gears 23, 22 to jaw teeth 22-a of the latter and synchronizer collar 28 to the driven shaft 21.

If such a shift from fourth or direct drive to third gear be made at very high vehicle speeds, the engine will be forced to run so fast as to be either dangerous or destructive. For this reason means have been provided to prevent such a shift occurring above a predetermined speed, such for example as 65 miles per hour. When this speed is reached, the speed governor through a small connecting link 160, which connects differential lever 107 to the differential speed lever 149, will cause the right hand end of lever 149 to be raised against the tension of spring 161 away from stop 150. When this occurs, the motion imparted to the left hand end of the speed differential lever 149 by the accelerator pedal is now insufficient to move valve 152 far enough to cause the gear shift to be made.

The speeds at which the various gear shifts are caused to take place automatically depend upon the combined action of the accelerator or engine throttle and the governor, each of which function to position the respective ends of the differential levers 107 and 108. It will be apparent that for any particular car speed, the right hand or governor control end of the said levers will be stationary. Shifts may then be made by moving the left hand ends of said levers by the accelerator pedal. On the other hand, if the accelerator pedal is held stationary, shifts will be made by the action of the speed governor on the right hand ends of said levers as the vehicle speed changes. The greater the extent to which the accelerator pedal is depressed and therefore the throttle opened, the farther down the left hand ends of the differential levers 107, 108 are moved, and consequently the greater the vehicle speed which will be required to move the governor far enough to cause an upshift to a higher gear ratio. A similar action occurs regarding downshifts which take place at higher speeds, the greater the throttle opening. Adjustably secured upon push rod 101 which leads from the accelerator pedal to the pressure control valve 85 is a pair of stop nuts 162 which are adapted to engage with one arm 163-a of a rocker lever 163, which is normally held against an adjustable fixed stop 164 by spring 154. Rod 153 which is pivotally connected to the right hand end of arm 163-a of rocker lever 163 carries stops 165, 166 for engagement with differential lever 108. A rod similar to the rod 153, but not shown in the drawings, is located immediately behind the rod 153 and carries stops similar to the stops 165, 166 for engagement with the left hand end of differential lever 107. Rod 153 also carries a pair of adjustable stop nuts 167 and 168 for engagement with the differential speed lever 149. Fixed stops 169 and 170 are also provided for engagement with differential lever 108, there being similar fixed stops, not shown, for cooperating with the left hand end of differential lever 107. The fixed stop 170 for lever 108 and its counterpart for lever 107 determines the maximum speeds which can be attained before upshifts or shifts from a lower to a higher gear ratio are made. Thus, as the car speed increases and the governor raises the right hand ends of differential levers 107, 108, the left hand ends of said levers will move downwardly until they make contact with the stops 170. Further, upward movement imparted to the right hand ends of the differential levers by the governors will raise the valves 89 and 90 successively to the position at which they will cause upshifts to take place. It is to be noted, however, that the levers 107, 108 can make contact with the stops 170 only if stops 166 have been caused to move downward so that they will not interfere with the left hand ends of the differential levers 107, 108 by the depression of the accelerator pedal, and lever 163 has likewise been moved by the engagement of the nuts 162 with the right hand end 163-a of lever 163. The various adjustable stops are set at a position such that the condition above described will occur only at or very near full throttle opening. For closed or part throttle opening conditions, the differential levers 107, 108 will make contact with stops 166, these being in a higher position than stops 170. Therefore, it will not be necessary for the right hand ends of differential levers 107, 108 to rise as far in order to bring valves 89 and 90 to the position at which shifts occur.

Downshifts are similarly influenced by the combination of the fixed stops 169 and the stops 165, stops 165 being movable by the accelerator pedal. As the car speed decreases and as the speed governor moves the right hand ends of levers 107, 108 downwardly, their left hand ends will rise until they make contact with stops 169. As the governor continues to lower the right hand ends of the differential levers 107, 108, valves 89, 90 will successively be brought to the position where they cause downshifts to second gear and then to first gear to occur. If, however, the accelerator pedal 100 is depressed and through the action of stops 162, lever 163 and rod 153, the stops 165 are moved downward to such a position that the differential levers 107, 108 make contact with the stops 165 rather than with stops 169, it will obviously not require as much downward movement of the right hand ends of differential levers 107, 108 to move valves 89, 90 to a position at which downshifts will be effected. Therefore, such downshifts will occur at higher speeds.

Shifts made when levers 107, 108 are in contact with the fixed stops 169 and 170 will always occur at the same speed, as such shifts are influenced only by the action of the governors G, which are driven in accordance with the speed of the vehicle, while shifts which occur when the levers 107, 108 are in contact with movable stops 165, 166 occur at speeds determined by combinations of vehicle speed and throttle opening. The various stops are made adjustable so that the positions of the fixed stops and the movable stops as well as the distances between them can be varied to produce different effects. If, for example, the distance between stops 165 and 166 is large in comparison to the distance between stops 169 and 170, the shifts will be influenced by throttle opening only at or near the ends of the motion of the accelerator pedal 100, thus the throttle opening can be varied throughout a wide range without causing the automatic gear changing mechanism to function. This has been found desirable under some driving conditions. For example, when ascending a very long grade in a lower gear ratio, it is convenient to regulate the speed of the vehicle by motion of the throttle within its middle range without the need of causing unnecessary gear shifts which would become annoying if they occurred too frequently. Another condition where this feature is desirable is when accelerating a car in second gear on a level road. Many drivers prefer to bring the speed of the vehicle up to the speed at which they intend to proceed by accelerating entirely in second gear. Then upon releasing the throttle or raising the foot off the accelerator pedal, the shift into direct drive can be made. This is particularly desirable with the type of transmission gear arrangement shown in Fig. 1 wherein it is necessary for the engine power to be interrupted by either a manual or an automatic closing of the throttle so that the synchronizer collar 28 may be engaged with the jaw teeth 22-a of the gear 22. With the accelerator pedal 100 in closed throttle position, the lever 163 is held against stop 164 by spring 154. In this position there is a considerable clearance between lever 163 and stops 162 so that an initial downward movement of the accelerator pedal 100 does not produce any movement of lever 163 and its associated stops to effect the gear shifts. This idle travel or lost motion is useful to insure that the pressure control valve 85 will be completely released whenever the operator's foot is removed from the accelerator pedal 100. A certain amount of throttle opening is obviously necessary to bring the vehicle to any of the speeds at which the shifts should occur. Due, however, to the above-mentioned lost motion, this slight amount of throttle opening does not effect the shifting speeds.

Let it be assumed now that the vehicle is driven up a steep grade in third gear with the throttle wide open and that the grade is such as to cause the vehicle to continue to slow down until the governor through the action of the above described stops and levers moves valve 90 to the position at which it opens conduit 113 and permits the oil to drain therefrom. This relieves the pressure in the space 127 above the synchronizer valve 87 whereupon the said valve is moved upward by the pressure of the spring 87-a, thereby opening conduit 104-b to the drain 128 or moving synchronizer valve 87 to the position shown in Fig. 2 of the drawings. This results in relieving the oil pressure from the right hand end of synchronizer piston 88. The heavy spring 88-a will therefore urge the synchronizer piston 88 and fork 124 to the right, the force of the spring 88-a being exerted upon washer 174, and enlarged head 175 of shift rod 123 to which the synchronizer shift fork 124 is attached.

Since, under the conditions now assumed, the throttle is open and the engine power was being transmitted through jaw teeth 22-a of gear 22 to the internal gear teeth 28-a of the synchronizer collar 28, there will be a heavy load on these teeth and consequently they will not slide apart or disengage readily under the influence of the shift fork 124. Therefore, ignition interrupting devices are supplied. These consist in making the end of the synchronizer fork 124 which engages with the synchronizer collar 28 slightly narrower than the annular groove in said collar 28. This permits the synchronizer shift fork 124 to move a short distance without imparting its motion to collar 28. A small projection 177 provided on the right hand end of the hub or boss of the shift fork 124 but which, as the synchronizer collar in the condition assumed has been slid to the left, is also in its extreme left hand position, will make contact with and raise the short rod 178 in the initial movement of the shift fork 124 to the right. Rod 178 will move the movable spring electrical contact 179 away from the fixed electrical contact 180. The contacts 179 and 180 are so interposed in the ignition circuit that when they are separated a momentary interruption in the power of the engine occurs so that the load upon the jaw teeth 22-a of gear 22 and the internal gear teeth 28-a of the synchronizer collar 28 is momentarily released. Consequently, synchronizer collar 28 may be disengaged from the jaw teeth 22-a by the pressure of the spring 88-a acting upon synchronizer fork 124. As soon as the projection 177 passes beyond rod 178, electrical contact between the contact members 179, 180 is again re-established and the engine power is resumed.

Since the vehicle was assumed to be in third gear with throttle wide open, valve 152 is in its downward position to cause oil to be transmitted through passage 156 to hold the clutch valve 86 in its downward or clutch releasing position, as shown in Fig. 2 of the drawings. Clutch pistons 46 and clutch 11 were therefore released. As soon as pilot valve 90 moved downward to relieve the pressure in passage 113, it also relieved the pressure in passage 156 and in the space above clutch valve 86 which is now free to be moved upward by the oil pressure below the valve 86 in the conduit 110. As clutch valve 86 moves upwardly, it cuts off the drain through conduit 158-a and releases valve 158 and admits oil from conduit 104 around the necked portion of clutch valve 86 to conduit 111 and jet plunger 112 to re-apply clutch pistons 46 and clutch 11. Second gear drive is therefore effected through clutch 11, shaft 13, gears 15, 16, countershaft sleeve 17, gears 18, 19 and roller clutch 20 to output shaft 21. The above described sequence of operations is also utilized to make a gear shift from fourth or direct drive to second gear drive. This occurs if the throttle is opened when the vehicle is running slowly in fourth gear. In this case the sequence of operations is the same, as above described, except that the valve 152 is in the upper position, as shown in Fig. 2 of the drawings, and the clutch valve 86 is also in its upper position so that clutch pistons 46 and clutch 11 are already engaged before the shift occurs.

If, after shifting down into second gear, the grade is so steep that the vehicle speed still decreases, a speed will eventually be reached where the pilot valve 89 will have been moved downward so as to permit the oil to drain from conduit 110, thereby releasing the pressure below clutch valve 86 and permitting it to be forced by the pressure of spring 86-a to the lower position shown in Fig. 2. This permits the oil to drain from clutch pistons 46 to passages 111 and 111-c through check valve 157 and release valve 158. Clutch 11 is therefore released and since clutch 12 is still engaged, the drive will be taken up by it through sleeve 14, gears 15 and 16, roller clutch 16-a and gears 18 and 19 through roller clutch 20 to output shaft 21, and the vehicle is now in first gear.

Should it be desired to shift from direct drive into second gear in order to obtain extreme acceleration at a speed above that at which it would occur automatically, as hereinbefore described, the manual shift rod 190 is moved by manual means until its enlarged end 191 makes contact with the synchronizer shift fork 124. When this occurs, a cam 192 secured to the right hand end of the manual shift rod 190 engages the left hand arm 163-b of lever rocker lever 163 causing the lever to fulcrum about its pivotal mounting and causing the right hand end 163-a thereof to move downward sufficiently so that stop 165 upon rod 153 makes contact with the left hand end of differential lever 108, thus moving pilot valve 90 downwardly to the position where, as previously described, it will cause a downshift into second gear by establishing the fluid pressure connections to produce a sliding of the synchronizer collar 28 to the right out of mesh with the jaw teeth 22-a of the synchronizer 22. It is to be noted here that this is a free wheeling second gear drive since it is transmitted through the roller clutch 20 and it is therefore not adapted for using the engine as a brake. If it should be desired to establish a positive connection between the engine and the output shaft 21 through the second gear ratio so as to employ the engine as a brake, this can be accomplished by releasing the accelerator pedal 100 and then by further movement of the rod 190 to the right, shifting synchronizer gear fork 124 and the synchronizer collar 28 manually to the right to cause the internal gear teeth thereof to mesh with the jaw gear teeth 19-a of the gear 19. When the synchronizer gear shift fork 124 is so moved to the right for the above described operation, piston 88 must of necessity move with it. During this motion of the fork 124 and piston 88, washer 174 and the washer 193 move together as a unit and there is no spring pressure of the springs 88-a and 88-b to be overcome. A snap ring 194 which limits the movement of washer 193 towards the left remains in fixed position during this above described movement of the piston 88 under the manual operation of the manual shift rod 190, as above described.

Since there is no pressure in space 127 above the synchronizer valve at this time, the plunger 135 and lever 138 will not maintain any pressure upon the cup-shaped plunger 102, and the pressure control valve 85 is therefore free to be released if the accelerator pedal 100 is not depressed and the throttle would therefore be closed as would naturally be the case when using the engine as a brake. The right hand end of the manual shift rod 190 is therefore adapted to engage an adjustment screw 195 secured within an upwardly projecting arm 140-a of the lever 138—140, thereby causing lever 140 to be pressed downwardly upon the cup-shaped plunger 102 and thereby maintain enough clutch pressure through pressure control valve 85 to drive the engine.

In the event the engine will not start by the usual starting means and it is desired to start the engine by pushing or towing the vehicle, the motion of the vehicle will obviously drive output shaft upon which is mounted the rotor of vehicle driven pump 71. Oil from this pump will then pass through check valve 196 to conduits 93 and 93-a, which are normally filled with fluid delivered by the engine driven pump 70. The manual shift rod 190 is then placed in the same position as for second gear braking and so as to engage the synchronizer collar 28 with the jaw teeth 19-a of gear 19. As the vehicle speed increases and the governor raises the right hand end of differential lever 107, pilot valve 89 will rise to the point at which it admits pressure from conduit 99-b to conduit 110, thus raising clutch valve 86 and admitting oil through passage 111 to apply the clutch pistons 46 and clutch 11. Since the manual shift rod 190 through stop 195 and levers 140-a, 140 holds the pressure control valve 85 downward, there will be sufficient clutch pressure so that the motion of the car will start the engine.

As it is desirable to cause the clutch pressure to increase as soon as the vehicle begins to move, there is incorporated in the small pressure control valve plunger 105 mounted below the pressure control valve 85 means for increasing the clutch pressure as soon as the vehicle begins to move. When the vehicle driven pump 71 is driven by the vehicle through rotation of the output shaft 21, it causes pressure to build up in conduit 197 connected to the output of the vehicle driven pump below the check valve 196. This oil under pressure passes to the space 198 above the enlarged head provided on the lower end of the small plunger 105 and thereby causes a downward force to be exerted upon plunger 105. Accordingly, a greater pressure will now be required below plunger 105 in branch conduit 104-a of conduit 104, and also upon clutch pistons 45 to balance the pressure of spring 103 of the pressure control valve, and as a result, the clutch pressure will have been increased by the motion of the vehicle even though the accelerator pedal 100 has been held in a fixed or closed throttle position. The above described feature would be of particular advantage if the present transmission were to be used without the aid of the centrifugal devices for assisting in the regulation of the pressure upon clutch 12, such as would be the case for example if the pivotal point 64 for the levers 62 were a fixed pivot and the clutch pressure pistons 45 were permitted to make a sufficient stroke to engage clutch 12 without the aid of the centrifugal weights 66 and levers 64. If such were the case, the provision of conduit 197 leading to the space 198 above the enlarged head of plunger 105 would have two marked advantages, as it would be possible to adjust the linkage connecting the accelerator pedal with the throttle and with the pressure control valve so that when the car is stationary, a considerable amount of clutch slipping would occur to produce a smooth and very gradual start. As soon as, however, the car gets underway, the oil under pressure delivered to the conduit 197 to space 198 above plunger 105 will result in an increase of the clutch pressure such that further slipping of the clutch would cease. The foregoing arrangement also would render it impossible for the driver to slip the clutch continuously, thereby causing overheating of the clutch and wearing out of the clutch plate surfaces. A clutch pressure that is light enough to cause smooth and pleasant starting is, however, not sufficient for effective shifting as it results in a prolonged and unpleasant amount of clutch slipping during the shift. The devices above described make it possible to obtain the best degree of clutch pressure for both starting and for gear shifting.

As will be seen from the foregoing description, clutch 11 is applied by clutch pistons 46 when shifting from first to second gear, when shifting from second to fourth gear, and also when shifting from third to fourth gear. Since in the case of shifting from first to second gear, the vehicle speed is relatively low and the torque applied to the output shaft is relatively high as compared to the latter cases of shifting from second or third to fourth gear drives, a relatively more gradual application of clutch pressure is desirable in the first case than in the latter cases in order to effect smooth shifts as promptly as possible. In order to secure the desired clutch application rate for each case, the jet plunger 112 is provided. When the vehicle is traveling in first gear, there will be no fluid pressure behind the synchronizer piston 88 and the spring 112–c will therefore hold the jet plunger in the raised position shown in the drawings, and the oil passing through conduit 111 must, therefore, flow through the small orifice 112–a in plunger 112. When the synchronizer collar 28 is moved to the left for third or fourth gear drive, there is oil pressure behind piston 88 and this pressure will push the jet plunger 112 downwardly moving the larger hole 112–b into alignment with conduit 111. When the smaller hole 112–a is aligned with conduit 111, the rate of flow of oil under pressure to the clutch pistons 46 will therefore be much slower and the clutch pistons 46 will therefore cause the clutch 11 to be more slowly and gradually applied, whereas in effecting fourth gear drive at the higher speeds, when the orifice 112–b is in alignment with conduit 111, the oil will flow much more quickly to the clutch pistons 46 and cause clutch 11 to be more quickly applied.

Although it is desirable to admit the oil to the pistons 46 gradually for smooth and gradual application of the clutch 11, it is imperative that it be possible to release the said clutch pistons at a more rapid rate to make a downshift from fourth gear to third gear promptly upon depressing the accelerator pedal 100. In order to accomplish this purpose, check valve 157 is provided in branch conduit 111–c in order to by-pass the jet plunger 112. As will be obvious from an inspection of the drawings, when pressure is released in conduit 111 to permit the clutch pistons 46 to travel to the right, the oil pressure will move check valve 157 off its seat and thus permit the oil to flow more rapidly through conduit 111–c and by-pass around the jet plunger 112.

In making downshifts from fourth gear to third gear, and especially from second gear to first gear with open throttle by releasing clutch pistons 46 and clutch 11, the engine power is applied suddenly through roller clutch 16–a, thus tending to cause a sudden jerk which is unpleasant and objectionable. In order to smooth out this jerk, the release valve 158 has been added. It consists of a disk 158–b normally held upon its seat by a light spring 158–c. When the clutch valve 86 is operated to release oil from the pistons 46 through valve 158, the pressure of the oil escaping will at first move the valve 158 off its seat against the pressure of spring 158–c, the clutch 11 will then begin to slip and as it slips, the engine speed will increase until the engine and clutch 12 are turning fast enough so that the overrunning clutch 16–a will begin to take a part of the load. When the oil pressure has been reduced an amount equal to the force of spring 158–c, the disk 158–b again rests against its seat and the oil continues to escape through a small hole in valve 158 until the remaining pressure is slowly removed from clutch 11 and the load has now been transferred gradually from clutch 11 to clutch 12.

To summarize the operation of the transmission and automatic control thereof: Beginning with the vehicle at rest, the engine is started causing the engine driven pump 70 to deliver oil under the accumulator pressure to the conduit 93 and conduit 99 with its branches 99–a, 99–b. When the operator depresses the accelerator 100, the main or pressure control valve 85 is opened, thereby permitting fluid to flow from conduit 99–a through conduit 104 to the clutch pistons 45, thereby causing clutch 12 to be engaged under combined effect of centrifugal force and fluid pressure to establish first gear drive. As the car gains speed in first drive, the governor G raises the right hand ends of differential levers 107, 108 and when pilot valve 89 is raised sufficiently to establish communication between conduit 110 and conduit 99–b, fluid under pressure flows through conduit 110 to the lower end of clutch valve 86 raising it and permitting the fluid which has been admitted to conduit 104 by the pressure control valve to flow across also to conduit 111 to clutch pistons 46 which apply clutch 11. Clutch 11 then takes over the drive in second gear while clutch 12 remains in engagement; the overrunning clutch 16–a in gear 16 releasing automatically and permitting the gears 22, 23 to take over the drive. The fluid admitted to conduit 111 also flows through conduit 111–a across the interlock valve 92 to conduit 111–b and through the latter to the bottom of synchronizer valve 87, but has no immediate effect thereon. As the speed of the car increases and the right hand end of differential lever 108 is raised sufficiently, pilot valve 90 is opened and fluid flows through conduit 113 to interlock valve 92 and simultaneously through conduit 113–a to the top of synchronizer valve 87. The fluid which passes through the interlock valve 92 flows through conduit 113–b and raises piston plunger 91 to momentarily permit the throttle valve 120 to close, said fluid also flows through conduit 125 to the space 126 below the main control valve 85 raising it and opening drain 106, thus relieving the fluid pressure in both conduits 104 and 111 and thus releasing clutches 12 and 11.

The release of the pressure in conduit 111 and concomitantly in conduits 111–a and 111–b now permits the fluid pressure in 113–a to move the synchronizer valve 87 to close drain 128 and open the main supply conduit 93 to conduit 104–b, thus permitting the fluid pressure to be exerted on synchronizer piston 88 to move it and synchronizer fork 124 to the left and slide synchronizer collar 28 into engagement with gear 22, thereby coupling input shaft 13 of the transmission in direct driving engagement with the output shaft 21 thereof. As the synchronizer fork 124 moves to the left, it carries with it the interlock valve 92 which, when the synchronizer collar 28 has been moved to full engagement with gear teeth 22-a, opens conduits 113-a and 125, as well as conduit 111-b to the drain 130. The opening of conduit 125 relieves the fluid pressure in space 126 and thus permits the main control valve 85 to open and re-establish the fluid pressure to the clutch pistons 45 and 46 and driving engagement of the clutches 11 and 12, hence the car proceeds in direct drive through clutch 12, shaft 13 and the direct coupling of the latter through the synchronizer collar 28 to the output shaft 21.

With both clutches 11 and 12 engaged and direct drive coupled, gears 15 and 16 are ineffective because gear 23 will be driving the countershaft sleeve 17 at a higher speed than gear 16 is rotating thereby releasing roller clutch 16-a. Third gear is made effective, as hereinbefore described, whenever the operator with the car in direct drive depresses the accelerator to an extent sufficient to cause the valve 152 to be opened, thereby admitting fluid under pressure to the top of clutch valve 87 to depress it and cut off the communication between conduits 104 and 111, thus relieving the pressure on clutch 11 and making direct drive through shaft 13 ineffective while leaving the pressure through conduit 104 to clutch 12 uninterrupted so that, although the drive through the direct coupling of the synchronizer collar 28 to the gear 22 is not disturbed, it is now effective through the sleeve 14 and the gear reduction of the gears 15, 16 and gears 23, 22.

It will be seen from the foregoing that under normal driving conditions and during the major period of operation of a vehicle equipped with a transmission constructed in accordance with the present invention, the synchronizer sleeve 28 will remain shifted to the left (Fig. 1) to couple gear 22 to the output shaft 21 of the transmission to establish direct drive with both clutches 11 and 12 in engagement; third gear being established, as above described, by the operator depressing the accelerator pedal 100 to cause the pilot valve 152 for the third gear clutch to be depressed, thus interrupting the flow of fluid to the clutch pistons 46 for clutch 11. Should the speed of the car decrease, as a result of the driver raising his foot off the accelerator pedal thereby permitting the pressure control valve 85 to rise and as the pilot valves 89 and 90 will drop due to the action of governor weights 78, the flow of fluid through conduit 113 to the synchronizer interlock valve 92 will be interrupted by the lowering of pilot valve 90. As the pressure control valve 85 rises, it will cut off the flow of fluid through conduits 104 and 111 to both sets of clutch pistons 45 and 46. The release of the pressure in conduit 113 by the lowering of the pilot valve 90 relieves the pressure on the top of the synchronizer valve 87 and cuts off the flow of fluid to the synchronizer piston 88, thus permitting the springs 88-a and 88-b to move the synchronizer piston to the right, thereby carrying the synchronizer fork 24 and synchronizer collar 28 back to the neutral position, as shown in Fig. 2 of the drawings. The movement of the synchronizer fork and collar 28 back to neutral position also moves the interlock valve to the position shown in Fig. 2, in which position the interlock valve again establishes communication between conduits 113 and 113-b, and all of the valves occupy the positions in which they are shown in Fig. 2. First gear drive will then be re-established by the operator depressing the pedal to first move the pressure control valve down and re-establish first gear drive, as hereinbefore described; second gear drive being re-established as the vehicle again regains speed and causes the governor to open pilot valve 89 and re-establish second gear drive.

It will be noted that when the car is accelerating, the synchronizer piston 88 will not be moved to shift the synchronizer collar 28 as long as fluid under pressure is being delivered through conduit 111 to the clutch piston 46.

The modification of the automatic fluid pressure transmission shown in Figs. 9 and 10 is generally similar in operation to the transmission described above but includes a number of important differences in construction and operation. With regard to the transmission proper, the most important constructional modifications include the following: A solid gear 300 is rotatably journaled on the output shaft 301 by means of a sleeve bearing 302, instead of the overriding clutch type of gear 19 keyed to the output shaft as shown in Fig. 1. The synchronizer collar 303-a is normally held by spring means in an extreme right hand position so as to engage the jaw teeth 304 of the gear 300, instead of in a neutral position, and first and second gear drives are thus effected through the synchronizer unit 303 which is keyed to the output shaft 301. First and third gear clutch member 305 is engaged by means of fluid pressure within a diaphragm 306 moving pressure plate 307 through a plate 308 associated with the diaphragm member 306, and in a similar manner second and fourth gear clutch member 309 is engaged by fluid pressure introduced into a diaphragm 310 which transmits movement to pressure plate 311 by means of plate 312 and bolts 313, instead of by the piston and lever arrangement shown in Fig. 1. The influence of engine speed in effecting engagement of the first and third gear clutch is accomplished through the use of a centrifugal valve 314 held with a pressure proportional to the speed of the engine in closing position over an exhaust port 315 associated with the diaphragm 306, instead of by the weight and lever means shown in Fig. 1.

With respect to the modified fluid pressure control system shown in Fig. 10, the principal differences include cam means for transmitting motion from the accelerator to the throttle, main pressure control valve and floating levers; a different arrangement for effecting manual second gear drive; a different type of interlock valve; an additional timing valve; and additional relay and quick release valves.

The construction and operation of the modified control system and transmission proper may readily be seen by briefly following through such operation under typical driving conditions.

When the engine is started the engine driven pump 316 introduces fluid under pressure to main and branch supply conduits 317 and 318. When a predetermined pressure is reached, for example eighty pounds per square inch, the by-pass valve 319 is moved to the left admitting fluid to conduit 320 which leads to the first and third gear clutch diaphragm 306, schematically shown in Fig. 10 as a piston for purposes of convenience. Such fluid initially escapes through the exhaust port associated with the centrifugal valve 314 since such valve is lightly held in closing position by the relatively slow speed of the idling motor. Such fluid may also escape by moving the relay valve 321 to the right against the light spring pressure of spring 322, thereby uncovering an exhaust conduit 323.

When the accelerator is depressed, rod 324 is moved to the right rotating the cam member 325 in a clockwise direction, thereby causing one of the cam faces 326 to open the throttle 327 through actuation of the bellcrank member 328 which compresses the spring 329 moving rod 330 and throttle lever 331 against the tension of spring 332. The other cam face 333 simultaneously moves rod 334 to the right rotating the bellcrank arm 335, thereby depressing the pressure control valve 336 through compression spring 337 and admitting fluid under pressure from supply conduit 317 to conduit 338. Such fluid passing into branch conduit 339 actuates plunger 340 closing the pressure control valve 336 when the pressure of the fluid admitted to conduit 338 balances the force of compression spring 337, thereby permitting the amount of pressure admitted to conduit 338 to be controlled by the extent of accelerator depression. The fluid pressure in conduit 338 assists the relay spring 322 in moving the relay valve 321 to the left closing off exhaust conduit 323 and the increased engine speed resulting from the opening of the throttle causes the centrifugal valve 314 to block with greater force the flow of fluid through such valve. The combined effect of closing the exhaust conduits associated with the relay and centrifugal valves builds up pressure in conduit 320 and the first and third gear clutch diaphragm 306. The pressure available to actuate such diaphragm is limited, for example to 85 pounds per square inch, by the safety valve 341 communicating with an exhaust port 342.

The manner in which fluid is admitted from conduit 320 to the first and third gear clutch diaphragm 306 and the operation of the centrifugal valve 314 may be more clearly seen from a detailed examination of Fig. 9. The diaphragms 306 and 310 are seated in a diaphragm plate 343 having a hub 344 piloted to first and third gear sleeve 345 upon bearings 346 and 347. Sleeve 345 is in turn supported in its right hand end by the ball bearing 348. The diaphragm plate 343 is connected to and driven by the central driving plate 349 through a plurality of circumferentially spaced bolts 350 and through clutch cover 351 riveted to the diaphragm plate 343 as at 352. The rotating hub 344 of the diaphragm plate 343 is provided with annular grooves 353 and 354 and rotates within a cylindrical bore 355 in a stationary housing 356. These grooves are separated and sealed by piston rings 357. A longitudinal duct 358 communicating with the annular groove 353 transmits oil under pressure to diaphragm 306. This diaphragm communicates with the exhaust port 315 and centrifugal valve 314 which are located in the diaphragm plate 343. A similar duct 359 leads from annular groove 354 to the diaphragm 310 for actuating second and fourth gear clutch 309. It will be noted that the centrifugal valve 314 is associated only with the diaphragm 306 for the first and third gear clutch, the pressure in the diaphragm 310 for second and fourth gear clutch being governed by the combined effect of throttle position and vehicle speed as hereinafter more fully described.

In a manner similar to the transmission shown in Fig. 1, the first and third gear clutch transmits first gear drive through sleeve 345 to gear 360, overriding gear 361, countershaft 362, longitudinally shiftable gear 363, solid gear 300, jaw teeth 304, synchronizer collar 303-a, and synchronizer unit 303 to the output shaft 301.

It is to be noted that the pressure of engagement of the first and third gear clutch 305 is determined by the lower resistance of the centrifugal valve 314 or the relay valve 321 to the escape of fluid delivered under pressure to conduit 320. When the engine is idling at normal idling speed with the accelerator released, neither the centrifugal valve 314 nor the relay valve 321 offer sufficient resistance to permit the pressure in diaphragm 306 to overcome the clutch release spring (not shown) and no clutch pressure is exerted whatever. If the engine is idled at high speed as in cold weather, the relay valve 321 will always be effective to prevent clutch application while the accelerator is released. If the accelerator is fully depressed to wide open throttle position, the pressure control valve 336 will admit the full pressure in conduit 317 into conduit 338 and the relay valve 321 will thus offer a resistance equal to such pressure plus the effective light pressure of spring 322. This will far exceed the initial resistance of the centrifugal valve 314 which latter valve will thus control the clutch engagement pressure during acceleration in first gear. Under wide open throttle the engine will accelerate rapidly and when it reaches a predetermined speed, e. g., 600 R. P. M., the pressure in diaphragm 306 will overcome the clutch release spring and the clutch 305 will begin to drive the vehicle. As the engine continues to accelerate, the clutch application pressure is increased in accordance with engine speed, positive drive being established as soon as the sleeve 345 reaches the speed of the engine. At an engine speed above that at which positive drive is normally established, e. g., 1,200 R. P. M., the resistive force of the centrifugal valve 314 becomes greater than that of relay valve 321 and the clutch application pressure is thereafter limited by the relay valve 321, together with the safety valve 341.

In starting the vehicle with the accelerator depressed to intermediate positions, the resistive force of the relay valve 321 is likewise normally somewhat greater than that of the centrifugal valve 314 until somewhat after positive drive is established so that first gear clutch application pressure normally is a function of engine speed whether acceleration takes place under full, intermediate, or gradually increasing throttle opening.

The second gear drive is effected when the clutch pilot valve 364 is depressed under the combined influence of accelerator position and vehicle speed, to be hereinafter more fully described, to a position where fluid pressure in conduit 317 and branch conduit 365 may pass to conduit 366 raising the second and fourth gear clutch valve 367 against the pressure of spring 368, thereby admitting fluid from conduit 338 to pass through the necked portion of the second and fourth gear clutch valve 367 into conduit 369 through the jet valve 370 into conduit 371, through the exhaust valve 372 and into the diaphragm 310 for the second and fourth gear clutch 309. The fluid under pressure gradually admitted by the jet valve 370 into such diaphragm causes gradual engagement of clutch 309 and the transmission of torque through drive shaft 373, gears 374 and 375 and countershaft 362, longitudinally shiftable gear 363, solid gear 300, jaw teeth 304 and synchronizer unit 303 to the output shaft 301.

First and third gear clutch 305 remains engaged and the relatively slow rotation of gear 361 is permitted through the overriding roller construction of such gear as indicated at 376. The downward movement of clutch pilot valve 364 is actuated by a floating lever 377 connected at the right hand end to a speed governor 378 mounted on the output shaft, as shown in Fig. 9, and schematically shown in Fig. 10. With increased vehicle speed the governor 378 moves the right hand end of floating lever 377 down to the point where the hub 379 of the pivot connection contacts detent spring 380 which temporarily arrests downward movement of the clutch pilot valve 364 acting as a fulcrum to cause pivotal movement of the floating lever 377. As the vehicle speed continues to increase and the right hand end of floating lever 377 is lowered still further, the left hand end of the lever will normally contact the throttle shift stop 381 after which time further downward movement of the right hand end of the floating lever 377 will cause the hub 379 to approach the center point of detent 380 and the clutch pilot valve 364 will thereupon snap into open position. The position of the throttle shift stop 381 is determined by the bellcrank member 382 which is in turn actuated by an extension 383 of the rod 334 after the accelerator has been depressed past a certain predetermined point. Up to a certain predetermined throttle opening, the vehicle speed at which a shift from first gear to second gear will take place is thus controlled by the accelerator position. Beyond such point, however, a fixed shift stop 384 will limit the upward movement of the floating lever 377 causing a shift from first to second gear regardless of the accelerator position and extent of throttle opening.

If, after first or second gear drive has been effected, the accelerator is released, the pressure control valve 336 will be moved to exhaust position by fluid pressure acting against plunger 340 whereupon first and third gear clutch will be released by the exhausting of pressure through the relay exhaust port 323 and second and fourth gear clutch will be released by a flow of fluid through check valve 385 by-passing the jet valve 370 and back through the second and fourth gear clutch valve 367, thereby permitting the vehicle to travel in a free wheeling manner.

If, while the vehicle is traveling in second gear drive and the accelerator remains depressed, the vehicle slows down as in ascending a hill, to the point where the governor 378 raises the floating lever 377 past the lower side of detent spring 380, the clutch pilot valve 364 will snap upwards to closed position whereupon fluid pressure in conduit 366 will be exhausted and the spring 368 will move the second and fourth gear clutch valve 367 to closed position. This will permit fluid under pressure in the second and fourth gear clutch diaphragm 310 and conduit 371 to flow back through the check valve 385, conduit 369 and exhaust conduit 386 to the release control valve 387. During the initial period of discharge the release control valve 387 will be forced downward against the spring 388 to permit rapid discharge through the exhaust port 389 opened by such downward movement. As the clutch actuating pressure is reduced, the spring 388 will return the release control valve to its normal position closing off the main exhaust port whereupon the remaining pressure will be gradually dissipated through a restricted jet exhaust port 390. This action of the release control valve permits a rapid discharge of fluid pressure to the point where the second and fourth gear just begins to slip and a gradual further release of pressure permitting the drive to be smoothly transferred from second to first gear. If the pressure were permitted to be released suddenly, an objectionable jerk would be encountered when the drive was transferred to the overriding gear 361.

The vehicle speed at which such shift from second to first gear takes place will normally be influenced by the accelerator position since the left hand end of the floating lever 377 will normally contact throttle shift stop 391 before the hub 379 is raised past the detent spring 380. However, when the accelerator is depressed to less than a predetermined minimum extent, the left hand end of the floating lever 377 will contact fixed shift stop 392 regardless of the accelerator position.

It is to be noted that if the accelerator is released when the vehicle is in second gear drive and the speed of the vehicle becomes reduced to the point where clutch pilot valve 364 is raised to closed position, subsequent depression of the accelerator will result in the engagement of first gear drive rather than second.

Under the combined influence of throttle position and vehicle speed, the modified transmission will normally shift directly from second gear drive to fourth gear drive through a shift in the synchronizer unit 303 to left hand position in a manner similar to the transmission shown in Fig. 1. With both clutches engaged, direct drive is then transmitted through drive shaft 373, gear 374, jaw teeth 393, synchronizer unit 303 and output shaft 301. The gear train 360, 361, 362, 363, 300 continues to be driven during fourth gear drive, gear 300 now being free to rotate independently of the synchronizer unit.

The modified fluid pressure control system for shifting from second to fourth gear drive includes a number of important changes from the first system described. The shift from second to fourth gear is initiated by the downward movement of the synchronizer pilot valve 394 in response to the downward movement of the right hand end of floating lever 395 which is connected to the governor 378. When such downward movement has brought the hub 396 of the pivot connection into contact with detent spring 397, the left hand end of floating lever 395 moves upwardly to normally contact the upper stop corresponding to stop 381 and located directly behind it in the plane of the drawing, or else a fixed shift stop corresponding to stop 384 in the event that the throttle is opened beyond a predetermined extent. Further downward movement of the right hand end of floating lever 395 will move the hub 396 past the detent spring 397 causing the synchronizer pilot piston to snap into open position. Fluid under pressure from conduit 365 will then pass through the necked portion of the synchronizer pilot piston 394, conduit 398, the necked portion of the manual second valve 399, conduit 400 to the top of the synchro valve 401 tending to move the synchro valve downward to open position against the forcing spring 402. Such immediate movement will be prevented, however, by the detent member 403 which will have been moved to right hand position, engaging the lower groove 404 in the synchro valve, by the upward movement of the detent plunger 405 against the action of spring 406 in response to the introduction of second and fourth gear clutch engaging fluid pressure in conduit 371. Fluid under pressure from conduit 400 will also enter branch conduit 407 moving the interlock valve 408 to the left against the action of spring 409 for a distance equal to the space between the left hand end of stop 410 and the adjacent surface 411 of the synchro fork yoke 412. With the interlock valve in this position, fluid under pressure in branch conduit 413 will be permitted to pass into conduit 414 and its branch conduit 415. Fluid pressure in these conduits will cause both clutches to be released, the throttle to be closed and the synchronizer unit shifted to its third and fourth gear position as follows:

Pressure in conduit 414 moves the quick release valve 372 downward against the action of spring 416 to a position which will permit the fluid pressure in the second and fourth gear clutch diaphragm 310 to pass through the exhaust port 417 opened by the downward movement of such valve. At the same time, fluid pressure in conduit 415 passes to the lower end of the main pressure control valve 336 raising such valve to exhaust position against the action of spring 337. This permits the fluid pressure in the first and third gear clutch diaphragm 306 and conduit 320 to move the relay valve 321 to the right thereby opening the exhaust conduit 323. As the fluid pressure in conduit 371 is released, the pressure in branch conduit 418 which had held the timing valve 419 in closed right hand position against the action of spring 420 is likewise released permitting spring 420 to move the valve to its open left hand position, thereby admitting fluid under pressure from conduit 414 to actuate the throttle closer piston 421 which in turn moves the left hand end of lever 422 and rod 330 downward against the action of spring 329 thereby closing the throttle. While such action and the resultant increased spring pressure in spring 325 tend to rotate the bellcrank member 328 backwards, the positioning of such bellcrank member with relation to the cam surface 326 and the pivot point of the cam 423 are such as to provide irreversible action between the bellcrank member 328 and the cam 325 so that any unpleasant impulse which might otherwise be transmitted back to the accelerator by the automatic closing of the throttle is completely avoided.

The release of pressure in conduit 371 also causes spring 406 to return the detent plunger 405 to its downward position where it will permit the detent 403 to be moved to the left by the force of the synchro valve 401 moving downward against the action of spring 402 under the fluid pressure which is still effective at the top end of the valve. With the synchro valve 401 in its lower position, fluid under pressure from conduit 318 passes by the necked portion of the synchro valve 401 into conduit 424 and the chamber at the right hand end of the synchro piston 425, thereby moving such piston against the pressure of a heavy spring 426 which is seated at its left hand end against a fixed washer 427. Movement of the synchro piston 425 to the left compresses a somewhat lighter spring 428 which bears against the washer 429 causing such washer to engage the shoulder 430 of the synchro rail 431, thereby transmitting a force equal to the compression in spring 428 to the synchro fork 432 tending to move the synchro collar 303-a to its left hand position for third and fourth gear drive.

In order to prevent any possibility of clashing in the automatic shifting of the synchronizer unit, it has been found desirable to provide means in addition to the normal blocking teeth to assure synchronization. As most clearly shown in Fig. 5, a detent recess 486 in the teeth of the collar 210, a detent 487 and spring 488 seated in the hub member 208 for urging the detent into the recess are provided in the synchronizer unit. The interaction of such detent with the synchronizer collar 210 causes the initial movement of the collar 210 toward an engaging position to impart a longitudinal movement to the hub 208 urging it against the friction cone 489 and in turn urging the conical surfaces 490 into frictional engagement. This has the effect of producing an initial synchronizing effort as well as setting the blocking teeth 211 before such blocking teeth are contacted by the collar 210. By relating the strength of the spring 488 with that of the spring 426 (see Fig. 10), which latter spring determines the initial force with which the synchronizer collar is moved, in a manner such that the compression of spring 429 does not create a sufficient force to disengage the detent 487 from the detent recess 486, the initial synchronizing effort will continue during the period when the spring 428 is being compressed. Further movement of the synchro piston 425 will then move the collar against the blocking teeth producing a final synchronizing effort. As the collar teeth move through the blocking teeth, the detent is disengaged from the recess and the compressive force in spring 428 thereupon snaps the collar into engagement with the jaw teeth of the adjacent gear.

Upon release of the fluid pressure to the right of the synchro piston 425, the heavy spring 426 returns such piston to its right hand position, the washer 434 engaging the washer 429 during such backward travel and thereby causing compression in spring 428 to move washer 435 against the shoulder 436 of the synchro rail 431 which in turn moves the synchro fork 432 and synchro collar 303-a to its right hand position.

Movement of the synchro fork 432 to its left hand position permits the fluid under pressure in conduit 407 to move the interlock valve 408 to its extreme left hand position where its center portion 437 will block off conduit 413 and where the fluid under pressure in conduits 414 and 415 will be permitted to pass through exhaust port 438. This will permit spring 416 to return the quick release valve 417 to its normal position and spring 337 to return the pressure control valve 336 to its former position admitting fluid under pressure from conduit 317 to re-enter conduit 338 moving the relay valve 321 to its exhaust blocking position whereupon pressure may again be built up in conduit 320 and the first and third gear clutch actuating diaphragm 306. Second and fourth gear clutch 309 will likewise be re-engaged by fluid pressure passing through the second and fourth gear clutch valve 367, conduit 369 and the jet valve 370 which is now in its left hand position due to fluid pressure admitted to conduit 439 upon the synchro valve 401 being moved to its open position. This permits the fluid to pass by the necked portion of the jet valve 370 from both of the restricted conduits 440 and 441. Such provision is made since it is desirable to have the second and fourth gear clutch 309 re-engaged more rapidly after the shift to fourth gear than in the case of its initial engagement to effect second gear drive. With both clutches 305, 309 re-engaged and the sychronizer unit 303 in left hand position, fourth gear drive is effected.

The construction of the interlock valve 408 and associated parts is coordinated with the synchronizer unit in a manner such as to prevent restoration of clutch pressure until the collar teeth have engaged the jaw teeth of the adjacent gear.

The re-establishment of fluid pressure in conduit 371 again raises the detent plunger 405 against spring 406 moving the detent 403 to the right causing it to this time engage with the upper groove 442 locking the synchro valve 401 in its open position.

The release of pressure in conduit 414 also permits spring 329 to return the throttle closer piston to its initial position and to re-open the throttle. It has been found desirable, in order to effect prompt smooth shifts, to re-open the throttle somewhat more slowly than it is closed and to accomplish this, two ports 443 and 444 are used in admitting fluid under pressure to actuate the throttle closer piston 421, the check valve 445 blocking port 444 to the outward flow of fluid thus permitting the throttle to be re-opened more gradually than it is closed.

Fluid pressure in conduit 418 again moves the timing valve to the right blocking off conduit 414 and re-opening the exhaust port 446 to permit the complete release of any fluid which may not have been exhausted through conduit 414.

The purpose of the timing valve is to make sure that the closing and re-opening of the throttle is effected in proper timed relation to the operation of the clutches. This is accomplished by relating the strength of the spring 420 to the clutch actuating pressure for the second and fourth gear diaphragm 310 in a manner giving maximum smoothness of operation.

While the normal progression of gear shifts is from first to second to fourth gear drive, if, at the time the synchronizer pilot valve 394 is lowered to start an upward shift from second gear, the accelerator is depressed to fully or nearly fully open throttle position, pilot valve 472 will be moved upward to open position by means of the lower throttle shift stop 448 raising the lever 449 past the detent spring 450. With pilot valve 472 in its upward position, fluid pressure from conduit 400 will flow through conduit 451, the necked portion of pilot valve 472 and conduit 452 to the chamber above the second and fourth gear clutch valve 367, thereby permitting spring 368 to move such valve to its closed position, thus preventing the re-engagement of the second and fourth gear clutch 309 and causing third gear drive to be established. As the speed of the vehicle increases in third gear and the governor 378 lowers floating lever 395, stop 453 will move the right hand end of lever 449 downwards against the action of spring 454 finally moving pilot valve 472 to its exhaust position permitting the pressure above the second and fourth gear clutch valve 367 to be released thereby effecting the upward movement of such valve and the shift from third to fourth gear by the engagement of the second and fourth gear clutch 309.

In a similar manner a downshift from fourth to third gear drive may be effected by opening the throttle and raising pilot valve 472 to its upper position. Such shift to third gear is, however, limited to a predetermined maximum vehicle speed by the action of stop 453 on the right hand end of lever 449 in order to avoid dangerously high engine speeds.

Downshifts from fourth or third gear drive to second gear drive will be effected when the hub 396 of the floating lever 395 is raised past the detent spring 397 by the combined action of the governor 378 under the influence of reduced vehicle speed and the lower stop corresponding to stop 391 associated with lever 395 under the influence of throttle position (or by the action of the fixed stop corresponding to stop 392 associated with lever 395 for throttle openings under a predetermined minimum). The action of raising the synchronizer pilot piston 394 results in the exhausting through exhaust port 455 of fluid pressure from conduit 400 and branch conduit 407. With the fluid pressure released from the right hand end of the interlock valve 408, spring 409 will move the valve to an intermediate position where the center portion 437 of such valve will be just to the right of conduit 414 permitting fluid under pressure from conduit 413 to enter conduits 414 and 415 causing the clutches to be released and the throttle closed in a manner previously described. Due to the release of the fluid pressure from the top of the synchro valve 401, the spring 402 will move the valve upwards to exhaust position as soon as the pressure in conduit 371 has been released permitting the plunger 405 to be moved downward by spring 406 to the position where the detent 403 may again be moved to the left unlocking the synchro valve 401. Upon the exhausting of fluid pressure from conduit 424, the heavy spring 426 will move the synchro piston 425 back to its right hand position thereby causing the synchronizer collar 433 to be shifted to the right, as previously described, engaging the jaw teeth 304 of gear 300.

In the absence of fluid pressure on the right hand end of the interlock valve 408, movement of the synchro fork 432 to the right and the action of spring 409 will return the interlock valve 408 to its extreme right hand position, as shown in Fig. 10, whereupon fluid pressure from conduit 413 will again be blocked and fluid pressure in conduit 414 and 415 permitted to exhaust through exhaust port 438, thereby again permitting re-engagement of the clutches and re-opening of the throttle in a manner previously described.

The action of the anti-free wheel piston 456 in maintaining clutch engagement in third and fourth gear drives when the accelerator is momentarily released is similar to that described in connection with the control system shown in Fig. 2.

Manual second gear drive may be established when it is desired to shift from third or fourth gear to second gear for extremely fast acceleration; when it is desired to hold the vehicle in second gear drive for a longer period than is possible with the automatic control system; when it is desired to use the engine as a brake in second gear drive as in descending steep hills; or when it is desired to have the output shaft drive the engine in second gear for starting the vehicle by pushing or towing. Subject to certain safety limitations to be hereinafter described, second gear drive may be established under any of the above conditions entirely by fluid pressure means actuated by movement of the manual second gear knob 457 to the right. Such movement acting through bellcrank 458 raises rod 459 and the right hand end of lever 460, and lowers the left hand end of such lever. This movement permits the compression in spring 461 to actuate lever 462 which in turn moves the pivot hub 463 of lever 464 downward past the center of detent spring 465, thereby moving the manual second valve 399 downward to its lower position blocking off conduit 398 and connecting conduit 400 with the exhaust port 466. With the manual second valve in this position and the vehicle in third or fourth gear drive, the synchronizer unit 303 will be shifted to its right hand position and second gear drive established in a manner the same as if the synchronizer pilot valve 394 were raised to its upper position. If the vehicle is traveling in first or second gear drive when the manual second valve 399 is lowered, a subsequent lowering of the synchronizer pilot valve 394 through the action of the floating lever 395 will be ineffective and the vehicle will remain in second gear drive. The rod 467 connected to the right hand end of lever 395 will prevent the manual shifting from third or fourth to second gear drive, when the vehicle is traveling above a predetermined speed by resisting the force in spring 461 tending to actuate lever 427. It is to be noted, however, that such limiting means will not be operative to cause an upward shift from second to third or fourth gear drive while the manual second gear knob 457 is in its right hand position, since the only means of raising the lever 464 and the manual second valve 399 is through the upward contact of the left hand end of the lever 460 with lever 464. Thus, while shifts from fourth or third to second gear drive at vehicle speeds that might cause the engine to be driven at a dangerous speed are prevented, it is possible once having established manual second gear drive to maintain such drive throughout any period desired.

When manual second gear drive has been established, clutch engagement is maintained, even though the accelerator be released, by means of a stop 468 on the left hand end of the manual second gear rod 469 which engages bellcrank member 335 and holds the pressure control valve 336 in a clutch actuating position through spring 337.

It may be seen from the above description that the construction of the synchronizer pilot valve 90 shown in Fig. 4 to avoid hunting of the throttle closer piston 91 is not required in the modified system due to the snap movement imparted to the synchronizer pilot valve 394 by the detent spring 397 as well as the modified construction of the interlock valve 408. The addition of the quick release valve 417 and relay valve 321 in the respective clutch actuating conduits operates to provide more rapid release of the clutches during automatic shifts requiring movement of the synchronizer unit, and the addition of the timing valve 419 and detent plunger 405 provide increased control and smoothness for such shifts. The modified construction of the interlock valve 408 and connecting conduits and the provision of two end and two intermediate positions for such valve makes it possible to close the throttle by fluid pressure means during downshifts as well as upshifts, thereby eliminating necessity of the spark interrupting means shown in Fig. 2. Since the synchronizer unit 303 in the modified transmission is normally held by a spring means in its right hand position engaging the jaw teeth 304 of gear 300 instead of being normally held in an intermediate position as in the first construction, there is no necessity in the modified construction for providing a manual means for shifting the synchronizer unit to its right hand position in order to effect a positive engine braking second speed gear train, such drive being effected entirely by fluid pressure means upon moving the manual second gear knob 457 to its right hand position as above described.

A number of specific problems in addition to those already referred to above have been encountered and overcome in the development of the present transmission. A review of certain of such problems together with the manner in which they have been answered will serve to point out more clearly some of the features which are believed to constitute a substantial contribution toward the development of a completely satisfactory automatic transmission.

One of the foremost problems in an automatic transmission of the step type where progressive shifts are required is that of properly regulated clutch engagement. This problem is particularly acute for the lowest gear which is used in starting a vehicle from a standstill. While centrifugally actuated clutch means responsive to engine speed is an effective method of obtaining a smooth properly regulated starting clutch engagement under normal conditions, a number of distinct disadvantages would attend the use of such means alone. As already noted, the problem of high idling devices operative when the engine is cold to increase the idling speed would tend to cause creeping in low gear when the accelerator is released with the gear shift set for forward operation. In addition, when the transmission is in neutral position, such a centrifugally operated clutch would tend to rotate the free gears between the clutch and the neutral gear during high idling periods which would cause clashing of gears upon an attempt to shift into forward. Another problem incident to the use of centrifugal clutch means alone is that of clutch slippage while the vehicle is traveling in high gear at low engine speeds which would result in excessive wear to the clutch members.

On the other hand, it has been found that the use of a low gear clutch where the clutch engaging pressure is regulated in response to throttle position alone, or other means of a similar nature, is not satisfactory to produce sufficiently smooth clutch engagement for low gear starting drive.

However, the combination of clutch pressure regulating means for low gear drive used in the present case has proved highly satisfactory in overcoming the limitations incident to the use of either means alone. Thus, the advantage of smooth engagement of the first gear clutch through the use of centrifugal means responsive to engine speed for modifying the clutch application pressure is retained, while high idling difficulties are overcome through the use of the pressure control valve actuated in response to throttle position. Upon starting the vehicle with the engine idling at an abnormally high speed, the first gear clutch engaging pressure is initially controlled by the pressure control valve which operates to reduce the engine speed to the point where the centrifugal means will control. Furthermore, the use of the pressure control valve in conjunction with a jet valve for regulating the pressure of the second and fourth gear clutch which operates independent of engine speed eliminates the problem of excessive clutch slippage in high gear at low engine speeds.

While the pressure control valve 336 is effective to prevent clutch engagement when the engine is idling at a high speed with the accelerator released, drivers may manually accelerate the engine in neutral, as in warming it up, just prior to shifting into forward gear. If the pressure control valve 336 were permitted to be actuated during such acceleration, clutch engagement and rotation of the free gears between the clutch and neutral gear would result. The momentum imparted to such gears would then cause them to continue to rotate for a short period after the accelerator is released during which period an attempt to shift into forward or reverse would cause a clashing of gears. In order to prevent such clutch engagement with the gear shift lever 480 in neutral position, as shown in Fig. 10, an arm 481 actuated by such lever is provided to arrest the movement of the bellcrank lever 335, and a lost motion connection 482 between the rod 334 and bellcrank lever 335 permits the accelerator to be depressed without actuating the pressure control valve 336. Movement of the gear shift lever to forward or reverse position rotates the arm 481 to a non-blocking position whereupon depression of the accelerator will actuate the pressure control valve as heretofore described.

A further tendency for the free gears between the clutches and the neutral gear to rotate when the gear shift is in neutral position results from the bearing drag between parts rotating at engine speed and the shafts piloted by such parts. In the transmission shown in Fig. 9, such drag occurs at the bearings 346, 347 as well as at the bearing 483 notwithstanding the complete release of the clutches. In order to prevent such drag from causing gear rotation, it has been found desirable to provide a resistive force to equalize such drag in addition to that inherently present in the bearing 348 and in the bearing between the countershaft 362 and its pilot shaft 484. Such additional resistive force is provided in the present case by the use of a spring 485 which urges the thrust rings 486 at the end of the countershaft 362 against such shaft.

Thus, by these various means, any pre-rotation of gears while the gearshift is in neutral, such as would result in gear clash upon shifting to an operative position, has been entirely eliminated.

Where, as in the present case, the accelerator position is effective to determine both the throttle opening and the pressure available for actuating each of the clutches, a problem in proper coordination of these two elements without undue length of accelerator travel arises. It is desirable that initial clutch application pressure be made available upon a relatively small depression of the accelerator, and conversely that release of clutch application pressure be made possible through the release of the accelerator through a relatively short distance. This is accomplished in the present case through the provision of a notch in the cam surface 333 which is effective upon an initial depression of the accelerator to move the rod 334 a substantial distance sufficient to make available desired clutch application pressure.

The coordination of throttle opening with clutch application pressure is essentially one of relating clutch pressure to engine torque. Since a given movement of the butterfly valve 327 while in a near closed position produces a much greater effect in changing the engine torque than an equal movement at a near open position, it is necessary that the rod 334 be moved a greater distance relative to a given movement of the butterfly valve 327 at near closed position than is required upon an equal movement of the butterfly valve at a more open position. The use of cam means in the linkage between the accelerator and throttle on one hand and throttle and pressure control valve on the other has made it possible to precisely coordinate these elements in the manner desired with marked improvement in the smoothness of clutch application under various critical driving conditions where the pressure control valve determines the clutch application pressure.

In the present case, certain downshifts are made through the release of one of the clutches (second and fourth gear clutch) permitting drive to be transferred to an overriding gear driven by another clutch (first and third) and the necessity of a controlled gradual release of clutch pressure has already been discussed.

While I have shown and described two satisfactory constructional examples of a transmission in accordance with the principles of the present invention, it will be understood that many changes, variations and modifications in the specific constructional details thereof may be resorted to without departing from the spirit of the invention as set forth in the claims hereunto appended.

The use of the term "source of fluid pressure" in such claims is intended to comprehend a source of pressure differential which may be either above or below atmospheric pressure.

I claim:

1. In a fluid pressure operated automatic transmission for a self-propelled vehicle having an engine, fluid pressure actuated gradually engageable coupling means, an output shaft and a plurality of power trains of different ratios interposed between said output shaft and said engine and adapted to be driven by said coupling means, a source of fluid pressure communicating with said fluid pressure actuated coupling means, a relay valve urged by the effective pressure available to actuate said coupling means to a position for reducing said effective pressure, a pressure control valve communicating with said source of pressure and with said relay valve, fluid pressure controlled by said pressure control valve operating to resist with variable force said movement of said relay valve, and means responsive to coupling pressure requirements for actuating said fluid pressure control valve.

2. In a fluid pressure operated automatic transmission for a self-propelled vehicle having an engine and a throttle, fluid pressure actuated gradually engageable coupling means, an output shaft and a plurality of power trains of different ratios interposed between said output shaft and said engine and adapted to be driven by said coupling means, a source of fluid pressure for actuating said coupling means, control means varying with throttle opening, a pressure control valve for regulating the pressure available for actuating said coupling means in response to variations in said control means, and fluid pressure means responsive to increasing vehicle speed for augmenting said regulated pressure, said last means including a pump driven in accordance with vehicle speed having an output communicating with said pressure control valve.

3. In a fluid pressure operated automatic transmission for a self-propelled vehicle having an engine, a throttle therefor and throttle actuating means, a pair of fluid pressure actuated gradually engageable couplings, an output shaft and a plurality of power trains of different ratios interposed between said output shaft and said engine and adapted to be selectively engaged by said couplings, means for establishing a source of fluid pressure, fluid pressure operated means for each of said couplings for effecting engagement thereof, a pressure control valve responsive to said throttle actuating means for governing the effective pressure available to actuate said couplings, a second valve interposed between said pressure control valve and the fluid pressure operated means for one of said couplings to control the effective pressure for actuating said latter means without disturbing the flow of fluid to the fluid pressure means for the other of said couplings, a speed governor, differential means responsive to said speed governor and throttle actuating means, and a pilot valve actuated by said differential means to control the movement of said second valve under the combined effect of governor speed and extent of throttle opening.

4. In a fluid pressure operated automatic transmission for a self-propelled vehicle having an engine, a throttle therefor and throttle actuating means, a pair of fluid pressure actuated clutches, a transmission gearing including an output shaft and a plurality of gear trains of different gear ratios interposed between said output shaft and said engine and adapted to be selectively driven by said clutches, means for establishing a source of fluid pressure, fluid pressure operated means for each of said clutches for effecting engagement thereof, conduits connecting said last-named means with said source of fluid pressure, a pressure control valve for governing the effective pressure available to actuate said clutches, a second valve interposed between said pressure control valve and the fluid pressure operated means for one of said clutches to control the effective pressure for actuating said latter means without disturbing the flow of fluid to the fluid pressure means for the other of said clutches, a speed governor driven in accordance with vehicle speed, a differential lever interposed between said speed governor and throttle actuating means and a pilot valve actuated by said differential lever to control the movement of said second valve under the combined effect of vehicle speed and extent of throttle opening.

5. In a fluid pressure operated automatic transmission for a self-propelled vehicle having an engine, means for maintaining a supply of fluid under pressure, a transmission gearing including an output shaft and driving connections interposed between said shaft and engine to effect first, second, third and fourth gear drives, a pair of clutches between said engine and transmission, one for first and third gear drives and the other for second and fourth gear drives, a shifting synchronizer gear unit, and fluid pressure actuating means therefor, a speed governor actuated by a rotating member, control means indicative of torque requirements, and an automatic fluid pressure control system operating under the combined effect of said speed governor and said control means for positioning said synchronizer unit to render first or third gear drive operative when one of said clutches is engaged and second or fourth gear drive effective when the other of said clutches is engaged.

6. In a fluid pressure operated automatic transmission for a self-propelled vehicle having an engine, a throttle therefor and throttle actuating means, means for maintaining a supply of fluid under pressure, a transmission gearing including an output shaft and driving connections interposed between said shaft and engine to effect first, second, third and fourth gear drives, a pair of clutches between said engine and transmission, one for first and third gear drives and the other for second and fourth gear drives, a shifting synchronizer gear unit, and fluid pressure actuating means therefor, a speed governor actuated in response to vehicle speed, and an automatic fluid pressure control system operating under the combined effect of vehicle speed and extent of throttle opening for positioning said synchronizer unit to render first or third gear drive operative when one of said clutches is engaged and second or fourth gear drive effective when the other of said clutches is engaged.

7. In a fluid pressure operated automatic transmission for a self-propelled vehicle having an engine, means for maintaining a supply of fluid under pressure, a transmission gearing including an output shaft and driving connections interposed between said shaft and engine to effect first, second, third and fourth gear drives, a pair of clutches between said engine and transmission, one for first and third gear drives and the other for second and fourth gear drives, separate fluid pressure operated means for actuating each of said clutches, a shiftable synchronizing gear unit having one position for effecting first and second gear drives, and another position for effecting third and fourth gear drives, fluid pressure actuated means for shifting said synchronizer unit, and an automatic fluid pressure control system for controlling the fluid pressure for shifting said synchronizer unit and for causing engagement of the respective clutches.

8. In a fluid pressure operated automatic transmission for a self-propelled vehicle having an engine, a throttle therefor and throttle actuating means, means for maintaining a supply of fluid under pressure, a transmission gearing including an output shaft and driving connections interposed between said shaft and engine to effect first, second, third and fourth gear drives, a pair of clutches between said engine and transmission, one for first and third gear drives and the other for second and fourth gear drives, separate fluid pressure operated means for actuating each of said clutches, a shiftable synchronizing gear unit having one position for effecting first and second gear drives, and another position for effecting third and fourth gear drives, fluid pressure actuated means for shifting said synchronizer unit, a speed governor driven by a rotating member, and an automatic fluid pressure control system operating under the combined effect of said speed governor and extent of throttle opening for controlling the fluid pressure for shifting said synchronizer unit and for causing engagement of the respective clutches.

9. A fluid pressure operated automatic transmission as set forth in claim 7 in which said control system includes a pressure control valve for controlling the effective pressure of fluid admitted to the fluid pressure actuated means for said clutches.

10. A fluid pressure operated automatic transmission as set forth in claim 7 in which said control system includes a pressure control valve for controlling the effective pressure of fluid admitted to the fluid pressure actuated means for said clutches, and a second valve interposed between said main valve and the fluid pressure actuated means for one of said clutches.

11. A fluid pressure operated automatic transmission as set forth in claim 7 in which said control system includes a conduit leading to said fluid pressure means for said first and third gear drive clutch, an engine throttle, throttle actuating means and a pressure control valve actuated by said throttle actuating means for regulating the effective pressure of fluid admitted to said conduit in accordance with the extent of the opening of said throttle.

12. A fluid pressure operated automatic transmission as set forth in claim 7 in which said control system includes a conduit leading to said fluid pressure means for said first and third gear drive clutch, an engine throttle, throttle actuating means and a pressure control valve actuated by said throttle actuating means for regulating the effective pressure of fluid admitted to said conduit in accordance with the extent of opening of said throttle, a separate conduit leading from said pressure control valve to the fluid pressure actuated means for said second and fourth gear drive clutch and a second valve interposed in said latter conduit.

13. A fluid pressure operated automatic transmission as set forth in claim 7 in which said control system includes a conduit leading to said fluid pressure means for said first and third gear drive clutch, an engine throttle, throttle actuating means a pressure control valve actuated by said throttle actuating means for regulating the effective pressure of fluid admitted to said conduit in accordance with the extent of opening of said throttle, a separate conduit leading from said pressure control valve to the fluid pressure actuated means for said second and fourth gear drive clutch, a second valve interposed in said latter conduit, and means responsive to vehicle speed and throttle position for automatically actuating said second valve to control the flow of fluid through said latter conduit.

14. A fluid pressure operated automatic transmission, as set forth in claim 7, in which said control system includes a conduit leading to said fluid pressure means for said first and third gear drive clutch, control means indicative of clutch pressure requirements, a pressure control valve actuated by said control means for regulating the effective pressure of fluid admitted to said conduit, a separate conduit leading from said pressure control valve to the fluid pressure actuated means for said second and fourth gear clutch, a second valve interposed in said latter conduit, and means to govern the rate of engagement of said clutch for second and fourth gear drives when said second valve is in a position for rendering effective clutch engaging pressure.

15. A fluid pressure operated automatic transmission, as set forth in claim 7, in which said control system includes a conduit leading to said fluid pressure means for said first and third gear drive clutch, control means indicative of clutch pressure requirements, a pressure control valve actuated by said control means for regulating the effective pressure of fluid admitted to said conduit, a separate conduit leading from said pressure control valve to the fluid pressure actuated means for said second and fourth clutch, a second valve interposed in said latter conduit, and means for automatically actuating said second valve to govern the flow of fluid through said latter conduit including a pilot valve for admitting fluid under pressure to said second valve to move it to a position for rendering effective clutch engaging pressure.

16. A fluid pressure operated automatic transmission as set forth in claim 8 in which said control system includes a conduit leading to said fluid pressure means for said first and third gear drive clutch, control means indicative of clutch pressure requirements, a pressure control valve actuated by said control means for regulating the effective pressure of fluid admitted to said conduit, a separate conduit leading from said pressure control valve to the fluid pressure actuated means for said second and fourth clutch, a second valve interposed in said latter conduit and means for automatically actuating said second valve to govern the flow of fluid through said latter conduit including a pilot valve, control means indicative of torque requirements, a differential lever, and connections therefrom to said latter control means and speed governor to cause said pilot valve to be actuated under the combined effect of said governor's speed and said latter control means.

17. A fluid pressure operated automatic transmission as set forth in claim 7 in which said control system includes control means indicative of clutch pressure requirements, a pressure control valve for regulating in accordance with control means the available fluid pressure for actuating the fluid pressure actuated means for said clutches and means responsive to engine speed for influencing the first gear drive clutch application pressure whereby first gear drive is rendered operative under the combined influence of said control means and engine speed when said synchronizer unit is in its initial position.

18. A fluid pressure operated automatic transmission as set forth in claim 7 in which said control system includes control means indicative of clutch pressure requirements, a pressure control valve for regulating in accordance with control means the available fluid pressure for actuating the fluid pressure actuated means for said clutches, and means responsive to engine speed for modifying said available pressure whereby first gear drive is rendered operative under the combined influence of said control means and engine speed when said synchronizer unit is in its initial position.

19. In a fluid pressure operated automatic trasmission for a self-propelled vehicle having an engine, a throttle therefor and throttle actuating means, fluid pressure actuated gradually engageable coupling means, an output shaft and a plurality of power trains of different ratios interposed between said output shaft and said engine and adapted to be engaged by said coupling means, a source of fluid pressure for actuating said coupling means, a pressure control valve for modifying the pressure available from said source of fluid pressure for actuating said coupling means in response to the opening of said throttle, and means responsive to engine speed for modifying the fluid pressure for actuating the lowest speed drive coupling means whereby said lowest speed drive is rendered operative under the combined influence of throttle opening and engine speed.

20. In a transmission for a self-propelled vehicle having an engine, a throttle therefor and throttle actuating means, means for maintaining a supply of fluid under pressure, fluid pressure actuated gradually engageable coupling means, an output shaft and a plurality of power trains of different ratios interposed between said output shaft and said engine and adapted to be engaged by said coupling means, control means responsive to said throttle actuating means for regulating the pressure available to actuate said coupling means, and means responsive to engine speed for limiting the effective application of said available pressure, said control means and engine speed responsive means being related in a manner whereby said latter means will normally determine the effective pressure of coupling engagement throughout the period in starting said vehicle from a standstill wherein low speed coupling slippage occurs, said control means being effective however to prevent said engine speed responsive means from actuating said coupling means while said engine is idling at an abnormally high speed and said throttle actuating means is released.

21. In a fluid pressure operated automatic transmission for a self-propelled vehicle having an engine, a throttle therefor and throttle actuating means, means for maintaining a supply of fluid under pressure, a transmission gearing including an output shaft and driving connections interposed between said shaft and engine to effect first, second, third and fourth gear drives, a pair of clutches between said engine and transmission, one for first and third gear drives and the other for second and fourth gear drives, a shiftable synchronizing gear unit having one position for effecting first and second gear drives and another position for effecting third and fourth gear drives, fluid pressure actuated means for shifting said synchronizer unit and an automatic fluid pressure control system operating under the combined effect of vehicle speed and extent of throttle opening for determining which of said clutches will be effective to transmit drive, said control system including a synchronizer valve actuated by said control system to render effective pressure operative to move said synchronizer unit to its operative position in which either third or fourth gear drive is rendered effective.

22. In a fluid pressure operated automatic transmission for a self-propelled vehicle having an engine, means for maintaining a supply of fluid under pressure, a transmission gearing including an output shaft and driving connections interposed between said shaft and engine to effect first, second, third and fourth gear drives, a pair of clutches between said engine and transmission, one for first and third gear drives and the other for second and fourth gear drives, separate fluid pressure operated means for actuating each of said clutches, a shiftable synchronizing gear unit having one position for effecting first and second gear drives, and another position for effecting third and fourth gear drives, fluid pressure actuated means for shifting said synchronizer unit, and an automatic fluid pressure control system for controlling the fluid pressure for shifting said synchronizer unit and for causing engagement of the respective clutches, said control system including a synchronizer valve to admit fluid under pressure to the fluid pressure means for said synchronizer unit to shift said unit to its operative position for effecting third or fourth gear drives.

23. In a fluid pressure operated automatic transmission for a self-propelled vehicle having an engine, a throttle therefor and throttle actuating means, means for maintaining a supply of fluid under pressure, a transmission gearing including an output shaft and driving connections interposed between said shaft and engine to effect first, second, third and fourth gear drives, a pair of clutches between said engine and transmission, one for first and third gear drives and the other for second and fourth gear drives, separate fluid pressure operated means for actuating each of said clutches, a shiftable synchronizing gear unit having one position for effecting first and second gear drives and another position for effecting third and fourth gear drives, fluid pressure actuated means for shifting said synchronizer unit and an automatic fluid pressure control system operating under the combined effect of vehicle speed and extent of throttle opening to cause engagement of one or the other of said clutches to effect first gear drive or second gear drive when said unit is in its initial position, said control system including a synchronizer valve to admit fluid under pressure to the fluid pressure means for said synchronizer unit to move said unit to its operative position in which either third and fourth gear drives are rendered effective and means for automatically effecting engagement of either of said clutches to render third or fourth gear drives operative.

24. In a fluid pressure operated automatic transmission for a self-propelled vehicle having an engine, means for maintaining a supply of fluid under pressure, a transmission gearing including an output shaft and driving connections interposed between said shaft and engine to effect first, second, third and fourth gear drives, a pair of clutches between said engine and transmission, one for first and third gear drives and the other for second and fourth gear drives, separate fluid pressure operated means for actuating each of said clutches, a shiftable synchronizing gear unit having one position for effecting first and second gear drives, and another position for effecting third and fourth gear drives, fluid pressure actuated means for shifting said synchronizer unit, and an automatic fluid pressure control system for controlling the fluid pressure for shifting said synchronizer unit and for causing engagement of the respective clutches, said control system including a synchronizer valve to admit fluid under pressure to the fluid pressure means for said synchronizer unit to shift said unit to its operative position for effecting third or fourth gear drives, and means for automatically effecting engagement of either of said clutches to render third or fourth gear drives operative.

25. In a fluid pressure operated automatic transmission for a self-propelled vehicle having an engine, a throttle therefor and throttle actuating means, means for maintaining a supply of fluid under pressure, a transmission gearing including an output shaft and driving connections interposed between said shaft and engine to effect first, second, third and fourth gear drives, a pair of clutches between said engine and transmission, one for first and third gear drives and the other for second and fourth gear drives, fluid pressure operated means for actuating said latter clutch, a shiftable synchronizing gear unit having one position for effecting first and second gear drives and another position for effecting third and fourth gear drives, fluid pressure actuated means for shifting said synchronizer unit and an automatic fluid pressure control system operating under the combined effect of vehicle speed and extent of throttle opening for determining which of said clutches will be effective to transmit first gear drive or second gear drive when said unit is in its initial position, said control system including a synchronizer valve to admit fluid under pressure to the fluid pressure means for said synchronizer unit to move said unit to its operative position in which third or fourth gear drives are rendered effective and a pilot valve for admitting fluid under pressure to actuate said synchronizer valve.

26. In a fluid pressure operated automatic transmission for a self-propelled vehicle having an engine, means for maintaining a supply of fluid under pressure, a transmission gearing including an output shaft and driving connections interposed between said shaft and engine to effect first, second, third and fourth gear drives, a pair of clutches between said engine and transmission, one for first and third gear drives, and the other for second and fourth gear drives, fluid pressure operated means for actuating said latter clutch, a shiftable synchronizing gear unit having one position for effecting first and second gear drives, and another position for effecting third and fourth gear drives, fluid pressure actuated means for shifting said synchronizer unit, and an automatic fluid pressure control system for controlling the fluid pressure for shifting said synchronizer unit and for determining which of said clutches will be effective to transmit drive, said control system including a synchronizer valve to admit fluid under pressure to the fluid pressure means for said synchronizer unit to shift said unit to its operative position for effecting third or fourth gear drives, and a pilot valve for admitting fluid under pressure to actuate said synchronizer valve.

27. In a fluid pressure operated automatic transmission for a self-propelled vehicle having an engine, means for maintaining a supply of fluid under pressure, an output shaft and a plurality of power trains between said shaft and engine, fluid pressure actuated gradually engageable coupling means and a shiftable synchronizer unit for selectively engaging the various power trains, fluid pressure actuated means for shifting said synchronizer unit and an automatic fluid pressure control system for causing said synchronizer unit to be shifted including a synchronizer valve to admit fluid under pressure to the fluid pressure means for shifting said synchronizer unit, and a pilot valve to admit fluid under pressure for actuating said synchronizer valve.

28. In a fluid pressure operated automatic transmission for a self-propelled vehicle having an engine, a throttle therefor and throttle actuating means, means for maintaining a supply of fluid under pressure, transmission gearing including an output shaft and a plurality of gear trains between said shaft and engine, fluid pressure actuated clutch means and a shiftable synchronizer unit for selectively engaging the various gear trains, fluid pressure actuated means for shifting said synchronizer unit and an automatic fluid pressure control system for causing said synchronizer unit to be shifted including a synchronizer valve to admit fluid under pressure to the fluid pressure means for shifting said synchronizer unit, and a pilot valve to admit fluid under pressure for actuating said synchronizer valve, said pilot valve being actuated under the combined effect of vehicle speed and extent of throttle opening.

29. In a fluid pressure operated automatic transmission for a self-propelled vehicle having an engine, means for maintaining a supply of fluid under pressure, transmission gearing including an output shaft and a plurality of gear trains between said shaft and engine, fluid pressure actuated clutch means and a shiftable synchronizer unit for selectively engaging the various gear trains, fluid pressure actuated means for shifting said synchronizer unit and an automatic fluid pressure control system for causing said synchronizer unit to be shifted including a synchronizer valve to admit fluid under pressure to the fluid pressure means for shifting said synchronizer unit, a pilot valve to admit fluid under pressure for actuating said synchronizer valve, a speed governor, control means indicative of torque requirements, a differential lever and connections therefrom to said speed governor, said control means and said pilot valve to cause the latter to be actuated under the combined effect of said governor's speed and said control means.

30. In a fluid pressure operated automatic transmission for a self-propelled vehicle having an engine, a throttle therefor and throttle actuating means, means for maintaining a supply of fluid under pressure, a transmission gearing including an output shaft and driving connections interposed between said shaft and engine to effect first, second, third and fourth gear drives, a speed governor actuated in response to vehicle speed, a pair of clutches between said engine and transmission, one for first and third gear drives and the other for second and fourth gear drives, fluid pressure operated means for actuating said latter clutch, a shiftable synchronizing gear unit having one position for effecting first and second gear drives and another position for effecting third and fourth gear drives, fluid pressure actuated means for shifting said synchronizer unit and an automatic fluid pressure control system operating under the combined effect of vehicle speed and extent of throttle opening for determining which of said clutches will be effective to transmit first gear drive or second gear drive when said unit is in its initial position, said control system including a synchronizer valve to admit fluid under pressure to the fluid pressure means for said synchronizer unit to actuate said unit to its operative position in which third or fourth gear drives are rendered effective, a pilot valve for admitting fluid under pressure to said synchronizer valve, a differential lever and connections therefrom to said speed governor, said throttle actuating means and said pilot valve to cause the latter to be actuated under the combined effect of vehicle speed and extent of throttle opening.

31. In a fluid pressure operated automatic transmission for a self-propelled vehicle having an engine, means for maintaining a supply of fluid under pressure, transmission gearing including an output shaft and a plurality of gear trains between said shaft and engine, fluid pressure actuated clutch means and a shiftable synchronizer unit for selectively engaging the various gear trains, fluid pressure actuated means for shifting said synchronizer unit and an automatic fluid pressure control system for causing said synchronizer unit to be shifted including a synchronizer valve to admit fluid under pressure to the fluid pressure means for shifting said synchronizer unit, a pilot valve to admit fluid under pressure for actuating said synchronizer valve, a speed governor, control means indicative of torque requirements, a differential lever and connections therefrom to said speed governor, said control means and said pilot valve to cause the latter to be actuated under the combined effect of said governor's speed and said control means, said connections including adjustable means for varying the point at which said combined effect will cause said synchronizer unit to be shifted.

32. In a fluid pressure operated automatic transmission for a self-propelled vehicle having an engine, means for maintaining a supply of fluid under pressure, transmission gearing including an output shaft and a plurality of gear trains between said shaft and engine, fluid pressure actuated clutch means and a shiftable synchronizer unit for selectively engaging the various gear trains, fluid pressure actuated means for shifting said synchronizer unit and an automatic fluid pressure control system for causing said synchronizer unit to be shifted including a synchronizer valve to admit fluid under pressure to the fluid pressure means for shifting said synchronizer unit, a pilot valve to admit fluid under pressure for actuating said synchronizer valve, a speed governor, control means indicative of torque requirements, a differential lever and connections therefrom to said speed governor, said control means and said pilot valve to cause the latter to be actuated under the combined effect of said governor's speed and said control means, said connections causing the respective opening and closing of said pilot valve to occur at different points in response to such combined effect.

33. In a fluid pressure operated automatic transmission for a self-propelled vehicle having an engine, a throttle therefor and throttle actuating means, means for maintaining a supply of fluid under pressure, transmission gearing including an output shaft and a plurality of gear trains between said shaft and engine, a fluid pressure operated control system for effecting gearshifts including a pilot valve, a speed governor, a differential lever and connections therefrom to said speed governor, said throttle actuating means and said pilot valve to cause the latter to be actuated under the combined effect of said governor's speed and extent of throttle opening, said connections causing the respective opening and closing of said pilot valve to occur at different points in response to such combined effect, fixed limit fulcrum points being provided for effecting opening and closing of said pilot valve independent of said throttle position.

34. In a fluid pressure operated automatic transmission for a self-propelled vehicle having an engine, a throttle therefor and throttle actuating means, means for maintaining a supply of fluid under pressure, an output shaft and a plurality of power trains between said shaft and engine, a fluid pressure operated control system for effecting shifts including a pilot valve, a speed governor driven by a rotating member, a differential lever being actuated at one point by said speed governor moving in response to changing speed, at another point by a lost motion connection with a member moving in response to movement of said throttle actuating means, and being connected at a third point to said pilot valve, and a detent member being provided to prevent movement of said pilot valve to an open or closed position until said lost motion is taken up and said lever is positively engaged by said member.

35. In a fluid pressure operated automatic transmission for a self-propelled vehicle having an engine, means for maintaining a supply of fluid under pressure, an output shaft and a plurality of power trains between said shaft and engine, a fluid pressure operated control system for effecting shifts including a pilot valve, a speed governor, a throttle and throttle actuating means, a differential lever and connections therefrom to said speed governor, said throttle actuating means and said pilot valve to cause the latter to be actuated under the combined effect of said governor's speed and said throttle position, said connections including adjustable means for varying the point at which said combined effect will cause said pilot valve to be actuated including means for preventing the actuation of said pilot valve to a position for engaging a higher speed train except by the momentary release of said throttle actuating means by the operator.

36. In a fluid pressure operated automatic transmission for a self-propelled vehicle having an engine, a throttle therefor and throttle actuating means, means for maintaining a supply of fluid under pressure, transmission gearing including an output shaft and a plurality of gear trains between said shaft and engine, fluid pressure actuated clutch means and a shiftable synchronizer unit for selectively engaging the various gear trains, fluid pressure actuated means for shifting said synchronizer unit and an automatic fluid pressure control system for causing said synchronizer unit to be shifted including a synchronizer valve to admit fluid under pressure to the fluid pressure means for shifting said synchronizer unit, and means for releasing the fluid pressure for actuating said clutch means and for closing said throttle while said synchronizer unit is being shifted to a new operative position.

37. In a fluid pressure operated automatic transmission for a self-propelled vehicle having an engine, a throttle therefor and throttle actuating means, means for maintaining a supply of fluid under pressure, transmission gearing including an output shaft and a plurality of gear trains between said shaft and engine, fluid pressure actuated clutch means and a shiftable synchronizer unit for selectively engaging the various gear trains, fluid pressure actuated means for shifting said synchronizer unit and an automatic fluid pressure control system for causing said synchronizer unit to be shifted including a synchronizer valve to admit fluid under pressure to the fluid pressure means for shifting said synchronizer unit, and automatic means for simultaneously releasing said clutch means and preventing the movement of said synchronizer valve until the release of said clutch means is effected.

38. In a fluid pressure operated automatic transmission for a self-propelled vehicle having an engine, a throttle therefor and throttle actuating means, means for maintaining a supply of fluid under pressure, transmission gearing including an output shaft and a plurality of gear trains between said shaft and engine, fluid pressure actuated clutch means and a shiftable synchronizer unit for selectively engaging the various gear trains, fluid pressure actuated means for shifting said synchronizer unit and an automatic fluid pressure control system for causing said synchronizer unit to be shifted including a synchronizer valve to admit fluid under pressure to the fluid pressure means for shifting said synchronizer unit, means for releasing the fluid pressure for actuating said clutch means and for closing said throttle while said synchronizer unit is being shifted to a new operative position, and automatic means for re-engaging said clutch means and reopening said throttle upon the shift of said synchronizer unit to a new operative position.

39. In a fluid pressure operated automatic transmission for a self-propelled vehicle having an engine, a throttle therefor and throttle actuating means, means for maintaining a supply of fluid under pressure, transmission gearing including an output shaft and a plurality of gear trains between said shaft and engine, fluid pressure actuated clutch means and a shiftable synchronizer unit for selectively engaging the various gear trains, fluid pressure actuated means for shifting said synchronizer unit, an automatic fluid pressure control system for causing said synchronizer unit to be shifted including means for momentarily closing said throttle while said synchronizer unit is being shifted to a new operative position.

40. In a fluid pressure operated automatic transmission for a self-propelled vehicle having an engine, a throttle therefor and throttle actuating means, means for maintaining a supply of fluid under pressure, transmission gearing including an output shaft and a plurality of gear trains between said shaft and engine, fluid pressure actuated clutch means and a shiftable synchronizer unit for selectively engaging the various gear trains, fluid pressure actuated means for shifting said synchronizer unit and an automatic fluid pressure control system for causing said synchronizer unit to be shifted including a synchronizer valve to admit fluid under pressure to the fluid pressure means for shifting said synchronizer unit, means for releasing the fluid pressure for actuating said clutch means and for closing said throttle while said synchronizer unit is being shifted to a new operative position, said means comprising a throttle closing device, valving which may be actuated to release the effective pressure for said clutch means, an interlock valve, and connecting passages whereby fluid pressure passing through said interlock valve actuates said throttle closing device and said valving for releasing effective pressure for said clutch means.

41. In a transmission for a self-propelled vehicle having an engine, a throttle therefor and throttle actuating means, an output shaft and a plurality of power trains between said shaft and engine, gradually engageable coupling means and a shiftable synchronizer unit for selectively engaging the various power trains, means for shifting said synchronizer unit, an automatic control system for causing said synchronizer unit to be shifted, including means for momentarily closing said throttle and releasing said coupling means while said synchronizer unit is being shifted to a new operative position.

42. In a fluid pressure operated automatic transmission for a self-propelled vehicle having an engine, a throttle therefor and throttle actuating means, means for maintaining a supply of fluid under pressure, an output shaft and a plurality of power trains between said shaft and engine, fluid pressure actuated gradually engageable coupling means and a shiftable synchronizer unit for selectively engaging the various power trains, fluid pressure actuated means for shifting said synchronizer unit, an automatic fluid pressure control system for causing said synchronizer unit to be shifted including means for momentarily closing said throttle while said synchronizer unit is being shifted to a new operative position, said means comprising a valve actuated in response to movement of said synchronizer unit, fluid pressure means for closing said throttle, a conduit leading to said fluid pressure means for supplying effective pressure for actuating said throttle closing means, said valve and conduit being arranged in a manner so as to permit effective pressure to be established during the movement of said synchronizer unit to a new operative position, and means for releasing said effective pressure from said fluid pressure means after said synchronizer unit has reached said new operative position.

43. In a fluid pressure operated automatic transmission for a self-propelled vehicle having an engine, a throttle therefor and throttle actuating means, means for maintaining a supply of fluid under pressure, transmission gearing including an output shaft and a plurality of gear trains between said shaft and engine, fluid pressure actuated clutch means and a shiftable synchronizer unit for selectively engaging the various gear trains, fluid pressure actuated means for shifting said synchronizer unit and an automatic fluid pressure control system for causing said synchronizer unit to be shifted including a synchronizer valve to admit fluid under pressure to the fluid pressure means for shifting said synchronizer unit, means for releasing the fluid pressure for actuating said clutch means and for closing said throttle while said synchronizer unit is being shifted to a new operative position, said means for releasing said clutch means and closing said throttle comprising a fluid pressure operated throttle closer piston, means connecting said piston to the throttle, a pressure control valve, an interlock valve, a conduit leading to said interlock valve, and conduits leading from said interlock valve to said throttle closer piston and to said pressure control valve, means responsive to vehicle speed and torque requirement indicating means for supplying said first-mentioned conduit with fluid pressure actuating said throttle closer piston and moving said pressure control valve to a position which blocks the fluid pressure supply to said clutch operating means and means for releasing the effective pressure therefrom.

44. In a fluid pressure operated automatic transmission as set forth in claim 43, wherein two separate fluid pressure actuated clutches are employed, said means for releasing pressure therefrom comprising pressure release means controlled by the movement of said pressure control valve, a pressure release valve communicating with the fluid pressure means for one of said clutches, a conduit leading from said interlock valve to said pressure release valve moving said latter valve to a release position when supplied with pressure responsive to the initiation of said synchronizer shift, a relay valve communicating with the fluid pressure means for the other clutch moving to a pressure release position upon movement of said pressure control valve to a position for effecting a pressure release.

45. In a fluid pressure operated automatic transmission for a self-propelled vehicle having an engine, a throttle therefor and throttle actuating means, means for maintaining a supply of fluid under pressure, transmission gearing including an output shaft and a plurality of gear trains between said shaft and engine, fluid pressure actuated clutch means and a shiftable synchronizer unit for selectively engaging the various gear trains, fluid pressure actuated means for shifting said synchronizer unit and an automatic fluid pressure control system for causing said synchronizer unit to be shifted including a synchronizer valve to admit fluid under pressure to the fluid pressure means for shifting said synchronizer unit, a pilot valve to admit fluid under pressure for actuating said synchronizer valve, and automatic means for simultaneously releasing said clutch means, closing said throttle and preventing the movement of said synchronizer valve until the release of said clutch means is effected, said means for preventing movement of said synchronizer valve prior to the release of said clutch means comprising a detent plunger, a detent member, and a detent recess in the synchronizer valve, said detent plunger being held in a position causing said detent member to prevent movement of said synchronizer valve while clutch engaging pressure is actuating said clutch means.

46. In a fluid pressure operated automatic transmission for a self-propelled vehicle having an engine, a throttle therefor and throttle actuating means, means for maintaining a supply of fluid under pressure, transmission gearing including an output shaft and a plurality of gear trains between said shaft and engine, fluid pressure actuated clutch means and a shiftable synchronizer unit for selectively engaging the various gear trains, fluid pressure actuated means for shifting said synchronizer unit and an automatic fluid pressure control system for causing said synchronizer unit to be shifted including a synchronizer valve to admit fluid under pressure to the fluid pressure means for shifting said synchronizer unit, a pilot valve to admit fluid under pressure for actuating said synchronizer valve, and automatic means for simultaneously releasing said clutch means, closing said throttle and preventing the movement of said synchronizer valve until the release of said clutch means is effected, said means for preventing movement of said synchronizer valve prior to the release of said clutch means comprising a detent means actuated by operative pressure in the fluid pressure operated means for said clutch means locking said synchronizer valve against movement until said operative pressure is released.

47. In a fluid pressure operated automatic transmission for a self-propelled vehicle having an engine, a throttle therefor and throttle actuating means, means for maintaining a supply of fluid under pressure, transmission gearing including an output shaft and a plurality of gear trains between said shaft and engine, fluid pressure actuated clutch means and a shiftable synchronizer unit for selectively engaging the various gear trains, fluid pressure actuated means for shifting said synchronizer unit and an automatic fluid pressure control system for causing said synchronizer unit to be shifted including a synchronizer valve to control the establishment of effective pressure for shifting said synchronizer unit, fluid pressure means responsive to vehicle speed and torque requirements for actuating said synchronizer valve, and automatic means for simultaneously releasing said clutch means, closing said throttle and preventing the movement of said synchronizer valve until the release of said clutch means is effected, said automatic means comprising a detent means actuated by effective pressure for said clutch means locking said synchronizer valve against movement until said effective pressure is substantially released, an interlock valve moved to an intermediate position in response to the establishment of pressure for actuating said synchronizer valve and to a final position by the shifting of said synchronizer unit, fluid pressure means operative when said interlock valve is in intermediate position for releasing the effective pressure from said clutch actuating means and to actuate said throttle closing means, and automatic means actuated by movement of said interlock valve to final position for restoring operative fluid pressure to said clutch actuating means and returning said throttle to its normal position.

48. In a fluid pressure operated automatic transmission for a self-propelled vehicle having an engine, a throttle therefor and throttle actuating means, means for maintaining a supply of fluid under pressure, transmission gearing including an output shaft and a plurality of gear trains between said shaft and engine, fluid pressure actuated clutch means and a shiftable synchronizer unit for selectively engaging the various gear trains, fluid pressure actuated means for shifting said synchronizer unit and an automatic fluid pressure control system for causing said synchronizer unit to be shifted including a synchronizer valve to control the establishment of effective pressure for shifting said synchronizer unit, fluid pressure means responsive to vehicle speed and torque requirements for actuating said synchronizer valve, and automatic means for simultaneously releasing said clutch means, closing said throttle and preventing the movement of said synchronizer valve until the release of said clutch means is effected, said automatic means comprising a detent means actuated by effective pressure for said clutch means locking said synchronizer valve against movement until said effective pressure is substantially released, an interlock valve moved to an intermediate position in response to the establishment of pressure for actuating said synchronizer valve and to a final position by the shifting of said synchronizer unit, fluid pressure means operative when said interlock valve is in intermediate position for releasing the effective pressure from said clutch actuating means and to actuate said throttle closing means, and automatic means actuated by movement of said interlock valve to final position for restoring operative fluid pressure to said clutch actuating means and returning said throttle to its normal position, said interlock valve and associated means being so arranged as to cause the actuating fluid pressure for said clutch means to be released when said interlock valve is moved to said intermediate position as well as during the movement of said synchronizer unit from one operative position to another, said fluid pressure being restored only after said synchronizer unit has reached its new operative position.

49. In a fluid pressure operated automatic transmission for a self-propelled vehicle having an engine, means for establishing a source of fluid under pressure, a transmission gearing including an output shaft and driving connections interposed between said shaft and engine to effect a plurality of forward gear trains, fluid pressure actuated clutch means between said engine and transmission, said driving connections including a synchronizer gear unit shiftable to one or the other of two positions which in conjunction with said clutch means operate to effect various gear trains, fluid pressure actuated means for shifting said synchronizer unit, and an automatic fluid pressure control system including control means indicative of clutch pressure requirements, a pressure control valve and connections therefrom to said control means to cause said valve to be actuated for regulating the effective clutch pressure, a synchronizer valve for controlling the establishment of effective pressure for shifting said synchronizer, means responsive to vehicle speed and torque requirements for actuating said synchronizer valve, an interlock valve associated with said synchronizer unit and said means responsive to vehicle speed, a fluid pressure conduit connecting said interlock valve with said pressure control valve to establish pressure for moving said latter valve to a position for releasing said effective clutch pressure when said synchronizer valve is actuated to effect a shifting of said synchronizer unit.

50. A fluid pressure operated automatic transmission for a self-propelled vehicle having an engine, a throttle therefor, and throttle actuating means, means for establishing a source of fluid under pressure, a transmission gearing including an output shaft and driving connections interposed between said shaft and engine to effect a plurality of drive ratios, fluid pressure operated clutch means between said engine and output shaft, said driving connections including a synchronizing gear unit shiftable from an initial position in which certain of said drive ratios are effective to an operative position in which other of said drive ratios may be established, fluid pressure operated means for actuating said synchronizer, an automatic fluid pressure control system including a pressure control valve for regulating pressure available to actuate said clutch means, a synchronizer valve for controlling the establishment of effective pressure for shifting said synchronizer unit, a pilot valve for initiating shifts of said synchronizer unit and conduits leading from said pilot valve to said synchronizer valve and pressure control valve, an interlock valve interposed in said conduits and actuated by movement of said synchronizer unit, said valves and conduits being arranged in a manner whereby movement of said pilot valve to a position for initiating a shift of said synchronizer unit establishes an effective pressure for moving said pressure control valve to a position for releasing said clutch pressure and movement of said interlock valve in response to the shift of said synchronizer unit releases said effective pressure for moving said pressure control valve thereby automatically effecting re-engagement of said clutch means.

51. In a fluid pressure operated automatic transmission as set forth in claim 50, a conduit supplied with effective pressure for actuating said clutch means leading to said synchronizer valve and so arranged as to oppose the movement of said synchronizer valve while said clutch means is engaged.

52. A fluid pressure operated automatic transmission for a self-propelled vehicle having an engine, a throttle therefor, and throttle actuating means, means for establishing a source of fluid under pressure, a transmission gearing including an output shaft and driving connections interposed between said shaft and engine to effect first, second, third and fourth gear drives, a pair of clutches between said engine and transmission, one for first and third gear drives and the other for second and fourth gear drives, fluid pressure operated means for actuating each of said clutches, said driving connections including a synchronizing gear unit shiftable from an initial position in which first and second gear drives are effective to an operative position in which third and fourth gear drives may be established, fluid pressure operated means for actuating said synchronizer, an automatic fluid pressure control system including a pressure control valve for regulating pressure available to actuate each of said clutches, a synchronizer valve for admitting fluid under pressure to the fluid pressure operated means for said synchronizer unit, fluid pressure actuated throttle closing means, a pilot valve and conduits leading therefrom to said synchronizer valve, said throttle closing means and said pressure control valve so arranged that effective pressure in said conduits moves said synchronizer valve to a position for effecting a shift and said pressure control valve to a position for releasing clutch pressure and actuates said throttle closing means, an interlock valve interposed in said conduits and actuated by movement of said synchronizer unit for releasing said effective pressure in the conduits leading to said pressure control valve and said throttle closing means when said synchronizer unit has moved to third and fourth gear drive position, thereby to effect momentary closing of said throttle and disengagement of said clutches when said synchronizer unit is being shifted and automatic re-engagement of said clutches and re-opening of said throttle when said synchronizer's shift is completed.

53. In a fluid pressure operated automatic transmission for a self-propelled vehicle having an engine, a throttle therefor and throttle actuating means, means for establishing a source of fluid under pressure, a transmission gearing including an output shaft and driving connections interposed between said shaft and engine to effect first, second, third and fourth gear drives, a pair of clutches between said engine and transmission, one for first and third gear drives, the other for second and fourth gear drives, said driving connections including a synchronizer gear unit shiftable to one or the other of two operative positions in one of which two way second gear drive may be established and in the other of which third or fourth gear drive may be established, said synchronizer unit also having a neutral position in which one way or "free wheeling" first or second gear drive may be established, fluid pressure operated means for shifting said synchronizer unit to its operative third or fourth gear drive position, an automatic fluid pressure control system operating under the combined effect of vehicle speed and extent of throttle opening to cause said unit to be held in its neutral position or in its operative position for third or fourth gear drive and manually operative means for shifting said synchronizer unit to its operative position for two way second gear drive.

54. In a fluid pressure operated automatic transmission for a self-propelled vehicle having an engine, a throttle therefor and throttle actuating means, means for maintaining a supply of fluid under pressure, a transmission gearing including an output shaft and driving connections interposed between said shaft and engine to effect first, second, third and fourth gear drives, a pair of clutches between said engine and transmission, one for first and third gear drives and the other for second and fourth gear drives, a shiftable synchronizing gear unit having one position for effecting first and second gear drives, and another position for effecting third and fourth gear drives, fluid pressure actuated means for shifting said synchronizer unit, an automatic fluid pressure control system for controlling the fluid pressure for shifting said synchronizer unit, and manually operative fluid pressure means for shifting said synchronizer unit from its third or fourth gear position to its operative position for second gear drive.

55. A fluid pressure operated automatic transmission as set forth in claim 53 in which means is provided for momentarily interrupting engine torque when said manually operated means is actuated to shift said synchronizer unit.

56. In a fluid pressure operated automatic transmission for a self-propelled vehicle having an engine, a throttle therefor and throttle actuating means, means for maintaining a supply of fluid under pressure, a transmission gearing including an output shaft and driving connections interposed between said shaft and engine to effect a plurality of drive ratios, clutch means between said engine and output shaft, a shiftable synchronizing gear unit having one position for effecting relatively low gear drive, and another position for effecting relatively high gear drive, fluid pressure actuated means for shifting said synchronizer unit, an automatic fluid pressure control system for controlling the fluid pressure for shifting said synchronizer unit and for causing engagement of said clutch means, and manually operative fluid pressure means for shifting said synchronizer unit from its last-mentioned position to its operative position for relatively low gear drive in which fluid pressure means is provided for momentarily closing said throttle and releasing said clutch means when said manually operated means is actuated to shift said synchronizer unit.

57. A fluid pressure operated automatic transmission as set forth in claim 53 in which means comprising an ignition interrupting device is provided for momentarily interrupting engine torque when said manually operated means is actuated to shift said synchronizer unit.

58. A fluid pressure operated automatic transmission as set forth in claim 53 in which manually operated means are provided to cause said fluid pressure operated control system to be set independently of the extent of throttle opening and vehicle speed to render second gear operative.

59. In a fluid pressure operated automatic transmission for a self-propelled vehicle having an engine, a throttle therefor and throttle actuating means, means for maintaining a supply of fluid under pressure, an output shaft and driving connections interposed between said shaft and engine to effect a plurality of drive ratios, gradually engageable coupling means for effecting drive between said engine and output shaft, a shiftable synchronizing gear unit having one position for effecting relatively low speed drive, and another position for effecting relatively high speed drive, fluid pressure actuated means for shifting said synchronizer unit, an automatic fluid pressure control system responsive to vehicle speed and throttle actuation for controlling the fluid pressure for shifting said synchronizer unit and for determining the effective engagement of said coupling means, and manually operative fluid pressure means for shifting said synchronizer unit from its last-mentioned position to its operative position for relatively low speed drive, said means including a valve actuated by said manually operative means causing said fluid pressure operated control system to be set for said relatively low speed drive independently of throttle actuation or vehicle speed below a predetermined maximum speed.

60. In a transmission for a self-propelled vehicle having an engine, a throttle therefor and throttle actuating means, a transmission gearing including an output shaft and driving connections interposed between said shaft and engine to effect a plurality of gear trains of different ratios, a pair of clutches and a shiftable synchronizer unit operating under an automatic control system for selectively and progressively effecting drive through said various gear trains, a normal progression of upshifts being effected after the establishment of low gear drive through the engagement of one of said clutches by the successive engagement of the other of said clutches and the shifting of said synchronizing unit, differential means responsive to vehicle speed and throttle actuation for initiating said shifts, a gear train of intermediate ratio effective when said latter clutch is released and said synchronizer unit is in high gear position, and means responsive to the actuation of said throttle to a relatively wide open position for effecting a released condition of said latter clutch.

61. In a fluid pressure operated automatic transmission as set forth in claim 60, the provision of one way clutch means in the gear trains rendered operative by said low gear clutch whereby the other gear drives may be established without releasing said low gear clutch and whereby downshifts to lower gear drives may be effected by merely releasing said second and high gear clutch.

62. In a fluid pressure operated automatic transmission as set forth in claim 60, means responsive to a predetermined maximum vehicle speed for overruling of said clutch releasing means.

63. In a fluid pressure operated automatic transmission for an automotive vehicle having an engine, a throttle therefor and throttle actuating means, means for maintaining a source of fluid under pressure, a transmission gearing including an output shaft and driving connections interposed between said shaft and engine to effect first, second, third and fourth gear drives, one way clutch means in said first gear drive and said third gear drive, a shiftable synchronizer unit having an initial position in which first and second gear drive is rendered effective and another position in which third and fourth gear drive is effective, a pair of clutches, one for first and third and the other for second and fourth gear drives, fluid pressure operated means for each of said clutches, and a fluid pressure operated control system including means for shifting said synchronizer unit, means operating under the combined effect of vehicle speed and extent of throttle opening for progressively causing engagement of said first gear clutch and then said second gear clutch when said synchronizer unit is in its initial position, means for shifting said synchronizer unit to said other position disengaging both of said clutches when said synchronizer unit is being shifted and means for momentarily closing the throttle thereby releasing the driving torque while said synchronizer unit is being shifted.

64. In a transmission for a self-propelled vehicle having an engine, a transmission gearing including an output shaft and a plurality of gears and shafts interposed between said engine and output shaft to effect a plurality of gear trains having different gear ratios, one way clutch means operative to transmit drive in a forward direction only for certain of said gear trains comprising an annular member on one of said shafts, a driving connection between said latter shaft and annular member, an annular gear surrounding said annular member, a roller cage and rollers interposed between said gear and member, cam means to wedge said rollers in driving engagement between said gear and member, and resilient means to normally move said cage and rollers in a direction to wedge the latter, a shiftable unit having a driving connection with said latter shaft, driving means formed in said gear engageable by said unit when shifted in a manner whereby drive may be transmitted backwardly from said latter shaft to said engine through said gear as in using the engine for a brake or whereby reverse drive may be transmitted from said engine to said latter shaft through said gear, and means for moving said cage and rollers against said resilient means to an inoperative position in response to the shifting of said unit toward said engaging position whereby any tendency for said rollers to become locked may be averted, said means comprising a friction member, a blocking device rotatively connected with said friction member, said member being rotatively connected to said cage, said blocking device being interposed between said driving means in said gear and the corresponding driving means of said unit in a position normally blocking said engagement, the shifting of said unit toward said engaging position causing said blocking device to be moved into alignment with said driving means of the unit and said cage and rollers to be moved to an inoperative position.

65. In a transmission for a self-propelled vehicle having an engine, a transmission gearing including an output shaft and a plurality of gears and shafts interposed between said engine and output shaft to effect a plurality of gear trains having different gear ratios, one way clutch means operative to transmit drive in a forward direction only for certain of said gear trains comprising an annular member on one of said shafts, a driving connection between said latter shaft and annular member, an annular gear surrounding said annular member, rollers interposed between said gear and member, cam means to wedge said rollers in driving engagement between said gear and member, and resilient means to normally move said rollers in a direction to wedge the latter, a shiftable unit having a driving connection with said latter shaft, a set of teeth integrally formed in said gear engageable by said unit in a manner whereby drive may be transmitted backwardly from said latter shaft to said engine through said gear as in using the engine for a brake or whereby reverse drive may be transmitted from said engine to said latter shaft through said gear, said unit being shiftable to a position for engaging said teeth and chamfers in said set of teeth operative upon the shifting of said unit toward engaging position to rotate said gear in a roller unlocking direction only.

66. In a fluid pressure operated automatic transmission for a self-propelled vehicle having an engine, an output shaft and a plurality of power trains of different ratios interposed therebetween, means for maintaining a supply of fluid under pressure, a coupling for effecting a relatively low speed drive, a second gradually engageable coupling for effecting a relatively higher speed drive, fluid pressure operated means for engaging said latter coupling, an automatic control system for supplying pressure for effecting engagement of said second coupling after said low speed drive has been established including valve means responsive to coupling pressure requirements for regulating the effective pressure available to actuate said second coupling, valve means for controlling the admission and release of said effective pressure to said fluid pressure operated means and restrictive orifice means for regulating the rate of flow of fluid to said fluid pressure operated means for effecting engagement of said second coupling.

67. A fluid pressure operated automatic transmission as set forth in claim 66 wherein a shiftable synchronizer unit is interposed in said power trains having one relatively low speed position and another relatively high speed position, fluid pressure means for shifting said synchronizer unit, means for releasing said coupling pressure during the shift of said synchronizer unit, and means for re-establishing said coupling pressure upon the completion of said synchronizer unit's shift to said high speed position, said restrictive orifice means being movable to a position for permitting a more rapid flow of fluid to said coupling operating means, and means responsive to the establishment of fluid pressure for shifting said synchronizer unit for so moving said restrictive orifice means whereby the engagement of said higher speed coupling following the shift of said synchronizer unit may be effected at a different rate than its initial engagement.

68. A fluid pressure operated automatic transmission as set forth in claim 66 wherein one-way by-pass means are provided to permit a rapid release of said coupling actuating pressure without passing through said restrictive orifice means.

69. In a fluid pressure operated automatic transmission for a self-propelled vehicle having an engine, an output shaft and a plurality of power trains of different ratios interposed therebetween, fluid pressure operated means for rendering said trains progressively effective, and control means for initiating the actuation of said fluid pressure operated means including a plurality of pilot valves, vehicle speed responsive means, torque requirement indicating means, separate differential means responsive to said last two-mentioned means for actuating each of said pilot valves, and means for adjustably varying the effect of said differential means whereby the vehicle speed and torque conditions for initiating each shift may be independently adjusted.

70. In a fluid pressure operated automatic transmission for a vehicle having an engine, a throttle therefor and throttle actuating means, means for maintaining a source of fluid under pressure, an output shaft, driving connections interposed between said output shaft and engine to effect a plurality of power trains having different ratios, said driving connections including fluid pressure operated gradually engageable coupling means, a control valve responsive to throttle position for regulating the effective pressure available to actuate said coupling means in a manner whereby the release of said throttle actuating means may effect the disengagement of said coupling means, an automatic control system for rendering said various power trains operative, and means responsive to the establishment of a certain relatively high speed train for actuating said control valve independent of throttle position whereby said coupling means will remain engaged upon the release of said throttle actuating means when said high speed train is operative in order to permit the engine to act as a brake.

71. In a fluid pressure operated automatic transmission for an automotive vehicle having an engine, a throttle therefor and throttle actuating means, means for maintaining a source of fluid under pressure, a transmission gearing including an output shaft, driving connections interposed between said output shaft and engine to effect a plurality of gear trains of different ratios, a synchronizer unit shiftable to and from an operative position for rendering a relatively high gear drive effective, fluid pressure operated clutch means interposed in said driving connections, fluid pressure operated means for shifting said synchronizer unit, a synchronizer valve for controlling the establishment of effective pressure for shifting said synchronizer unit, fluid pressure means for actuating said synchronizer valve, an interlock valve actuated by the movement of said synchronizer unit, a passage communicating with said synchronizer valve in which said interlock valve is interposed in a manner whereby effective pressure indicative of clutch actuating pressure resists the movement of said synchronizer valve to a position for initiating the shift of said synchronizer unit, and means for releasing said clutch actuating pressure responsive to the establishment of effective pressure for actuating said synchronizer valve, said interlock valve being effective after the shift of said synchronizer unit to prevent the re-establishment of clutch actuating pressure from affecting the position of said synchronizer valve.

72. In a fluid pressure operated automatic transmission for an automotive vehicle having an engine, a throttle therefor and throttle actuating means, means for maintaining a source of fluid under pressure, a transmission gearing including an output shaft, driving connections interposed between said output shaft and engine to effect a plurality of gear trains of different ratios, a synchronizer unit shiftable to and from an operative position for rendering a relatively high gear drive effective, fluid pressure operated clutch means interposed in said driving connections, fluid pressure operated means for shifting said synchronizer unit, a synchronizer valve for controlling the establishment of effective pressure for shifting said synchronizer unit, fluid pressure means for actuating said synchronizer valve, a pressure control valve for regulating effective clutch actuating pressure, an interlock valve actuated by the movement of said synchronizer unit, passages communicating with said synchronizer valve and said pressure control valve in which said interlock valve is interposed in a manner whereby effective pressure indicative of clutch actuating pressure resists the movement of said synchronizer valve to a position for initiating the shift of said synchronizer unit and whereby effective pressure for so moving said synchronizer valve is also effective to move said pressure control valve to a position for releasing clutch pressure, said interlock valve being effective after the shift of said synchronizer unit to permit the re-establishment of clutch actuating pressure and to prevent such re-establishment from affecting the position of said synchronizer valve.

73. In a fluid pressure operated automatic transmission for a self-propelled vehicle having an engine, an output shaft and a plurality of gear trains of different ratios interposed therebetween, clutch means and a shiftable synchronizer unit for selectively rendering said various gear trains operative, fluid pressure actuated means for controlling the engagement of said clutch means and the shifting of said synchronizer unit, and control means for causing said clutch means to be released during the shift of said synchronizer unit characterized by an interlock valve actuated in response to the movement of said synchronizer unit and actuated within fixed limits relative to said synchronizer unit by fluid pressure means, the establishment of effective pressure for initiating a shift of said synchronizer unit moving said interlock valve to an intermediate position and the shifting of said synchronizer unit completing the movement of said interlock valve to an end position, the position of said interlock valve controlling the release and re-engagement of said clutch means.

74. In a fluid pressure operated automatic transmission for a self-propelled vehicle having an engine, an output shaft and a plurality of gear trains of different ratios interposed therebetween, clutch means and a shiftable synchronizer unit for selectively rendering said various gear trains operative, fluid pressure actuated means for controlling the engagement of said clutch means and the shifting of said synchronizer unit, said synchronizer unit being shifted in one direction by establishment of an effective pressure and in the other direction by the release of said effective pressure, and control means for causing said clutch means to be released during the shift of said synchronizer unit characterized by an interlock valve actuated in response to the movement of said synchronizer valve and actuated within fixed limits relative to said synchronizer unit by fluid pressure means, the establishment of effective pressure for initiating a shift of said synchronizer unit moving said interlock valve to an intermediate position, the shifting of said synchronizer unit completing the movement of said interlock valve to an end position, the release of said effective pressure for shifting said synchronizer unit in the other direction causing said interlock valve to move to a second intermediate position, and the corresponding shift of said synchronizer unit moving said interlock valve to its other end position, means responsive to the movement of said interlock to and between said intermediate positions for releasing said clutch engagement, and means responsive to the movement of said interlock valve to either end position for re-establishing said clutch engagement.

75. In a fluid pressure operated transmission as set forth in claim 73 wherein controls for said engine include a throttle and throttle actuating means, means for closing said throttle while said clutch means are disengaged during the shift of said synchronizer unit, the actuation of said latter means being responsive to the position of said interlock valve.

76. In a fluid pressure operated automatic transmission for an automotive vehicle having an engine, a throttle therefor and throttle actuating means, means for maintaining a source of fluid under pressure, a transmission gearing including an output shaft, driving connections interposed between said output shaft and engine to effect first, second, third and fourth gear drives and a synchronizer unit shiftable to and from an operative position in which third and fourth gear drives are effective, a pair of fluid perssure operated clutches, one for rendering first and third gear drives operative and the other for rendering second and fourth gear drives operative, fluid pressure operated means for placing each of said clutches in driving relationship with said engine, fluid pressure operated means for shifting said synchronizer unit, and an automatic fluid pressure operated control system including conduits leading from said source of pressure to the fluid pressure operated means for said clutches, a pressure control valve for regulating the pressure in said conduits, a synchronizer valve to admit fluid under pressure to the fluid pressure operated means for said synchronizer unit, a pilot valve operating under the combined influence of vehicle speed and extent of throttle opening to govern the actuation of said synchronizer valve, an interlock valve having an initial position when said synchronizer unit is in its position to effect first and second gear drive and when said synchronizer pilot valve is closed, an intermediate position effected by fluid pressure passing through said synchronizer pilot valve when open, a final position effected by the combination of said fluid pressure and the shifting movement of said synchronizer unit to third and fourth gear drive position, and a second intermediate position when said fluid pressure is released with said synchronizer unit in third and fourth gear drive position, means controlled by said interlock valve in its second intermediate position for disengaging both of said clutches and interrupting the power output of said engine, and means controlled by said interlock valve when returned to its initial position for re-engaging said clutches and permitting said power output to be restored.

77. In a transmission for a self-propelled vehicle having an engine, a throttle therefor, means for maintaining fluid under pressure, an output shaft and driving connections interposed between said shaft and engine to effect a plurality of power trains of different ratios, fluid pressure actuated means for selectively engaging said trains, driver actuated accelerator means, control means for regulating the fluid under pressure admitted from said source of fluid under pressure to said fluid pressure actuated means, differential means responsive to continuously variable conditions of accelerator means movement and vehicle speed for actuating said control means, and cam means for precisely coordinating the opening of said throttle and the actuation of said differential means.

78. In a transmission for a self-propelled vehicle having an engine, a throttle therefor, means for maintaining fluid under pressure, an output shaft and driving connections interposed between said shaft and engine to effect a plurality of power trains of different ratios, fluid pressure actuated means for selectively engaging said trains including fluid pressure actuated gradually engageable coupling means, driver actuated accelerator means, continuously variable coupling pressure control means for regulating the fluid under pressure available to actuate said coupling means, said coupling pressure control means as well as the opening of said throttle being responsive to the actuation of said accelerator means, and means for effecting a relatively rapid movement of said control means during the initial actuation of said accelerator means and a relatively gradual movement of said control means during the further actuation of said accelerator means comprising cam means interposed in the linkage between said accelerator means, said throttle and said coupling pressure control means.

79. In a fluid pressure operated automatic transmission for a self-propelled vehicle having an engine, a throttle therefor and throttle actuating means, means for maintaining a supply of fluid under pressure, an output shaft and a plurality of power trains between said shaft and engine, fluid pressure actuated gradually engageable coupling means and a shiftable synchronizer unit for selectively engaging the various power trains, fluid pressure actuated means for shifting said synchronizer unit and an automatic fluid pressure control system for causing said synchronizer unit to be shifted including a synchronizer valve to establish effective pressure for shifting said synchronizer unit, and a normally ineffective manually operable valve which may be moved to a position for controlling said synchronizer valve whereby automatic shifts of said synchronizer unit for effecting a higher speed drive may be prevented and shifts of said synchronizer unit for effecting a lower speed drive may be manually initiated.

80. In a fluid pressure operated automatic transmission as set forth in claim 79, means whereby the movement of said manually operable valve to an operative position may be prevented above a predetermined maximum vehicle speed without limiting the vehicle speed to which said valve may be maintained in an operative position for retaining said lower speed drive.

81. In a fluid pressure operated automatic transmission as set forth in claim 79, means whereby the movement of said manually operable valve to an operative position may be prevented above a predetermined maximum vehicle speed without limiting the vehicle speed to which said valve may be maintained in an operative position for retaining said lower speed drive comprising a member for actuating said valve, means for moving said member in a direction rendering said valve inoperative, separate yieldable means for moving said member in a direction rendering said valve operative, and means responsive to vehicle speed for arresting the movement of said yieldable means.

82. In a fluid pressure operated automatic transmission for a self-propelled vehicle having an engine, an output shaft and a plurality of power trains of different ratios interposed therebetween, fluid pressure actuated means for effecting shifts from one power train to another, a fluid pressure control system for governing the establishment of effective pressure for initiating said shifts including valve means for initiating an upshift or a downshift upon being actuated in one direction or another beyond a predetermined neutral point, differential means responsive to vehicle speed and torque requirements for actuating said valve means including lost motion connections for effecting an upshift under relatively different conditions than a downshift, detent means provided to act as reaction points for said differential means to assure that said lost motion is taken up before movement of said valve from one position to another is effected and to produce a positive snap movement from one position to the other after said positive engagement and a predetermined movement of said differential means have taken place.

83. In a transmission for a self-propelled vehicle having an engine, a fluid pressure operated gradually engageable coupling, an output shaft and a plurality of power trains of different ratios between said output shaft and said engine, at least one of said power trains being effective with said coupling engaged and a downshift to another of said power trains being effected by the release of said coupling, one way clutch means being provided in said last-mentioned power train, a source of fluid pressure for actuating said coupling, an automatic control system for regulating the flow of fluid under pressure to and from said coupling, a fluid pressure passage for effecting a release of said coupling which is opened under the operation of said automatic control system when said downshift is required, and valve means interposed in said passage for regulating the rate of flow in order to effect a smooth transfer of drive to said low speed train.

84. A transmission as set forth in claim 83 wherein the valve means operates to provide flow at a relatively high rate until the pressure substantially reaches a point at which the load begins to be transferred to said lower speed train and at a reduced rate during the completion of the transfer of said load to said lower speed train.

85. A transmission as set forth in claim 83 wherein said passage leads to a relatively small port and a relatively large port, said valve means being urged by yieldable means to close said relatively large port, the initial coupling actuating pressure being sufficient to move said release control valve to a position during the initial period of transfer permitting a relatively rapid rate of flow, said relatively small port remaining open during the final period of transfer providing a reduced rate of flow.

86. In a fluid pressure operated automatic transmission as set forth in claim 7 in which a smooth downshift from fourth to third or second to first gear drive requires a properly regulated release of the clutch operating fluid pressure for the second and fourth gear clutch, means for reducing said pressure rapidly to a predetermined pressure and gradually from said predetermined pressure to a complete release pressure comprising a release passage for said second and fourth gear clutch which is opened under the operation of said automatic control system when said downshift is required, a release control valve in said passage, a full release and a throttled jet release port associated with said release control valve, yieldable means urging said valve toward a position for closing said full release port but leaving open said jet release port, said clutch operating fluid pressure moving said valve to full release position during the initial period of pressure release and until the effective pressure has been reduced sufficiently to permit said yieldable means to move said valve to a position closing said full release port.

87. A fluid pressure operated automatic transmission for a self-propelled vehicle having an engine, four forward speed gear ratios, two friction clutches and a shiftable synchronizer unit, in which each of the different gear ratios may be effected by the engagement of one or the other of the two friction clutches and by shifting the synchronizer unit to one or the other of two positions, and wherein fluid pressure means and a fluid pressure control system are provided for effecting progressive changes in operative gear ratio, torque requirement indicating means, vehicle speed indicating means, said fluid pressure means being differentially actuated in response to changes in the position of each of said last two-mentioned means.

88. A fluid pressure operated automatic transmission for a self-propelled vehicle having an engine, a throttle therefor, a speed governor, an output shaft and a plurality of power trains having different ratios interposed between said engine and said output shaft, fluid pressure actuated means for selectively engaging said power trains, control means for regulating the flow of fluid under pressure to said fluid pressure actuated means including differential means responsive to the speed of said governor and the position of said throttle for initiating upshifts and downshifts, increasing speed tending to effect upward shifts and increasing throttle opening tending to retard upward shifts, said means responsive to throttle opening having a limited effective range whereby speed alone will control said upshifts regardless of further increase of throttle opening beyond a predetermined limit.

89. A fluid pressure operated automatic transmission for a self-propelled vehicle having an engine, a throttle therefor, a speed governor, an output shaft and a plurality of power trains having different ratios interposed between said engine and said output shaft, fluid pressure actuated means for selectively engaging said power trains, control means for regulating the flow of fluid under pressure to said fluid pressure actuated means including differential means responsive to the speed of said governor and the position of said throttle for initiating upshifts and downshifts, decreasing speed tending to effect downward shifts and decreasing throttle opening tending to retard downward shifts, said means responsive to throttle opening having a limited effective range whereby speed alone will control said downshifts regardless of further decrease of throttle opening beyond a predetermined limit.

90. A fluid pressure operated automatic transmission for a self-propelled vehicle having an engine, a throttle therefor, a speed governor, an output shaft and a plurality of power trains having different ratios interposed between said engine and said output shaft, fluid pressure actuated means for selectively engaging said power trains, control means for regulating the flow of fluid under pressure to said fluid pressure actuated means including differential means responsive to the speed of said governor and the position of said throttle for initiating upshifts and downshifts, increasing speed tending to effect upward shifts and increasing throttle opening tending to retard upward shifts, decreasing speed tending to effect downward shifts and decreasing throttle opening tending to retard downward shifts, said means responsive to throttle opening having a limited effective range terminating short of both maximum and minimum throttle openings whereby speed alone will control said upshifts and downshifts regardless of further increase or decrease of throttle opening outside of such effective range, each of said upshifts being effected at a relatively higher speed than the corresponding downshift for any given throttle opening.

91. A fluid pressure operated automatic transmission for a self-propelled vehicle having an engine, a throttle therefor, a speed governor, an output shaft and a plurality of power trains having different ratios interposed between said engine and said output shaft, fluid pressure actuated means for selectively engaging said power trains, control means for regulating the flow of fluid under pressure to said fluid pressure actuated means including differential means responsive to the speed of said governor and the position of said throttle for initiating upshifts and downshifts, increasing speed tending to effect upward shifts and increasing throttle opening tending to retard upward shifts, decreasing speed tending to effect downward shifts and decreasing throttle opening tending to retard downward shifts, each of said upshifts being effected at a relatively higher speed than the corresponding downshift for any given throttle opening, and means responsive to throttle position alone within a predetermined range of speed for controlling certain of said shifts.

92. A fluid pressure operated automatic transmission for a self-propelled vehicle having an engine, a throttle therefor, a speed governor, an output shaft and a plurality of power trains having different ratios interposed between said engine and said output shaft, fluid pressure actuated means for selectively engaging said power trains, control means for regulating the flow of fluid under pressure to said fluid pressure actuated means including differential means responsive to the speed of said governor and the position of said throttle for initiating upshifts and downshifts, increasing speed tending to effect upward shifts and increasing throttle opening tending to retard upward shifts, decreasing speed tending to effect downward shifts and decreasing throttle opening tending to retard downward shifts, each of said upshifts being effected at a relatively higher speed than the corresponding downshift for any given throttle opening, and means responsive to speed alone for controlling certain of said downshifts while corresponding upshifts are controlled under the combined influence of speed and throttle position.

93. In a fluid pressure operated automatic transmission for a self-propelled vehicle having an engine, a throttle therefor and throttle actuating means, means for maintaining a supply of fluid under pressure, transmission gearing including an output shaft and a plurality of gear trains between said shaft and engine, fluid pressure actuated clutch means and a shiftable synchronizer unit for selectively engaging the various gear trains, fluid pressure actuated means for shifting said synchronizer unit and an automatic fluid pressure control system for causing said synchronizer unit to be shifted, said control system including a synchronizer valve for controlling the establishment of effective pressure for shifting said snychronizer unit, a synchronizer pilot valve actuated under the combined influence of throttle position and vehicle speed for controlling the position of said synchronizer valve, automatic fluid pressure means responsive to the movement of said synchronizer pilot valve to a shift initiating position for momentarily closing said throttle during the shift of said synchronizer unit, and means for preventing such momentary closing of said throttle from influencing the position of said snychronizer pilot valve comprising a valve stem on said latter valve actuated in response to said throttle actuating means and vehicle speed, a valve body slidable on said stem between fixed limit stops, yieldable means urging said valve body against one of said stops, and fluid pressure means for moving said valve body to a shift initiating position in response to the initial establishment of effective pressure for closing said throttle.

94. In a fluid pressure operated automatic transmission for a self-propelled vehicle having an engine, a throttle therefor and throttle actuating means, means for maintaining a supply of fluid under pressure, transmission gearing including an output shaft and a plurality of gear trains between said shaft and engine, fluid pressure actuated clutch means and a shiftable synchronizer unit for selectively engaging the various gear trains, fluid pressure actuated means for shifting said synchronizer unit and an automatic fluid pressure control system for causing said synchronizer unit to be shifted, said control system including a synchronizer valve for controlling the establishment of effective pressure for shifting said synchronizer unit, a synchronizer pilot valve actuated under the combined influence of throttle position and vehicle speed for controlling the position of said synchronizer valve, automatic fluid pressure means responsive to the movement of said synchronizer pilot valve to a shift initiating position for momentarily closing said throttle during the shift of said synchronizer unit, and means for preventing such momentary closing of said throttle from influencing the position of said synchronizer pilot valve comprising resilient means normally urging said pilot valve in one direction and fluid pressure means actuated in response to the initial establishment of effective pressure for closing said throttle for moving said pilot valve toward a shift initiating position whereby any tendency for said pilot valve to "hunt" at the breaking point between open and closed position may be eliminated.

95. In a fluid pressure operated automatic transmission for a self-propelled vehicle having an engine, an output shaft and a transmission interposed therebetween for effecting various drive ratios, means for maintaining a source of fluid under pressure, fluid pressure actuated means for effecting changes in said drive ratios, control means for regulating the admission and release of fluid under pressure to and from said fluid pressure actuated means including a valve having one position for passing fluid under pressure, another position for releasing fluid under pressure and a neutral position therebetween, means responsive to requirements for higher or lower drive ratios for actuating said valve in one direction or the other, and means for rapidly moving said valve farther in such direction upon actuation of said valve beyond said neutral position comprising resilient means normally urging said valve in one direction and fluid pressure means actuated in response to the initial flow of effective pressure through said valve for moving said valve in the other direction against said resilient means.

96. In a fluid pressure operated automatic transmission for a self-propelled vehicle having an engine, a throttle therefor and throttle actuating means, means for maintaining a supply of fluid under pressure, fluid pressure actuated gradually engageable coupling means, an output shaft and a plurality of power trains of different ratios interposed between said output shaft and said engine and adapted to be driven by said coupling means, control means responsive to said throttle actuating means for regulating the pressure available to actuate said coupling means, and centrifugal means responsive to engine speed for modifying said available pressure in effecting at least one relatively low speed ratio, said control means being effective to regulate the engaging pressure of said coupling means for at least one relatively high speed ratio independent of said centrifugal means or engine speed whereby any tendency for coupling slippage to occur while traveling in said relatively high speed ratio at low engine speeds may be averted while retaining the advantages of said centrifugal means in effecting smooth engagement of said relatively low speed ratio.

97. In a fluid pressure operated automatic transmission for a self-propelled vehicle having an engine, means for maintaining a supply of fluid under pressure, a pair of fluid pressure actuated gradually engageable couplings, one for effecting at least one relatively low speed ratio and the other for effecting at least one relatively high speed ratio, an output shaft and a plurality of power trains of different ratios interposed between said output shaft and said engine adapted to be selectively engaged by said couplings, control means indicative of coupling pressure requirements for regulating the pressure available to actuate said couplings, and means responsive to engine speed for modifying the engaging pressure of said low speed ratio coupling, said control means being effective to regulate the engaging pressure of said high speed ratio coupling independent of said engine speed whereby any tendency for coupling slippage to occur while traveling in said relatively high speed ratio at low engine speeds may be averted while retaining the advantages of said means responsive to engine speed in effecting smooth engagement of said relatively low speed ratio.

98. In a fluid pressure operated automatic transmission for a self-propelled vehicle having an engine, a transmission gearing including an output shaft and driving connections interposed between said shaft and engine to effect a plurality of gear trains of different gear ratios, clutch means interposed in said driving connections between said engine and certain of said gear trains, bearing connections between members driven by said engine at all times and certain gear trains driven by said engine through said clutch means, said bearing connections tending through bearing drag to rotate said gear trains when said clutch means are released and when said gear trains are required to be stationary in order to properly effect certain gearshifts, means for preventing the rotation of said gear trains through said bearing drag comprising friction means continuously resisting the rotation of said gear trains with an effective force in excess of said bearing drag.

99. In a fluid pressure operated automatic transmission for a self-propelled vehicle having an engine, a throttle therefor and throttle actuating means, means for maintaining a supply of fluid under pressure, clutch means, transmission gearing including an output shaft and a plurality of gear trains of different gear ratios interposed between said output shaft and said engine and adapted to be driven by said clutch means, manual gearshift means having forward, reverse and neutral positions, said forward and reverse positions being effective to transmit drive from said engine to said output shaft when said clutch means is engaged and said neutral position being effective to prevent drive in either direction regardless of said clutch engagement, control means responsive to said throttle actuating means for regulating the engagement pressure of said clutch means, said control means being effective to prevent said clutch engagement when said throttle actuating means is released and normally effective to establish clutch actuating pressure when said throttle actuating means is moved to open said throttle, and means for preventing said control means from establishing clutch actuating pressure upon movement of said throttle actuating means when said manual gearshift means is in said neutral position whereby the spinning of gears between said clutch means and the gear shifted by said manual gearshift means upon accelerating said engine with said manual gearshift means in neutral position which might result in a clash of gears upon an immediately subsequent manual shift to forward or reverse positions may be avoided.

100. In a fluid pressure operated automatic transmission for a self-propelled vehicle having an engine, a throttle therefor and throttle actuating means, means for maintaining a supply of fluid under pressure, fluid pressure actuated clutch means, transmission gearing including an output shaft and a plurality of gear trains of different gear ratios interposed between said output shaft and said engine and adapted to be driven by said clutch means, manual gear shift means having forward, reverse and neutral positions, said forward and reverse positions being effective to transmit drive from said engine to said output shaft when said clutch means is engaged and said neutral position being effective to prevent drive in either direction regardless of said clutch engagement, control means for regulating the pressure available to actuate said clutch means including a pressure control valve normally actuated by the movement of said throttle actuating means, said pressure control valve being effective to prevent said clutch engagement when said throttle actuating means is released and normally effective to establish clutch actuating pressure when said throttle actuating means is moved to open said throttle, and means for preventing said pressure control valve from being actuated by said throttle actuating means when said manual gear shift means is in said neutral position whereby the spinning of gears between said clutch means and the gear shifted by said manual gear shift means upon accelerating said engine with said manual gear shift means in neutral position which might result in a clash of gears upon an immediately subsequent manual shift to forward or reverse positions may be avoided.

101. In an automatic transmission for a self-propelled vehicle having an engine, an output shaft and a plurality of gear trains of different ratios interposed therebetween, a fluid pressure operated shiftable synchronizer unit having a neutral position as well as an operative position for engaging certain of said gear trains, an automatic fluid pressure control system adapted to effect the shifting of said synchronized unit under predetermined driving conditions, a shift blocking member associated with said synchronizer unit, resiliently engaged detent means forming a yieldable coupling between friction and positive elements of said synchronizer unit, friction surfaces engaged in response to axial movement transmitted through said detent means for setting said member in a blocking position, fluid pressure actuated means for shifting said synchronizer unit, and means for assuring the proper setting of said blocking member prior to the shifting of said synchronizer unit comprising resilient means actuated by said fluid pressure actuated means interposed in the connections for shifting said synchronizer unit, said resilient means being initially compressed by a force less than that required to overcome said detent resistance.

102. In an automatic transmission for a self-propelled vehicle having an engine, an output shaft and a plurality of gear trains of different ratios interposed therebetween, a fluid pressure operated shiftable synchronizer unit having a neutral position as well as an operative position for engaging certain of said gear trains, an automatic fluid pressure control system adapted to effect the shifting of said synchronizer unit under predetermined driving conditions, a shift blocking member associated with said synchronizer unit, resiliently engaged detent means forming a yieldable coupling between friction and positive elements of said synchronizer unit, friction surfaces engaged in response to axial movement transmitted through said detent means for setting said member in a blocking position, means responsive to the shifting of said synchronizer unit against said blocking member for producing a synchronizing effect and upon synchronization for moving said blocking member to a non-blocking position, fluid pressure actuated means for shifting said synchronizer unit, and means for assuring the proper setting of said blocking member prior to the shifting of said synchronizer unit as well as for producing a snap movement of said synchronized unit to said operative position upon synchronization taking place comprising resilient means actuated by said fluid pressure actuated means interposed in the connections for shifting said synchronizer unit, said resilient means being initially compressed by a force less than that required to overcome said detent resistance.

103. In a fluid pressure operated automatic transmission for a self-propelled vehicle having an engine, an output shaft and driving connections interposed between said shaft and engine to effect a plurality of power trains of different ratios, fluid pressure actuated gradually engageable coupling means in said driving connections, a shiftable synchronizer unit in said driving connections, means for releasing the fluid pressure for actuating said coupling means prior to the shifting of the synchronized unit to an operative position, and means for preventing the restoration of fluid pressure for actuating said coupling means until said synchronizer unit has reached said operative position, said latter means comprising automatic means responsive to the movement of said unit for controlling said restoration of said coupling actuating pressure.

104. In a fluid pressure operated automatic transmission for a self-propelled vehicle having an engine, a throttle therefor and throttle actuating means, a transmission gearing including an output shaft and driving connections interposed between said shaft and engine to effect a plurality of gear trains of different ratios, a pair of clutches and a shiftable synchronizer unit operating under an automatic control system for selectively and progressively effecting said various gear trains, a normal progression of upshifts being effected after the establishment of low gear drive through the engagement of one of said clutches by the successive engagement of the other of said clutches and the shifting of said synchronizer unit, fluid pressure means for engaging said latter clutch and for shifting said synchronizer unit, valve means differentially responsive to vehicle speed and throttle actuation for normally controlling the fluid pressure required to effect said shifts, a gear train of intermediate ratio effected by the release of said latter clutch with said synchronized unit in high gear position, and valve means responsive to the actuation of said throttle to a relatively wide open position for rendering said first-mentioned valve means ineffective to maintain the engagement of said latter clutch, said latter valve means being operative only when said first-mentioned valve means are in a position for effecting the high gear position of said synchronizer unit.

105. In a fluid pressure operated automatic transmission for a self-propelled vehicle having an engine, a throttle and throttle actuating means means for maintaining a supply of fluid under pressure, transmission gearing including an output shaft and a plurality of gear trains having different ratios between said shaft and engine, means for effecting progressive shifts responsive to differential effect of vehicle speed and said throttle actuating means, certain of said shifts being effected without interruption of power and other of said shifts being effected with momentary interruption of power, adjustable means for varying the point at which said differential effect will cause each shift to take place including means for preventing an upward shift of the type effected with momentary interruption of power until initiated by a momentary release of said throttle actuating means.

106. In a transmission for a self-propelled vehicle having an engine, a throttle therefor and throttle actuating means, a transmission gearing including an output shaft and driving connections interposed between said shaft and engine to effect a plurality of gear trains of different ratios, a pair of clutches and a shiftable synchronizer unit operating under an automatic control system for selectively and progressively effecting drive through said various gear trains, a normal progression of upshifts being effected after the establishment of low gear drive through the engagement of one of said clutches by the successive engagement of the other of said clutches and the shifting of said synchronizer unit, differential means responsive to vehicle speed and throttle actuation for initiating said shifts, a gear train of intermediate ratio effective when said latter clutch is released and said synchronizer unit is in high gear position, and differential means responsive to the actuation of said throttle to a relatively wide open position for effecting a released condition of said latter clutch and responsive to a predetermined maximum vehicle speed for effecting an engaged condition of said clutch notwithstanding a wide open throttle position.

107. In a fluid pressure operated automatic transmission for a self-propelled vehicle having an engine, a throttle therefor and throttle actuating means, a pair of fluid pressure actuated gradually engageable couplings, an output shaft and a plurality of power trains of different ratios interposed between said output shaft and said engine and adapted to be selectively engaged by said couplings, means for establishing a source of fluid pressure, fluid pressure operated means for each of said couplings for effecting engagement thereof, a pressure control valve responsive to said throttle actuating means for governing the effective pressure available to actuate said couplings, and a second valve interposed between said pressure control valve and the fluid pressure operated means for one of said couplings to control the effective pressure for actuating said latter means without disturbing the flow of fluid to the fluid pressure means for the other of said couplings.

108. In a fluid pressure operated automatic transmission for a self-propelled vehicle having an engine, a propeller shaft and a plurality of power trains of different ratios interposed therebetween, fluid pressure actuated gradually engageable coupling means effective to engage lowest speed drive, a source of fluid pressure for actuating said coupling means, torque requirement indicating means, a pressure control valve for modifying the pressure available from said source for actuating said coupling means responsive to said torque requirement indicating means, and means responsive to engine speed for modifying the engaging pressure of said coupling means whereby said lowest speed drive is rendered operative under the combined influence of engine speed and torque requirement.

109. In a fluid pressure operated automatic transmission for a self-propelled vehicle having an engine, a propeller shaft and a plurality of power trains of different ratios interposed therebetween, fluid pressure actuated gradually engageable coupling means effective to engage lowest speed drive, a source of fluid pressure for actuating said coupling means, a throttle and throttle actuating means, a pressure control valve for modifying the pressure available from said source for actuating said coupling means responsive to said throttle actuating means, and means responsive to engine speed for modifying the engaging pressure of said coupling means whereby said lowest speed drive is normally rendered operative under the control of said engine speed responsive means, said engaging pressure being limited however in accordance with the position of said throttle actuating means.

110. The combination set forth in claim 108 wherein said coupling includes an engine driven rotating member and said means responsive to engine speed includes a plurality of centrifugally actuated weighted levers mounted on said member and adapted to cooperate with said fluid pressure in producing coupling engagement.

111. The combination set forth in claim 108 wherein said coupling includes an engine driven rotating member and said means responsive to engine speed comprises a plurality of weighted levers adapted to cooperate with said fluid pressure actuated means in producing coupling engagement in response to the outward movement of the weighted portion of said levers under the influence of centrifugal force, each of said levers being constructed with a shifting fulcrum point such as to compensate for the increase in centrifugal force incident to said outward movement by decreasing the effective moment arm acted upon by said centrifugal force.

112. In a transmission for a self-propelled vehicle having an engine, a throttle therefor and throttle actuating means, means for maintaining a supply of fluid under pressure, fluid pressure actuated gradually engageable coupling means, an output shaft and a plurality of power trains of different ratios interposed between said output shaft and said engine and adapted to be engaged by said coupling means, control means responsive to said throttle actuating means for regulating the pressure available to actuate said coupling means, and means responsive to engine speed for limiting the effective coupling actuating fluid pressure, said control means and engine speed responsive means being related in a manner whereby said latter means will normally determine the effective pressure of coupling engagement throughout the period in starting said vehicle from a standstill wherein low speed coupling slippage occurs, said control means being effective however to initially determine and regulate the effective pressure of coupling engagement when said engine is idling at an abnormally high speed and said throttle actuating means is moved to an operative position and until the engine is slowed down through said coupling engagement to the speed at which said engine speed responsive means is effective to determine said coupling engaging pressure.

113. In a transmission for a self-propelled vehicle having an engine, a throttle therefor and throttle actuating means, means for maintaining a supply of fluid under pressure, fluid pressure actuated gradually engageable coupling means, an output shaft and a plurality of power trains of different ratios interposed between said output shaft and said engine and adapted to be driven by said coupling means, control means responsive to said throttle actuating means for regulating the pressure available to actuate said coupling means, and means responsive to engine speed for limiting the effective coupling actuating fluid pressure, said control means and engine speed responsive means being related in a manner whereby said latter means will normally determine the effective pressure of coupling engagement throughout the period in starting said vehicle from a standstill wherein low speed coupling slippage occurs, said control means being effective however to prevent said engine speed responsive means from actuating said clutch means while said engine is idling at an abnormally high speed and said throttle actuating means is relased.

114. In a transmission for a self-propelled vehicle having an engine, a throttle therefor and throttle actuating means, an output shaft, a fluid pressure actuated gradually engageable coupling between said engine and output shaft, fluid pressure control means responsive to engine speed for regulating the starting torque delivered from said engine to said output shaft upon accelerating said vehicle from a standstill, and supplemental fluid pressure control means responsive to said throttle actuating means for limiting the starting torque so delivered to said output shaft.

115. In a transmission for a self-propelled vehicle having an engine, a throttle therefor and throttle actuating means, an output shaft, a fluid pressure actuated gradually engageable coupling between said engine and output shaft, fluid pressure control means responsive to engine speed for regulating the starting torque delivered from said engine to said output shaft upon accelerating said vehicle from a standstill, and supplemental fluid pressure means responsive to said throttle actuating means for limiting the starting torque so delivered to said output shaft, said engine speed responsive means being adapted to normally determine the effective starting torque delivered to said output shaft, said supplemental means being effective however to prevent the delivery of effective starting torque while said engine is idling at an abnormally high speed with said throttle actuating means released and also being effective to initially determine and regulate said starting torque until said engine reaches a speed at which said engine speed responsive means is effective to determine said torque.

116. The combination set forth in claim 112 wherein said means responsive to engine speed comprises a fluid pressure release port in a rotating member associated with said fluid pressure actuated coupling means, and a centrifugal valve adapted to block the release of fluid pressure through said port with a force increasing with engine speed.

WILLIAM T. LIVERMORE.

(References on following page)

REFERENCES CITED

The following references are of record in the file of this patent:

UNITED STATES PATENTS

| Number | Name | Date |
|---|---|---|
| 1,403,819 | Stowers et al. | Jan. 17, 1922 |
| 1,541,240 | Barkeij | June 9, 1925 |
| 1,661,613 | Jackson | Mar. 6, 1928 |
| 2,058,736 | Stauffer | Oct. 27, 1936 |
| 2,094,449 | Forichon | Sept. 28, 1937 |
| 2,100,810 | Livermore | Nov. 30, 1937 |
| 2,103,540 | Livermore | Dec. 28, 1937 |
| 2,120,104 | Livermore | June 7, 1938 |
| 2,160,331 | Hill | May 30, 1939 |
| 2,183,761 | Aspinwall | Dec. 19, 1939 |
| 2,184,941 | Maroto | Dec. 26, 1939 |
| 2,208,153 | Budlong | July 16, 1940 |
| 2,247,713 | Peterson et al. | July 1, 1941 |
| 2,261,898 | Barkeij | Nov. 4, 1941 |
| 2,271,571 | Peterson | Feb. 3, 1942 |
| 2,322,479 | Schjolin | June 22, 1943 |
| 2,326,279 | Banker | Aug. 10, 1943 |
| 2,332,593 | Nutt et al. | Oct. 26, 1943 |
| 2,352,212 | Lang et al. | June 27, 1944 |
| 2,376,545 | Livermore | May 22, 1945 |
| 2,384,439 | Carnagua | Sept. 11, 1945 |
| 2,386,217 | Kegresse | Oct. 9, 1945 |
| 2,393,693 | Kelbel | Jan. 29, 1946 |
| 2,399,554 | Livermore | Apr. 30, 1946 |
| 2,422,155 | Wemp | June 10, 1947 |